United States Patent
Bullis et al.

(10) Patent No.: US 9,183,244 B2
(45) Date of Patent: Nov. 10, 2015

(54) RULE MODIFICATION IN DECISION TREES

(71) Applicant: Cavium, Inc., San Jose, CA (US)

(72) Inventors: Kenneth A. Bullis, Los Altos, CA (US);
Rajan Goyal, Saratoga, CA (US)

(73) Assignee: Cavium, Inc., San Jose, CA (US)

( * ) Notice: Subject to any disclaimer, the term of this patent is extended or adjusted under 35 U.S.C. 154(b) by 109 days.

(21) Appl. No.: 13/831,232

(22) Filed: Mar. 14, 2013

(65) Prior Publication Data

US 2013/0218853 A1 Aug. 22, 2013

Related U.S. Application Data

(63) Continuation-in-part of application No. 13/565,775, filed on Aug. 2, 2012.

(60) Provisional application No. 61/514,344, filed on Aug. 2, 2011, provisional application No. 61/514,382, filed (Continued)

(51) Int. Cl.
*G06F 17/30* (2006.01)
*H04L 12/26* (2006.01)
(Continued)

(52) U.S. Cl.
CPC ........ *G06F 17/30345* (2013.01); *G06K 9/6282* (2013.01); *G06N 5/025* (2013.01); *H04L 12/5689* (2013.01); *H04L 41/0816* (2013.01); *H04L 41/0893* (2013.01); *H04L 43/18* (2013.01); *H04L 45/742* (2013.01); *H04L 47/2441* (2013.01); *H04L 47/39* (2013.01);
(Continued)

(58) Field of Classification Search
CPC ............. G06Q 10/10; G06F 17/30011; G06F 21/6227

USPC ......................................................... 707/694
See application file for complete search history.

(56) References Cited

U.S. PATENT DOCUMENTS 5,107,361 A 4/1992 Kneidinger et al.
5,463,777 A 10/1995 Bialkowski et al.
(Continued)

FOREIGN PATENT DOCUMENTS

WO WO 2009/145712 A1 12/2009
WO WO 2013/020002 A1 2/2013
WO WO 2013/020003 A1 2/2013

OTHER PUBLICATIONS http://en.wikipedia.org/Access_control_list, downloaded Feb. 4, 2011.

(Continued)

*Primary Examiner* — Tony Mahmoudi
*Assistant Examiner* — Dongming Wang
(74) *Attorney, Agent, or Firm* — Hamilton, Brook, Smith & Reynolds, P.C.

(57) ABSTRACT

A system, apparatus, and method are provided for modifying rules in-place atomically from the perspective of an active search process using the rules for packet classification. A rule may be modified in-place by updating a rule's definition to be an intersection of an original and new definition. The rule's definition may be further updated to the rule's new definition and a decision tree may be updated based on the rule's new definition. While a search processor searches for one or more rules that match keys generated from received packets the in-place rule modification prevents periods of incorrect rule matching of the keys thereby preventing packet loss and preserving throughput.

33 Claims, 37 Drawing Sheets

Related U.S. Application Data on Aug. 2, 2011, provisional application No. 61/514,379, filed on Aug. 2, 2011, provisional application No. 61/514,400, filed on Aug. 2, 2011, provisional application No. 61/514,406, filed on Aug. 2, 2011, provisional application No. 61/514,407, filed on Aug. 2, 2011, provisional application No. 61/514,438, filed on Aug. 2, 2011, provisional application No. 61/514,447, filed on Aug. 2, 2011, provisional application No. 61/514,450, filed on Aug. 2, 2011, provisional application No. 61/514,459, filed on Aug. 2, 2011, provisional application No. 61/514,463, filed on Aug. 2, 2011.

(51) Int. Cl.

| | |
|---|---|
| G06K 9/62 | (2006.01) |
| H04L 12/54 | (2013.01) |
| H04L 29/06 | (2006.01) |
| H04L 12/747 | (2013.01) |
| H04L 12/801 | (2013.01) |
| H04L 12/851 | (2013.01) |
| H04L 12/24 | (2006.01) |
| G06N 5/02 | (2006.01) |
| H04L 12/743 | (2013.01) |

(52) U.S. Cl.
CPC ........ *H04L 63/0227* (2013.01); *H04L 63/0263* (2013.01); *H04L 45/7457* (2013.01); *H04L 69/22* (2013.01)

(56) References Cited

U.S. PATENT DOCUMENTS

| | | | |
|---|---|---|---|
| 6,233,575 B1 | 5/2001 | Agrawal et al. | |
| 6,298,340 B1 | 10/2001 | Calvignac et al. | |
| 6,467,019 B1 | 10/2002 | Washburn | |
| 6,473,763 B1 | 10/2002 | Corl et al. | |
| 6,476,763 B2 | 11/2002 | Allen | |
| 6,587,466 B1 | 7/2003 | Bhattacharya et al. | |
| 6,735,600 B1 | 5/2004 | Andreev | |
| 6,868,414 B2 | 3/2005 | Khanna et al. | |
| 6,980,555 B2* | 12/2005 | Mar | 370/395.21 |
| 7,039,641 B2 | 5/2006 | Woo | |
| 7,366,728 B2 | 4/2008 | Corl, Jr. et al. | |
| 7,415,472 B2 | 8/2008 | Testa | |
| 7,441,022 B1* | 10/2008 | Schuba et al. | 709/223 |
| 7,509,300 B2 | 3/2009 | Sahni et al. | |
| 7,536,476 B1 | 5/2009 | Alleyne | |
| 7,546,234 B1 | 6/2009 | Deb et al. | |
| 7,571,156 B1 | 8/2009 | Gupta et al. | |
| 7,937,355 B2* | 5/2011 | Corl et al. | 706/47 |
| 8,005,869 B2 | 8/2011 | Corl et al. | |
| 8,156,507 B2 | 4/2012 | Brjazovski et al. | |
| 8,447,120 B2 | 5/2013 | Ji et al. | |
| 8,477,611 B2 | 7/2013 | Lim | |
| 8,856,203 B1 | 10/2014 | Schelp et al. | |
| 8,934,488 B2 | 1/2015 | Goyal et al. | |
| 8,937,952 B2 | 1/2015 | Goyal et al. | |
| 8,937,954 B2 | 1/2015 | Goyal et al. | |
| 2002/0023089 A1 | 2/2002 | Woo | |
| 2005/0013293 A1 | 1/2005 | Sahita | |
| 2005/0240604 A1 | 10/2005 | Corl et al. | |
| 2006/0026138 A1 | 2/2006 | Robertson et al. | |
| 2006/0136570 A1* | 6/2006 | Pandya | 709/217 |
| 2006/0155915 A1* | 7/2006 | Pereira | 711/100 |
| 2007/0168377 A1* | 7/2007 | Zabarsky | 707/102 |
| 2008/0031258 A1 | 2/2008 | Acharya et al. | |
| 2008/0109392 A1* | 5/2008 | Nandy | 706/47 |
| 2008/0140631 A1 | 6/2008 | Pandya | |
| 2009/0125470 A1* | 5/2009 | Shah et al. | 706/47 |
| 2009/0185568 A1 | 7/2009 | Cho et al. | |
| 2009/0274384 A1 | 11/2009 | Jakobovits | |
| 2010/0034202 A1 | 2/2010 | Lu et al. | |
| 2010/0067535 A1 | 3/2010 | Ma et al. | |
| 2010/0110936 A1 | 5/2010 | Bailey et al. | |
| 2010/0175124 A1 | 7/2010 | Miranda | |
| 2011/0038375 A1 | 2/2011 | Liu et al. | |
| 2011/0137930 A1 | 6/2011 | Hao et al. | |
| 2011/0219010 A1 | 9/2011 | Lim | |
| 2013/0036102 A1 | 2/2013 | Goyal et al. | |
| 2013/0039366 A1 | 2/2013 | Goyal et al. | |
| 2013/0060727 A1 | 3/2013 | Goyal et al. | |
| 2013/0070753 A1 | 3/2013 | Sahni et al. | |
| 2013/0085978 A1 | 4/2013 | Goyal et al. | |
| 2013/0232104 A1 | 9/2013 | Goyal et al. | |
| 2013/0282766 A1 | 10/2013 | Goyal et al. | |
| 2014/0279850 A1 | 9/2014 | Goyal et al. | |
| 2014/0280357 A1 | 9/2014 | Goyal et al. | |
| 2014/0281809 A1 | 9/2014 | Goyal et al. | |
| 2015/0117461 A1 | 4/2015 | Goyal et al. | |

OTHER PUBLICATIONS

Baboescu, F., et al., "Packet Classification for Core Routers: Is there an alternative to CAMs?", *Proceedings of the 22nd IEEE Conference on Computer Communications (INFOCOM '03)*, vol. 1, pp. 53-63 (2003).

Baboescu, F. and Varghese, G., "Scalable Packet Classification," *Proceedings of the ACM SIGCOMM '01 Conference on Applications, Technologies, Architectures, and Protocols for Computer Communication (SIGCOMM '01)*, pp. 199-210 (2001).

Gupta, P. and McKeown, N. "Packet Classification on Multiple Fields," *Proceedings of SIGCOMM '99 Conference on Applications, Technologies, Architectures, and Protocols for Computer Communication (SIGCOMM '99)*, pp. 147-160 (1999).

Gupta, P. and McKeown, N. "Classifying Packets With Hierarchical Intelligent Cuttings," *IEEE Micro*, 20(1):34-41 (2000).

Qi, Y., et al., "Packet Classification Algorithms: From Theory to Practice," Proceedings of the 28th *IEEE Conference on Computer Communications (INFOCOM '09)*, pp. 648-656 (2009).

Singh, S., et al., "Packet Classification Using Multidimensional Cutting," *Proceedings of the ACM SIGCOMM '03 Conference on Applications, Technologies, Architectures, and Protocols for Computer Communication (SIGCOMM '03)*, pp. 213-224 (2003).

International Search Report in PCT/US2012/049406 dated Oct. 18, 2012, 3 pages, entitled "Incremental Update of Rules for Packet Classification".

Fong et al., HaRP: Rapid Packet Classification via Hashing Round-Down Prefixes, *IEEE Transactions on Parallel and Distributed Systems, IEEE Service Center*, v. 22(7), pp. 1105-1119 (2011).

Gupta, P., "Algorithms for Packet Routing Lookups and Packet Classification," Dissertation submitted to the Dept. of Comp. Science of Stanford Univ. (Dec. 2000).

Zhang, B., et al., "On Constructing Efficient Shared Decision Trees for Multiple Packet Filters," Dept. Computer Science Rice University (2010).

Abdelghani, M., et al. "Packet Classification Using Adaptive Rule Cutting," IEEE (2005).

Yu, L., et al., "A Novel IP Packet Classification Algorithm Based on Hierarchical Intelligent Cuttings," IEEE 6th Int. Conf. on ITS Telecom. Proceedings 1033-1036 (2006).

Theiling, Henrik "Generating Decision Trees for Decoding Binaries" ACM 2001 [Online] Downloaded Jul. 14, 2015 http://delivery.acm.org/1 0.1145/390000/384213/p112-theiling.pdf?ip=151.207.250.51 &id=384213&acc=ACTIVE%20SERVICE &key=C15944E53D0ACA63%2E4D4702B0C3E38B35 %2 E4 D4 702B0C3 E38B35%2E4 D4 702B0C3 E38B35&C Fl D=528083660&C FTOKEN=15678279& acm =1436903293 abc.

\* cited by examiner

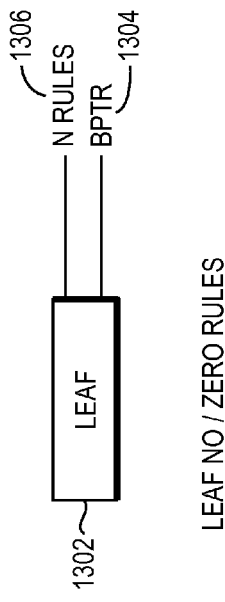
FIG. 13
LEAF NO / ZERO RULES
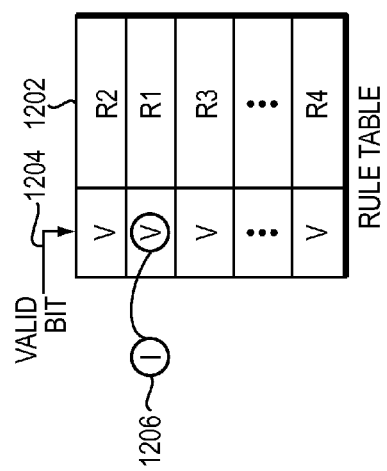
FIG. 12B
INVALIDATE RULE
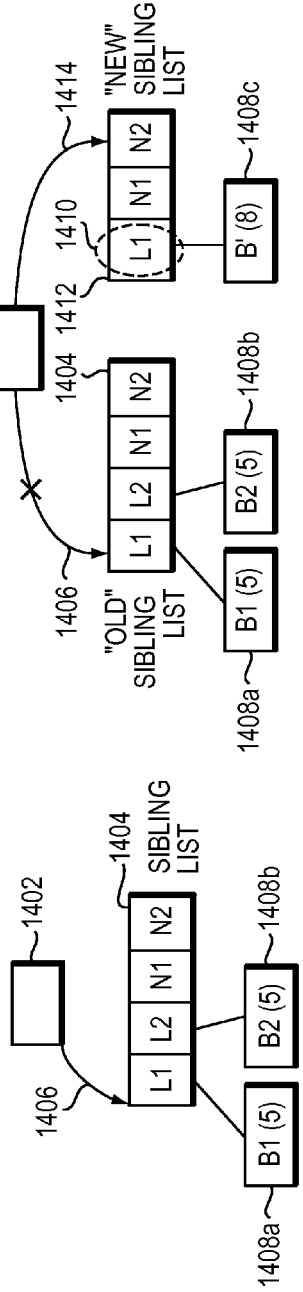
FIG. 14A
FIG. 14B
MERGE BUCKETS

[Add a rule]　　　　　　　　　　　　　　　　　　　　　　← 1900
　　Append a rule and its priority to the rule table
　　　　Write new row at end of table
　　　　RMW last row of table
　　　　Adjust priorities of a range of rules
　　　　　　RMW a series of rows of the priority table
　　Replace an invalidated rule with a new one
　　　　RMW row(s) containing rule
　　Add rule to bucket
　　　　Create new version of bucket containing the rule
　　　　　　Write the row(s) containing the bucket
　　　　Update the leaf(s) pointing to the bucket
　　　　　　RMW each leafs row

FIG. 19A

[Split leaf into node and leaves]　　　　　　　　　　　← 1902
　　Create node
　　　　RMW row containing the node
　　Find or create new buckets
　　　　Write or RMW row(s) containing buckets
　　Create array of leaves under node (1a)
　　　　Write or RMW row(s) containing leaves
　　Create array of leaf indices under node (2,3)
　　　　Write or RMW row(s) containing leaf indices
　　Find or create unique leaves (2,3)
　　　　Write or RMW row(s) containing new leaves

FIG. 19B

[Add bucket to node]　　　　　　　　　　　　　　　　　← 1904
　　Replace hole in node/leaf array with new leaf (1a)
　　　　RMW row containing new leaf
　　Replace hole in array of leaf indices with new leaf index (2,3)
　　　　RMW row containing new leaf
　　Create new array containing new leaf (1a)
　　　　RMW row(s) containing new array
　　Find or create new unique leaf (2,3)
　　　　Write or RMW row(s) containing new leaf
　　Create new array containing new leaf index (2,3)
　　　　RMW row(s) containing new array
　　Update node with new hash mask (1a)
　　　　RMW row containing node
　　Find or create bucket with specified rule list
　　　　RMW row(s) containing bucket

FIG. 19C

[Recompile subtree]    1906
    Update root node of subtree
        Update the node itself
            RMW row containing subtree root node
        Create node/leaf array (1a)
            Write or RMW row(s) containing array
        Create node array (2,3)
            Write or RMW row(s) containing array
        Create leaf index array (2,3)
            Write or RMW row(s) containing array
        Find or create new unique leaves (2,3)
            Write or RMW row(s) containing new leaves Update pointer to root of tree
        Update TAT
Create node and array
    Create node
        RMW row containing node
    Create node/leaf array (1a)
        Write or RMW row(s) containing array
    Create node array (2,3)
        Write or RMW row(s) containing array
    Create leaf index array (2,3)
        Write or RMW row(s) containing array
    Find or create new unique leaves (2,3)
        Write or RMW row(s) containing new leaves

FIG. 19D

[Delete a rule]
    Invalidate rule    1908
        Clear "valid" bit in rule
            RMW row containing the bit Remove rule from all buckets that reference it
        Remove rule from a bucket
            Create new bucket not containing rule
                Write or RMW row(s) containing bucket Mark leaf as empty (# rules = 0)
        RMW row containing leaf Shrink node/leaf array (1a)
        Update node's hash mask
            RMW row containing node
        Create new, smaller array
            Write or RMW row(s) containing array

FIG. 19E

[Modify a rule]                                                 — 1910
    Set rule definition to intersection of old and new versions
        RMW row(s) containing rule Set rule definition to new version
        RMW row(s) containing rule

FIG. 19F

[Defragment]                                               — 1912
    Copy array of nodes and leaves (1 a)
        Non-overlapping memory copy, half-row-aligned
    Copy arrays of nodes and leaf indices (2,3)
        Non-overlapping memory copy, half-row-aligned
    Update node cptr to point to new array
        RMW of row containing node
    Copy bucket
        RMW the row(s) containing bucket
    Update leaves to point to new bucket
        RMW the row(s) containing the leaves

FIG. 19G

RULE MODIFICATION IN DECISION TREES

RELATED APPLICATIONS

This application is a continuation-in-part of U.S. application Ser. No. 13/565,775, filed Aug. 2, 2012, which claims the benefit of U.S. Provisional Application No. 61/514,344, filed on Aug. 2, 2011; U.S. Provisional Application No. 61/514,382, filed on Aug. 2, 2011; U.S. Provisional Application No. 61/514,379, filed on Aug. 2, 2011; U.S. Provisional Application No. 61/514,400, filed on Aug. 2, 2011; U.S. Provisional Application No. 61/514,406, filed on Aug. 2, 2011; U.S. Provisional Application No. 61/514,407, filed on Aug. 2, 2011; U.S. Provisional Application No. 61/514,438, filed on Aug. 2, 2011; U.S. Provisional Application No. 61/514,447, filed on Aug. 2, 2011; U.S. Provisional Application No. 61/514,450, filed on Aug. 2, 2011; U.S. Provisional Application No. 61/514,459, filed on Aug. 2, 2011; and U.S. Provisional Application No. 61/514,463, filed on Aug. 2, 2011. The entire teachings of the above applications are incorporated herein by reference.

BACKGROUND OF THE INVENTION

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Improving the efficiency and security of network operation in today's Internet world remains an ultimate goal for Internet users. Access control, traffic engineering, intrusion detection, and many other network services require the discrimination of packets based on multiple fields of packet headers, which is called packet classification.

Internet routers classify packets to implement a number of advanced Internet services such as routing, rate limiting, access control in firewalls, virtual bandwidth allocation, policy-based routing, service differentiation, load balancing, traffic shaping, and traffic billing. These services require the router to classify incoming packets into different flows and then to perform appropriate actions depending on this classification.

A classifier, using a set of filters or rules, specifies the flows, or classes. For example, each rule in a firewall might specify a set of source and destination addresses and associate a corresponding deny or permit action with it. Alternatively, the rules might be based on several fields of a packet header including layers 2, 3, 4, and 5 of the OSI model, which contain addressing and protocol information.

On some types of proprietary hardware, an Access Control List (ACL) refers to rules that are applied to port numbers or network daemon names that are available on a host or layer 3 device, each with a list of hosts and/or networks permitted to use a service. Both individual servers as well as routers can have network ACLs. ACLs can be configured to control both inbound and outbound traffic.

SUMMARY OF THE INVENTION

According to one embodiment, an apparatus may comprise a memory configured to store a Rule Compiled Data Structure (RCDS). The Rule Compiled Data Structure (RCDS) may represent a set of rules for packet classification. The apparatus may further comprise a processor coupled to the memory. The processor may be configured to receive an incremental update for the RCDS, perform an active search of the Rule Compiled Data Structure (RCDS) to classify received packets, and update the Rule Compiled Data Structure (RCDS) atomically from the perspective of the active search being performed. The apparatus may further comprise an interface. The interface may be configured to receive a change list; the change list may include the incremental update. The processor may be a search processor. The Rule Compiled Data Structure (RCDS) may include a compiled set of rules and an updated Rule Compiled Data Structure (RCDS) may include the compiled set of rules and one or more applied incremental updates. The updated Rule Compiled Data Structure (RCDS) achieves a same performance as a pre-complied version of the updated RCDS.

According to one embodiment, an apparatus may comprise a memory and a processor coupled to the memory. The processor may be configured to include an incremental update module. The incremental update module may be configured to receive an add, delete, or modify rule operation and create a change list in the memory. The change list may be created to atomically update a Rule Compiled Data Structure (RCDS) from the perspective of an active search process utilizing the RCDS. The apparatus may further comprise an interface and the incremental update module may be further configured to communicate the change list over the interface. The apparatus may further comprise a compiler module coupled to the memory. The compiler module may be configured to receive a set of rules and compile the set of rules into a binary format of a decision tree. The compiler module may be further configured to store the binary format of the decision tree in the memory and to communicate the binary format of the decision tree over the interface.

According to one embodiment, a non-transient computer-readable medium has encoded thereon a sequence of instructions which, when executed by a processor, causes the processor to receive an incremental update for a Rule Compiled Data Structure (RCDS). The Rule Compiled Data Structure (RCDS) may represent a set of rules for packet classification. The Rule Compiled Data Structure (RCDS) may be utilized for packet classification by an active search process. The processor may atomically update the Rule Compiled Data Structure (RCDS) based on the incremental update received. The Rule Compiled Data Structure (RCDS) may be atomically updated from the perspective of the active search process utilizing the Rule Compiled Data Structure (RCDS).

According to one embodiment, a method may receive an incremental update for a Rule Compiled Data Structure (RCDS). The Rule Compiled Data Structure (RCDS) may represent a set of rules for packet classification. The Rule Compiled Data Structure (RCDS) may be utilized for packet classification by an active search process and atomically updated based on the incremental update received, from the perspective of the active search process utilizing the RCDS.

The method may restrict a state of the Rule Compiled Data Structure (RCDS) to a before state and an after state. The before state may be a state of the Rule Compiled Data Structure (RCDS) before receiving the incremental update for the RCDS, the after state may be a state of the Rule Compiled Data Structure (RCDS) after a series of one or more modifications to the Rule Compiled Data Structure (RCDS) has been completed. The series of one or more modifications may have been completed based on the incremental update received. The series of one or more modifications may be visible to the active search process based on performing one update to the Rule Compiled Data Structure (RCDS) being searched.

The method may further include atomically adding a new rule to the Rule Compiled Data Structure (RCDS) based on the incremental update being an add rule operation, atomically deleting a rule from the Rule Compiled Data Structure (RCDS) based on the incremental update being a delete rule operation, and atomically modifying a rule in the Rule Compiled Data Structure (RCDS) based on the incremental update being a modify rule operation. Modifying the rule includes at least one of: modifying a priority of the rule or modifying at least one field of the rule.

The method may further include identifying a priority fit conflict based on a change in priority of the rule being inconsistent with a current priority ordering of the rule and one or more other rules. The method may atomically modify the priority of the rule based on the priority fit conflict not being identified, and atomically modify the priority of the rule and priority of another rule based on the conflict being identified.

The method may further include determining whether one or more rules need to be added or deleted, and adding or deleting the one or more rules. Adding or deleting the one or more rules is atomic.

The method may further include atomically invalidating a specified rule in the Rule Compiled Data Structure (RCDS) based on the incremental update being a delete operation specifying the rule. The active search process skips the specified rule invalidated.

The method may further include representing the Rule Compiled Data Structure (RCDS) as a tree of the set of rules. The tree may be a binary data structure including one or more nodes and one or more leaves. The method may include representing at least one of the one or more nodes as a parent node and linking the parent node to one or more children. The one or more children may be a node or a leaf. Linking the parent node to the one or more children may include pointing the parent node to a sibling list. The sibling list may include the one or more children. The method may link nodes of the tree to one or more nodes and one or more leaves of the tree. The method may link leaves of the tree to one or more buckets. Each bucket may represent a subset of the set of rules. Each bucket may include one or more bucket entries corresponding to the subset of the set of rules. The bucket entries may be ordered by increasing or decreasing rule priority. The method may further include storing the set of rules in a rule table. The rules within the rule table may be ordered or unordered.

The Rule Compiled Data Structure (RCDS) may be a performance tree. The method may further include maintaining a housekeeping tree. The housekeeping tree may be an augmented representation of the performance tree. The housekeeping tree may include field ranges of the rules and lists of the rules at each node in the tree. Updating the performance tree atomically may include utilizing the housekeeping tree such that a series of one or more modifications to the performance tree is made visible to the active search process based on one update to the performance tree being searched.

The method may further include creating a change list specifying the one or more modifications to the performance tree.

The incremental update may be an add, delete, or modify operation, and the method may further include including a cover list of rules for each rule in the housekeeping tree. A change list may be created specifying one or more rules to add, delete, or modify based on the cover list. The method may include updating the cover list based on the change list determined.

The method may further include maintaining in each leaf a pointer to a bucket from among the one or more buckets and a bucket rule counter. The bucket rule counter may track a number of rules included in the bucket. The bucket rule counter may be incremented based on a rule being added to the bucket. The bucket rule counter may be decremented based on a rule being deleted from the bucket.

The method may include tracking at each node a total number of incremental updates. The method may determine at a given node a ratio of the total number of incremental updates tracked for the given node to a number of rules represented by the given node. The method may adaptively adjust the performance tree by recompiling a subtree based on the ratio being greater than a given threshold value.

The method may include atomically adding a new rule to the tree. The method may split a leaf of the tree into one or more new nodes and add the rule to a bucket associated with one or more leaves of the one or more new nodes.

Each bucket may be a data structure and the one or more bucket entries may be a rule, an index to a rule, a pointer to a rule, a pointer to a set of rules, or a pointer to another bucket.

The method may further include atomically adding a new rule to the tree, and identifying a destination bucket from among the one or more buckets to include the new rule. The method may append the new rule to the end of the destination bucket based on determining a space fit and priority fit of the new rule in the destination bucket. Appending the new rule to the end of the destination bucket takes one update.

A space fit may be based on a current number of rules in the destination bucket being less than a maximum number of rules for the destination bucket.

A priority fit may be based on the priority associated with the new rule being consistent with a priority ordering of current rules in the destination bucket.

The method may further include atomically adding a new rule to the tree, identifying a destination bucket from among the one or more buckets to include the new rule, and creating a new bucket based on determining the priority associated with the new rule being inconsistent with a priority ordering of rules in the destination bucket. The active search process is unaffected by the new bucket created. The method may further include including the set of rules of the destination bucket in the new bucket, including the new rule in the new bucket, and adjusting an order of the set of rules and the new rule based on increasing or decreasing priority order. The method may update a link of a leaf in the tree. The leaf may have a link to a destination bucket from among the one or more buckets. The link update may include pointing the leaf to the new bucket. The link update takes one update.

The method may further include atomically adding a new rule to the tree by identifying a destination bucket from among the one or more buckets to include the new rule, creating a new bucket, the active search process being unaffected by the new bucket created, including the new rule in the new bucket, and updating a bucket entry of the destination bucket to point to the new bucket. The bucket entry update takes one update.

The method may further include atomically adding a new rule to the tree by identifying a destination bucket from among the one or more buckets to include the new rule, and creating a subtree based on determining lack of space in the destination bucket for the new rule. The lack of space in the destination bucket may be determined based on a maximum number of rules set for the destination bucket. The subtree may include one or more new leaves or new nodes. The active search process is unaffected by the subtree created. The method may further include adding the new rule to one or more buckets of the subtree, adding one or more rules of the destination bucket to one or more buckets of the subtree and linking the subtree to the tree by updating a link of a leaf in the tree. The leaf may have a link to the destination bucket from among the one or more buckets. The link update may include pointing the leaf to the subtree, converting the leaf to a node. The link update takes one update.

The method may further include atomically adding a new leaf or a new node to a parent node in the tree, wherein the parent node in the tree is linked to a current sibling list. The current sibling list may include one or more leaves or one or more nodes. The method may further include creating a new sibling list. The active search process is unaffected by the new sibling list created. The method may further include adding the new leaf or the new node to the new sibling list. The new sibling list may include the current sibling list. The method may further include including the new sibling list in the tree by updating a link of the parent to point the parent node to the new sibling list. The link update takes one update.

The method may further include reserving a defragmentation portion of the memory space. The defragmentation portion of the memory space may be a designated defragmentation area. The defragmentation area may be a contiguous portion of the memory space reserved at a designated area of the memory space. The method may further include identifying a dead area of the RCDS. The dead area may be a portion of the memory space being occupied by at least one unreferenced leaf, node, bucket, or sibling list. The method may further include defragmenting the Rule Compiled Data Structure (RCDS) by recovering the dead area. The active search process is unaffected by the dead area recovered, the Rule Compiled Data Structure (RCDS) is defragmented atomically. The method may further include recovering the dead area including relocating a used portion of memory. The used portion may include one or more nodes or leaves located adjacent to the dead area identified to the designated defragmentation area. The method may further include moving a new sibling list to a recovered memory space. The recovered memory space may include the dead area identified and the used portion of memory relocated. The method may further include moving the used portion of memory relocated to the defragmentation area out of the defragmentation area to an end portion of the memory space reserved for the RCDS.

The method may further include atomically deleting a specified rule from the tree, wherein a bucket entry of a bucket includes the specified rule. The method may include linking the bucket to a leaf by a leaf bucket pointer and invalidating the specified rule in the bucket entry. The method may further include updating the link by setting the leaf bucket pointer to null if all bucket entries in the bucket are invalidated. Invalidating the specified rule and updating the leaf bucket pointer to null take one update. The active search process skips a bucket if the leaf bucket pointer is null.

The method may further include atomically deleting a specified rule from the tree, wherein a bucket entry of a bucket includes a rule pointer pointing to the specified rule. The method may include linking the bucket to a leaf by a leaf bucket pointer. The method may further include setting the rule pointer to null and updating the link by setting the leaf bucket pointer to null if all rule pointers in the bucket are null. Setting the rule pointer to null and setting the leaf bucket pointer to null take one update. The active search process skips null leaf bucket pointers and skips null rule pointers.

The method may further include atomically deleting a specified rule from the tree, wherein a bucket entry of a bucket includes a rule chunk pointer pointing to a set of one or more rules including the specified rule. The method may include linking the bucket to a leaf by a leaf bucket pointer, invalidating the specified rule and setting the rule chunk pointer to null if all rules in the set of one or more rules are invalidated. The method may further include updating the link by setting the leaf bucket pointer to null if all bucket entries in the bucket are invalidated. Invalidating the specified rule, setting the rule chunk pointer to null, and setting the leaf bucket pointer to null take one update. The active search process skips null leaf bucket pointers, null rule chunk pointers, and invalidated rules.

The method may further include atomically adding one or more rules based on deleting a specified rule from the tree. The method may include identifying a destination bucket from among the one or more buckets to include the new rule. The method may further include creating a subtree based on determining lack of space in the destination bucket for the new rule. Lack of space in the destination bucket may be determined based on a maximum number of rules set for the destination bucket. The subtree may include one or more new leaves or new nodes. The active search process is unaffected by the subtree created. The method may further include adding the new rule to one or more buckets of the subtree, adding one or more rules of the destination bucket to one or more buckets of the subtree, and linking the subtree to the tree by updating a link of a leaf in the tree. The leaf may have a link to the destination bucket from among the one or more buckets. The link update includes pointing the leaf to the subtree, converting the leaf to a node. The link update takes one update.

The method may further include atomically adding one or more rules based on deleting a specified rule from the tree. The method may include identifying a destination bucket from among the one or more buckets to include the new rule and appending the new rule to the end of the destination bucket based on determining a space fit and priority fit of the new rule in the destination bucket. Appending the new rule to the end of the destination bucket takes one update.

According to one embodiment, the incremental update is an add rule operation, a delete rule operation, or a modify rule operation. Updating the Rule Compiled Data Structure (RCDS) based on the incremental update received may further include atomically adding, deleting, modifying, or any combination thereof, one or more rules to/from the RCDS.

According to another embodiment, a method may comprise receiving an incremental update specifying a new rule definition including a modification of at least one field of a designated rule of a plurality of rules. The plurality of rules may be represented by a Rule Compiled Data Structure (RCDS) as a decision tree for packet classification utilized by an active search process. The plurality of rules may represent a search space for the packet classification. Each rule of the plurality of rules may have an original rule definition defining a subset of the search space. The method may determine an intersection of the new rule definition specified and the original rule definition of the designated rule. The method may set the original rule definition of the designated rule to an intermediate rule definition defined by the intersection determined and incorporate the series of one or more updates determined in the RCDS, atomically from the perspective of the active search process. The method may set the intermediate rule definition of the designated rule to the new rule definition and incorporate the series of one or more updates determined in the RCDS, atomically from the perspective of the active search process.

Setting the original rule definition of the designated rule to the intermediate rule definition defined by the intersection determined may include modifying each field of the at least one field of the designated rule, in turn, atomically.

Setting the intermediate rule definition of the designated rule to the new rule definition may include modifying each field of the at least one field of the designated rule, in turn, atomically.

The method may further comprise including a plurality of nodes and one or more leaves in the RCDS, the plurality of nodes and the one or more leaves representing a subset of the plurality of rules. The method may include representing at least one of the one or more nodes as a parent node and linking the parent node to one or more children, the one or more children having a child type, the child type being either a node type or a leaf type. Linking the parent node to the one or more children may include pointing the parent node to a sibling list, the sibling list may include the one or more children. Determining the series of one or more updates to the RCDS based on the incremental update received may include for each parent node, (a) creating an intersection list identifying children included in the sibling list having one or more rules intersecting either the new rule definition or the original rule definition and (b) updating each of the children identified based on the new rule definition and the type of the child.

If the given type of the child is the leaf type, updating each of the children identified based on the new rule definition and the type of the child may include determining whether to (i) continue to include the designated rule in the child, (ii) remove the designated rule from the child, or (iii) add the designated rule to the child.

If the determination is to remove the designated rule from the child, the method may include: removing the designated rule from the child and adding one or more lower priority rules to the child. The one or more lower priority rules added may be rules that are covered by the designated rule and have a lower priority relative to a priority of the designated rule. The method may include replacing the child by rebuilding a subtree of the RCDS based on the one or more lower priority rules added resulting in a number of rules represented by the child being greater than a leaf rule number threshold.

If the determination is to add the designated rule to the child, the method may include adding the designated rule to the child. The method may include removing one or more lower priority rules from the child, the one or more lower priority rules removed may be rules that are covered by the designated rule and have a lower priority relative to a priority of the designated rule. The method may include replacing the child by rebuilding a subtree of the RCDS based on the one or more lower priority rules added resulting in a number of rules represented by the child being greater than a leaf rule number threshold.

If the type of the child is the node type, updating each of the children identified based on the new rule definition and the type of the child may include incrementing a tracking number for the child, the tracking number may indicate a total number of updates for the child since a last recompilation. The method may determine a ratio of the tracking number incremented to a number of rules represented by the child. The method may rebuild the child and a subtree of the child based on the ratio being greater than a given threshold value.

The method may include linking the one or more leaves to one or more buckets, each bucket may represent a smaller set of rules represented by a corresponding leaf. Each bucket may include one or more bucket entries, each bucket entry may correspond to a unique one of the plurality of rules. The method may store the plurality of rules in a rule table. Setting the original rule definition of the designated rule to the intermediate rule definition defined by the intersection determined may include updating an entry for the designated rule in the rule table stored. Setting the intermediate rule definition of the designated rule to the new rule definition may include further updating the entry with the new rule definition.

Incorporating the series of one or more updates determined in the RCDS, atomically may include enabling a given search of the active search process to view the RCDS in either a before state or an after state. The before state being a state of the RCDS before receiving the incremental update, the after state being another state of the RCDS having the series of one or more updates to the RCDS incorporated. The after state may be made visible to the given search based on a single update to the RCDS being searched.

The RCDS may include a plurality of nodes representing a subset of the plurality of rules and the method may further comprise maintaining a housekeeping tree. The housekeeping tree may be an augmented representation of the RCDS. The housekeeping tree may include field ranges of the rules and lists of the rules at each node in the RCDS. The housekeeping tree may be utilized to enable visibility of the after state.

Another example embodiment disclosed herein includes an apparatus corresponding to operations consistent with the method embodiments described above.

Further, yet another example embodiment may include a non-transitory computer-readable medium having stored thereon a sequence of instructions which, when loaded and executed by a processor, causes the processor to complete methods consistent with the method embodiments described above.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 12B shows a rule table with rules according to one embodiment.

FIG. 13 shows a leaf pointing to a bucket and a rule counter according to one embodiment.

FIG. 14A illustrates an embodiment for deleting a rule.

FIG. 14B shows that to merge two buckets, according to one embodiment, includes creating a bucket.

FIG. 19A illustrates an incremental update according to another embodiment for adding a rule.

FIG. 19B illustrates an incremental update according to another embodiment for splitting a leaf into a node and leaves.

FIG. 19C illustrates an incremental update according to another embodiment for adding a bucket to a node.

FIG. 19D illustrates an incremental update according to another embodiment for recompiling a subtree.

FIG. 19E illustrates an incremental update according to another embodiment for deleting a rule.

FIG. 19F illustrates an incremental update according to another embodiment for modifying a rule.

FIG. 19G illustrates an incremental update according to another embodiment for defragmentation.

DETAILED DESCRIPTION OF THE INVENTION

A description of example embodiments of the invention follows.

The teachings of all patents, published applications and references cited herein are incorporated by reference in their entity.

Complexity of network applications is increasing due to the increasing number of network applications being implemented in network devices. Packet classification is widely used for various kinds of applications, such as service-aware routing, intrusion prevention and traffic shaping. Packet classification solutions are required to handle the exponentially increasing traffics on edge, access, and core devices.

Embodiments of a system, apparatus, and method are disclosed herein for adding, deleting, and modifying rules in one update from the perspective of an active search process using the rules for packet classification. To perform packet classification, a search processor may search for one or more rules that match keys generated from received packets. While an active search is in process, there may be a need to add, delete, or modify rules. Embodiments disclosed herein enable adding, deleting, and modifying rules in one update from the perspective of an active search process using the rules for packet classification.

Figure 1:
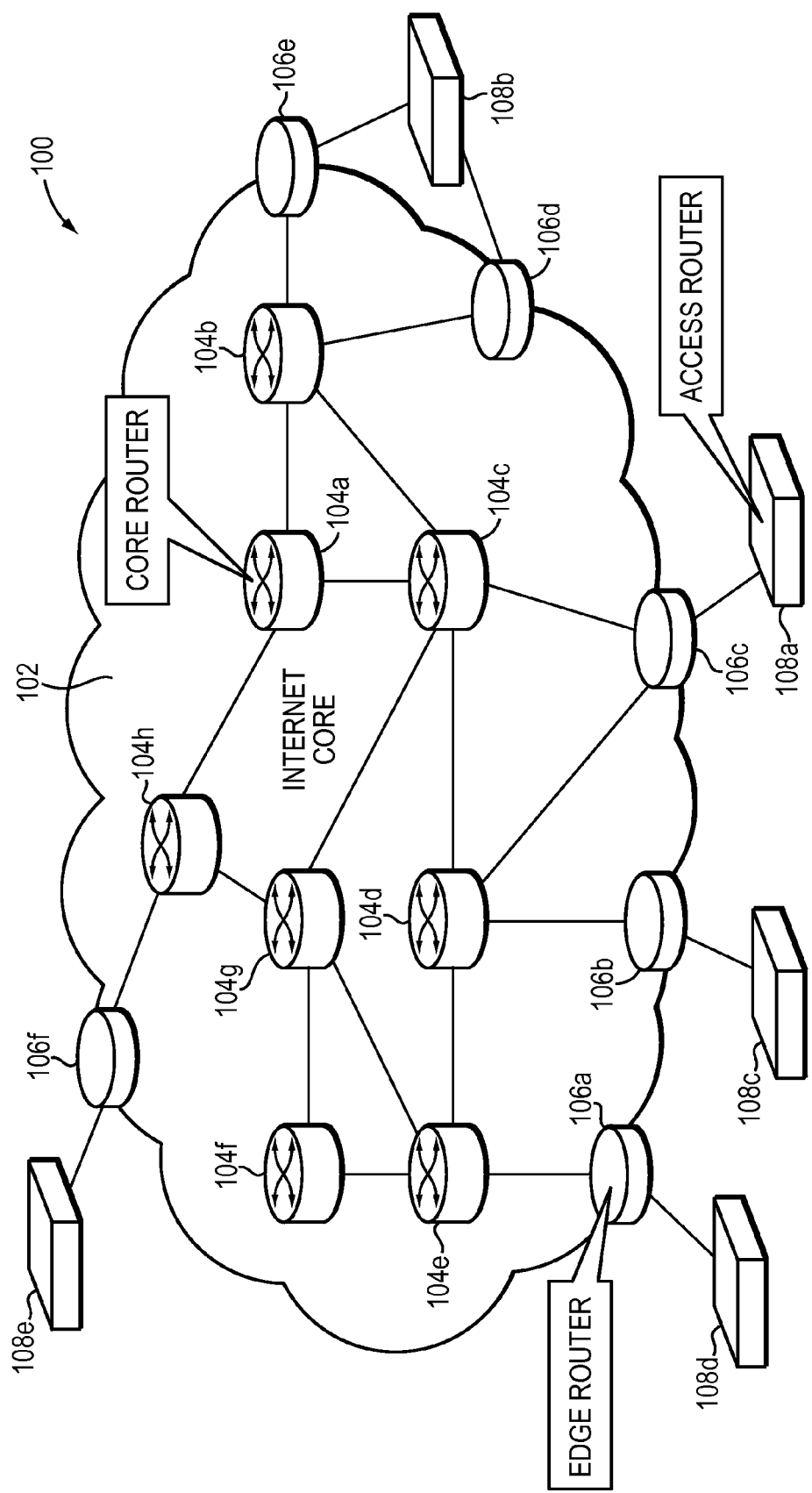
FIG. 1 is a block diagram of a typical network topology including network elements that may employ techniques disclosed herein.

FIG. 1 is a block diagram 100 of a typical network topology including network elements that may employ techniques disclosed herein. The network topology includes an Internet core 102 including a plurality of core routers 104a-h. Each of the plurality of core routers 104a-h is connected to at least one other of the plurality of core routers 104a-h. Core routers 104a-h that are on the edge of the Internet core 102 (e.g., core routers 104b-e and 104h) are coupled with at least one edge router 106a-f. Each edge router 106a-f is coupled to at least one access router 108a-e.

The core routers 104a-h may be configured to operate in the Internet core 102 or Internet backbone. The core routers 104a-h may be configured to support multiple telecommunications interfaces of the Internet core 102 and may further be configured to forward packets at a full speed of each of the multiple telecommunications protocols.

The edge routers 106a-f may be placed at the edge of the Internet core 102. Edge routers 106a-f may bridge access routers 108a-e outside the Internet core 102 and core routers 104a-h in the Internet core 102. Edge routers 106a-f may be configured to employ a bridging protocol to forward packets from access routers 108a-e to core routers 104a-h and vice versa.

The access routers 108a-e may be routers used by an end user, such as a home user or an office, to connect to one of the edge routers 106a-f, which in turn may connect to the Internet core 102 by connecting to one of the core routers 104a-h. In this manner, the edge routers 106a-f may connect to any other edge router 106a-f via the edge routers 106a-f and the interconnected core routers 104a-h.

The processors described herein may reside in any of the core routers 104a-h, edge routers 106a-f, and access routers 108a-e. The search processor described herein, within each of these routers, may be configured to analyze (e.g., classify) Internet Protocol (IP) packets based on a set of rules and forward the IP packets along an appropriate network path. Packet classification must be intelligent to handle diverse types of rule sets without significant loss of performance. In addition, new technologies, such as multi-core processors provide unprecedented computing power, as well as highly integrated resources. Thus, packet classification solutions must be well suited to advanced hardware and software technologies.

Existing packet classification methods trade memory for time. Although the tradeoffs have been constantly improving, the time taken for a reasonable amount of memory is still generally poor. Because of problems with existing methods, vendors use Ternary Content-Addressable Memory (TCAM), which uses brute-force parallel hardware to simultaneously check packets against all rules. The main advantages of TCAMs over existing methods are speed and determinism (TCAMs work for all databases).

A TCAM is a hardware device that functions as a fully associative memory. A TCAM cell stores three values: 0, 1, or 'X,' which represents a don't-care bit and operates as a per-cell mask enabling the TCAM to match rules containing wildcards, such as a kleene star '*'. In operation, a whole packet header can be presented to a TCAM to determine which entry (rule) it matches. However, the complexity of TCAMs has allowed only small, inflexible, and relatively slow implementations that consume a lot of power. Therefore, a need continues for efficient methods operating on specialized data structures.

Current methods remain in the stages of mathematical analysis and/or software simulation (observation based solutions). Proposed mathematic solutions have been reported to have excellent time/special complexity. However, methods of this kind have not been found to have any implementation in real-life network devices because mathematical solutions often add special conditions to simplify a problem and/or omit large constant factors which might conceal an explicit worst-case bound. Proposed observation based solutions employ statistical characteristics observed in rules to achieve efficient solution for real-life applications. However, these methods generally only work well with specific type of rule sets. Because packet classification rules for different applications have diverse features, few observation based methods are able to fully exploit redundancy in different types of rule sets to obtain stable performance under various conditions.

Packet classification may be performed using a packet classifier, also called a policy database, flow classifier, or simply a classifier. A classifier is a collection of rules or policies. Packets received are matched with rules, which determine actions to take with a matched packet. Generic packet classification requires a router to classify a packet on the basis of multiple fields in a header of the packet. Each rule of the classifier specifies a class that a packet may belong to according to criteria on 'F' fields of the packet header and associates an identifier (e.g., class ID) with each class. For example, each rule in a flow classifier is a flow specification, in which each flow is in a separate class. The identifier uniquely specifies an action associated with each rule. Each rule has 'F' fields. An ith field of a rule R, referred to as R[i], is a regular expression on the ith field of the packet header. A packet P matches a particular rule R if for every i, the ith field of the header of P satisfies the regular expression R[i].

Classes specified by the rules may overlap. For instance, one packet may match several rules. In this case, when several rules overlap, an order in which the rules appear in the classifier determines the rules relative priority. In other words, a packet that matched multiple rules belongs to the class identified by the identifier (class ID) of the rule among them that appears first in the classifier.

Techniques disclosed herein may employ a decision tree that is used to match received packets with rules. A decision tree is a decision support tool that uses a tree-like graph or model of decisions and their possible consequences, including chance event outcomes, resource costs, and utility. Decision trees are commonly used in operations research, specifically in decision analysis, to help identify a strategy most likely to reach a goal. Another use of decision trees is as a descriptive means for calculating conditional probabilities.

As described herein, a processor, such as a search processor, may use a decision tree to select to match a received packet with a rule in a classifier table to determine how to process receive packets. Before runtime, rules may be compiled off-line and downloaded into a search processor. During runtime, packets flow through the search processor. The search processor may generate keys from the packets, search for one or more rules matching the generated keys, and return results of a match found or not found. A search space may be defined as all possible values that may be looked up in the decision tree for matching the keys generated. A plurality of rules may represent the search space. The plurality of rules may be represented by a Rule Compiled Data Structure (RCDS) as the decision tree.

While the search processor searches for one or more rules that match keys (e.g., the search processor is performing an active search process), there may be a need to add, delete or modify rules—an incremental update. According to techniques as disclosed herein, the search processor may add, delete or modify rules without affecting the ability of the search processor to search for one or more rules that match keys, in terms of both performance (e.g., how many packets are searched per a unit of time) and functionality.

Figure 2A:
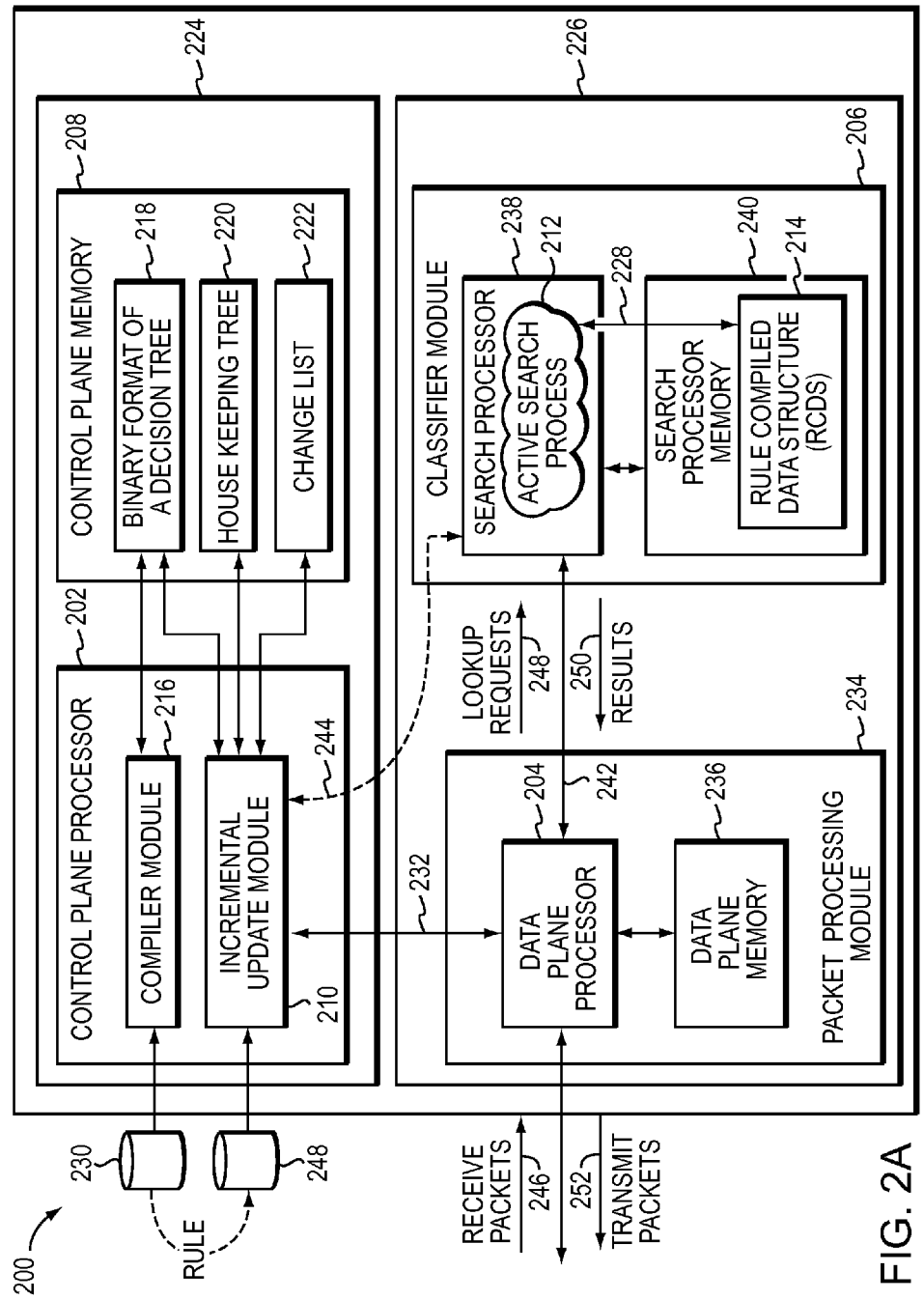
FIG. 2A illustrates one embodiment of a system including a control plane apparatus and a data plane apparatus that atomically updates a Rule Compiled Data Structure (RCDS).

FIG. 2A illustrates a system 200 including a control plane apparatus 224 and a data plane apparatus 226 that atomically updates a Rule Compiled Data Structure (RCDS) 214 from the perspective of an active search process 212 utilizing (228) the Rule Compiled Data Structure (RCDS) 214.

The control plane apparatus 224 may include a control plane processor 202 that may include a compiler module 216, an incremental update module 210, and may be coupled to control plane memory 208. The control plane memory 208 may include a binary format of a decision tree 218, a housekeeping tree 220, and a change list 222. The compiler module 216 may be configured to receive a rule file 230 and to compile the received rule file into a decision tree, such as a binary format of the decision tree 218 (e.g., a binary data structure).

Figure 2B:
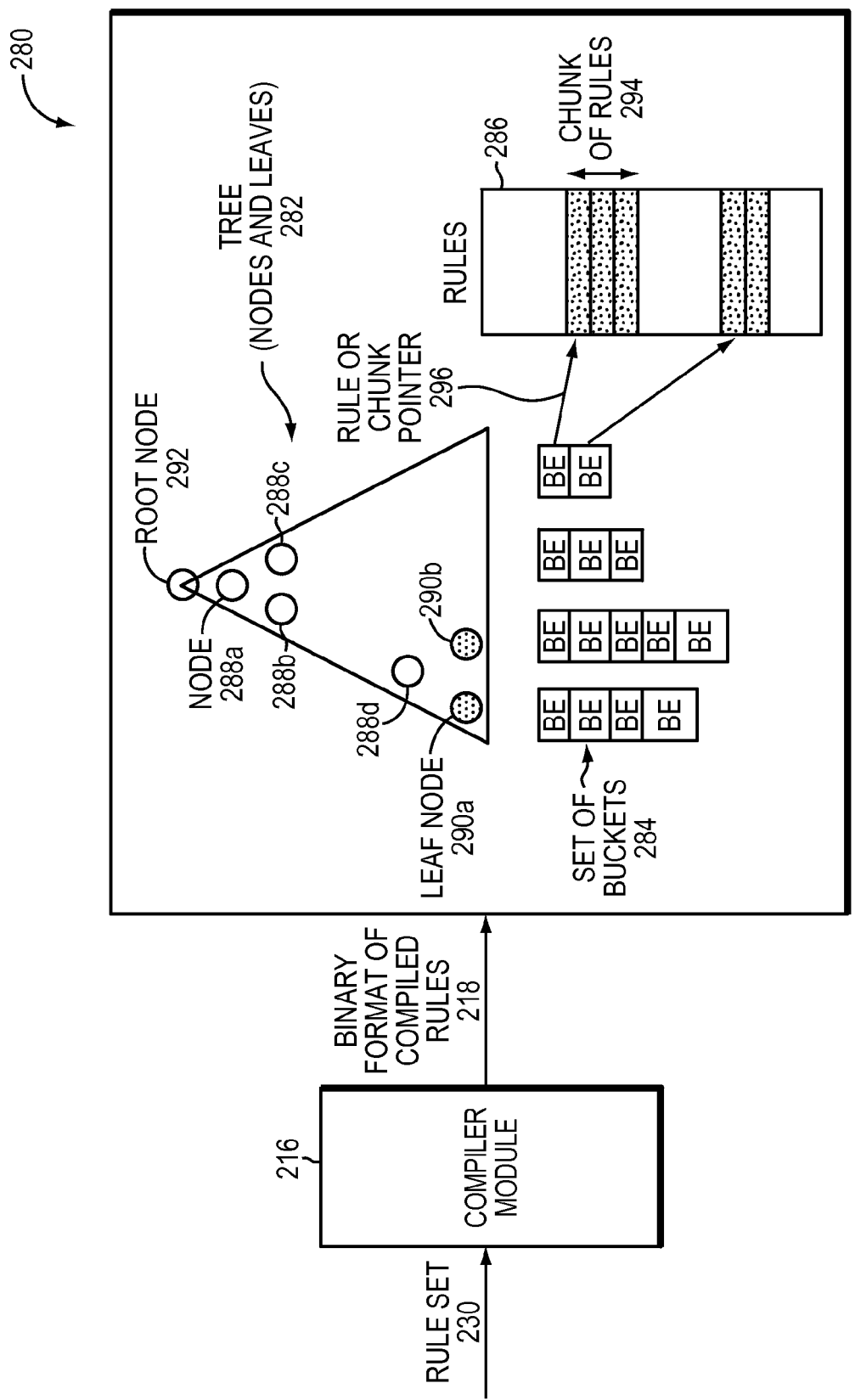
FIG. 2B is a block diagram illustrating an example embodiment of the compiler module loading rules into a memory structure.

FIG. 2B is a block diagram illustrating an example embodiment of the compiler module 216 loading rules into a memory structure. The compiler module 216 receives a rule set 230. The compiler module 216 generates a binary format of compiled rules (218). The binary format of compiled rules (218) includes a tree 282, buckets 284 and rules 286. The tree 282 includes nodes 288a-d, leaf nodes 290a-b, and a root node 292. Each leaf node 290a-b of the tree 282 points to one of a set of buckets 284. A leaf node may also be referred to herein as a leaf and leaf nodes may be referred to herein as leaves.

Each bucket is a data structure that may include one or more bucket entries. A bucket entry may be a rule, an index to a rule, a pointer to a rule, a pointer to a set of rules, or a pointer to another bucket. A bucket may include entries including any combination thereof. For example, a bucket may have one entry that is a pointer to a rule and one entry that is a pointer to a set of rules, etc.

Each bucket may include bucket entries which may contain rule or chunk pointers 296. The rules 286 may include chunks of rules 294. A chunk 294 (of rules) can be a sequential group of rules, or a group of rules scattered throughout the memory, either organized by a plurality of pointers or by recollecting the scattered chunk 294 (e.g., using a hash function).

The binary format of the decision tree 218 may be downloaded to the data plane apparatus 226 over an interface 232. The interface 232 may be a Peripheral Component Interconnect Express (PCIe) interface, Intelligent Interface Controller (I2C) interface, or any other suitable interface that may be known to one skilled in the art.

The data plane apparatus may include a packet processing module 234 that includes a data plane processor 204 coupled to a data plane memory 236. The packet processing module 234 may be coupled to a classifier module 206 that may also be included in the data plane apparatus 226. The classifier module 206 may include a search processor 238 that may be coupled to a search processor memory 240. The data plane processor 204 may be coupled to the search processor 238 by an interface, such as an Interlaken look aside interface, or any other suitable interface that may be known by one skilled in the art.

The binary format of the decision tree 218 may be downloaded to the classifier module 206 over the interface 242 and stored as the Rule Compiled Data Structure (RCDS) 214 that may be included in the search processor memory 240. Alternatively, the binary format of the decision tree 218 may be downloaded over interface 244 to the search processor 238 and stored as the Rule Compiled Data Structure (RCDS) 214. The interface 244 may be an Intelligent Interface Controller (I2C) interface, or any other suitable interface that may be known to one skilled in the art.

The incremental update module 210 may receive a rule, or rule operation, for adding, deleting or modifying rules for the Rule Compiled Data Structure (RCDS). The incremental update module 210 may use the binary format of the decision tree 218 and housekeeping tree 220 to create a change list 222 for atomically updating the Rule Compiled Data Structure 214. The housekeeping tree 220 may be an augmented representation of the Rule Compiled Data Structure (RCDS) 214 including additional information of the tree in order to determine one or more updates for the tree.

The housekeeping tree 220 may include and maintain information for each rule in the tree, such as a cover list. A cover list may include a set of rules that are covered by the rule, or not added to the tree because of a higher priority rule. Covered rules are "useless" rules because they are not matched. By maintaining a cover list at a node for each rule covering one or more other rules of the node, the incremental update module 210 may determine when to add and delete rules. For example, if a rule is to be deleted, the incremental update module 210 may determine to add one or more rules that were not added previously because they were covered by the rule now being deleted. If the covering rule is deleted, the previously "useless" rules may now be useful as there is a possibility that they may be matched on. Cover lists are one example of rule information that may be included and maintained in the housekeeping tree, other rule information may also be included in order to assist the incremental update in determining tree updates.

The change list may specify one or more commands for atomically updating the Rule Compiled Data Structure (RCDS) 214 stored in the search processor memory 240. On the other hand, it may be that an Rule Compiled Data Structure (RCDS) 214 is not stored because the compiler module 216 has not compiled the binary format of the decision tree 218. In that case, the incremental update module 210 may create a change list 222 that creates the Rule Compiled Data Structure (RCDS) 214. The change list 222 may be communicated to the data plane apparatus 226 over the interface 232 and then communicated to the search processor 238 over the interface 242. Alternatively, the change list 222 may be communicated to the search processor 238 over the interface 244. The Rule Compiled Data Structure 214 may be used by an active search process 212 to classify received packets 246.

The packet processing module 234 may be configured to transmit packets 252 and receive packets 246. The data plane processor 204 may send lookup requests 248 to the search processor 238 and receive results 250 from the search processor 238. The search processor 238 may be configured to find one or more rules (matching rules) that match a packet by utilizing the Rule Compiled Data Structure (RCDS) 214. For example, a packet may be broken down into parts, such as a header, payload, and trailer. The header of the packet (or packet header) may be further broken down into fields. The search processor 238 may be configured to find one or more rules that match one or more parts of a received packet.

The lookup request 248 may include a packet header and group identifier (GID). The GID may index an entry in a global definition/description table (GDT). Each GDT entry may include n number of table identifiers (TIDs), a packet header index (PHIDX), and a key format table index (KFTIDX). Each TID may index an entry in a tree location table (TLT). Each TLT entry may identify a lookup engine (e.g., search processor) to look for the one or more matching rules. In this way, each TID may specify both who will look for the one or more matching rules and where to look for the one or more matching rules.

Each table identifier (TID) may also index an entry in a tree access table (TAT). A TAT may be used in the context in which multiple lookup engines, grouped together in a cluster, look for the one or more matching rules. Each TAT entry may provide the starting address, in memory, of a collection of rules (or pointers to rules) called a table or tree of rules. The terms table of rules or tree of rules (or simply table or tree) are used interchangeably throughout the disclosure. The TID identifies which collection or set of rules, such as the Rule Compiled Data Structure 214, in which to look for one or more matching rules.

The packet header index (PHIDX) may index an entry in a packet header table (PHT). Each entry in the PHT may describe how to extract n number of keys from the packet header. The key format table index (KFTIDX) may index an entry in a key format table (KFT). Each entry in the KFT may provide instructions for extracting one or more fields (e.g., parts of the packet header) from each of the n number of keys, which were extracted from the packet header.

Each of the extracted fields, together with each of the TIDs, all of which were derived starting with the lookup request, may used to look for subsets of the rules. Each subset contains rules that may possibly match each of the extracted fields. Each rule of each subset may be compared against an extracted field. Rules that match may be provided in responses (e.g., lookup responses) as results 250.

The lookup request and its enumerated stages, as described above, are being provided merely to present concepts. These concepts may be implemented in numerous ways. For example, according to example embodiments of the present invention, these concepts may be implemented by a search processor, such as the search processor 238.

Figure 3:
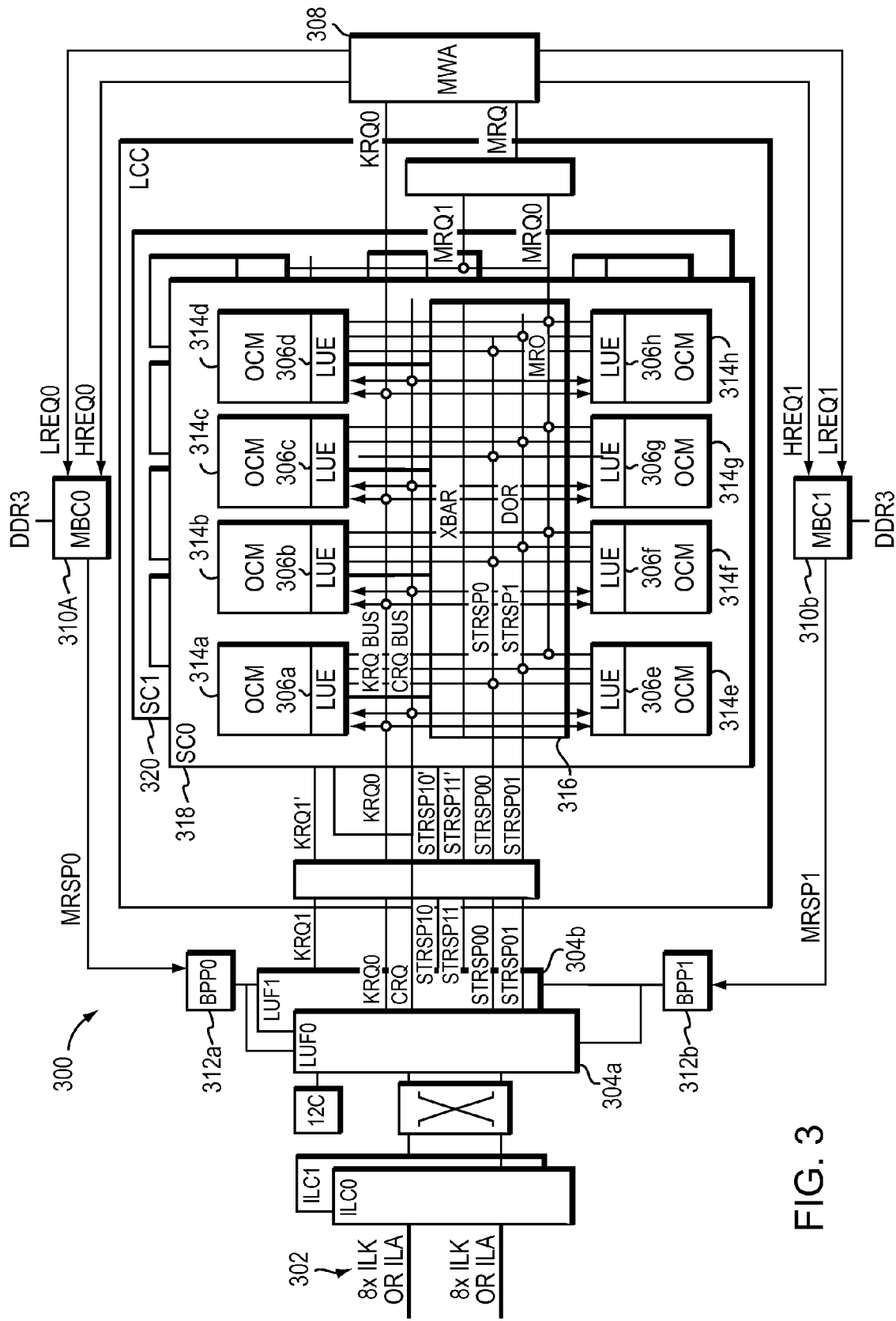
FIG. 3 shows the architecture of one embodiment of a search processor.

FIG. 3 shows the architecture of an example search processor 300 that provides for finding one or more rules that match one or more parts of a packet for packet classification, which may be referred to as "rule processing." The processor includes, among other things, an interface (e.g., Interlaken LA interface) 302 to receive requests from a host (e.g., data plane processor 204) and to send responses to the host; Lookup Frontends (LUFs) 304*a-b* to process, schedule, and order the requests and responses; Lookup Engines (LUEs) 306*a-h* to look for rules, given the request, that match keys for packet classification; memory walker aggregator (MWA) 308 and memory block controllers (MBCs) 310*a-b* to coordinate reads and writes to memory located external to the processor (not shown); and Bucket Post Processors (BPPs) 312*a-b* to look for rules, which are stored in memory located external to the processor (not shown), that match keys for packet classification.

As shown in FIG. 3, the LUE is associated with on-chip memory 314*a-h*. Also shown in FIG. 3, multiple LUE 306*a-h* and their associated on-chip memories 314*a-h*, together with a cross bar device 316 are organized into a super cluster SC0 318. The example search processor may have more than one of such super clusters (e.g., SC0 318 and SC1 320).

Figure 4:
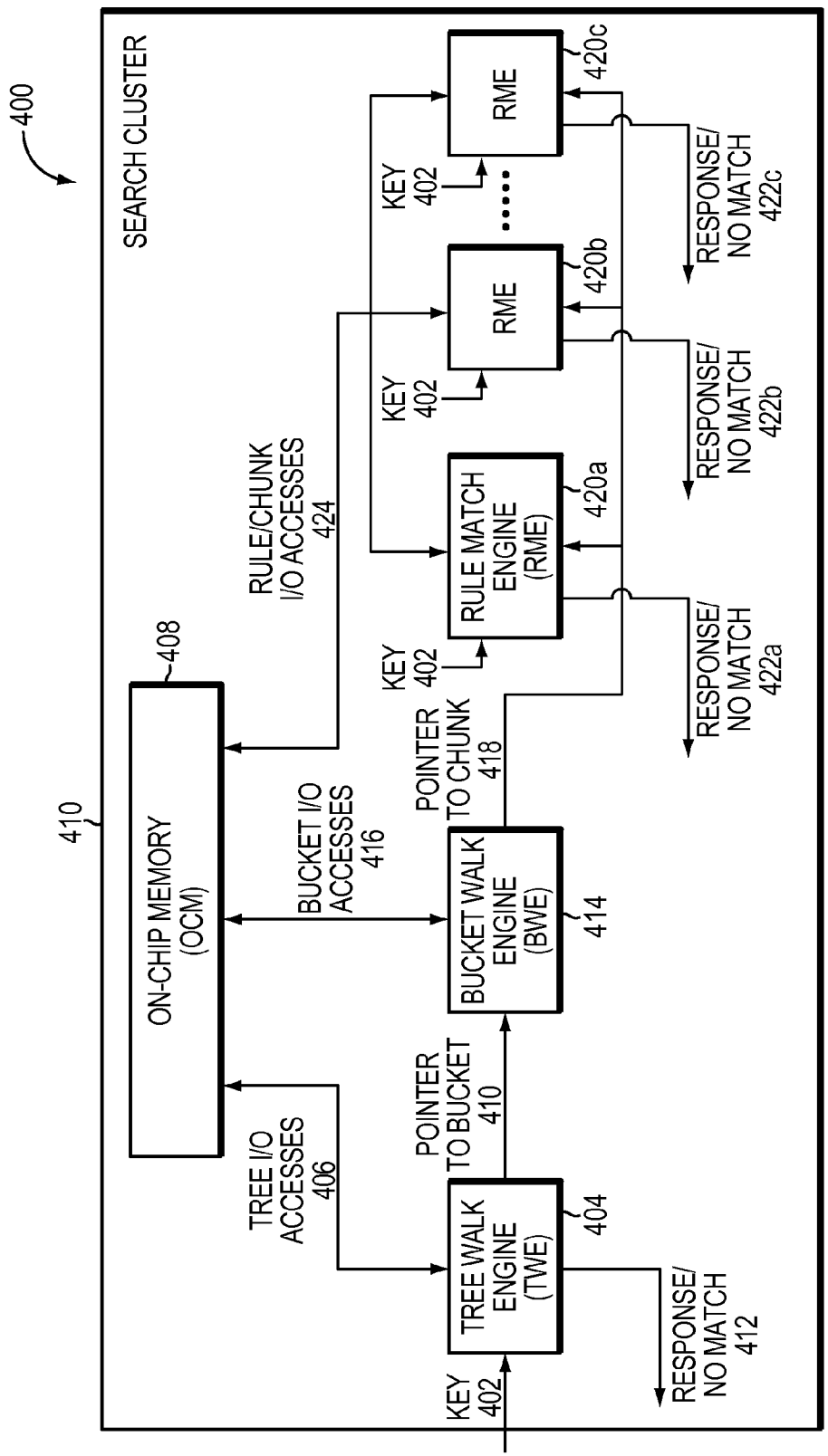
FIG. 4 is a block diagram illustrating an example embodiment of a search block or search cluster.

FIG. 4 is a block diagram 400 illustrating an example embodiment of a search block or search cluster 410. To highlight the operation of the example search processor, in reference to FIG. 2A, the search cluster 410 includes an on-chip memory (OCM) 408, a tree walk engine (TWE) 404, a bucket walk engine (BWE) 414 and a plurality of rule match engines (RMEs) 420*a-c*. The OCM 408 stores the Rule Compiled Data Structure (RCDS) as a tree data structure, a bucket storage data structure, and a chunk and/or rule data structure. The terms tree and Rule Compiled Data Structure (RCDS) are used interchangeably, herein. The tree data structure may include the bucket storage data structure, and the chunk and/or rule data structure.

The search cluster 410 receives a key 402 from the LUF 304*a-b* (FIG. 3) at the TWE 404. The TWE 404 issues and receives a plurality of tree input/output (I/O) accesses 406 to the OCM 408. Based on the key 402, the TWE 404 walks the tree from a root node to a possible leaf node. If the TWE 404 does not find an appropriate leaf node, the TWE 404 issues a no-match 412 (e.g., a no match). Then, if the TWE 404 finds an appropriate leaf node, the leaf node can indicate a pointer 410 to a bucket. The TWE 404 provides the pointer 410 to the bucket to the BWE 414. The BWE 414 accesses the OCM 408 by issuing bucket I/O accesses 416 to the OCM 408. The bucket I/O accesses 416 retrieve at least one pointer 418 to a chunk to the BWE 414. The BWE 414 provides the pointer 418 to the chunk to one of the plurality of RMEs 420*a-c*. The one of the chosen RMEs 420*a-c* also receives the key 402. Each of the plurality of RMEs 420*a-c* are configured to issue rule and/or chunk I/O accesses 424 to the OCM 408 using the pointer 418 to the chunk to download appropriate rules from the chunk in the OCM to analyze the key 402. The RMEs 420*a-c* then analyze the key using the rules accessed from the OCM 408 and issue a response or no-match 422*a-c* corresponding to whether the key matched the rule or chunk indicated by the tree and bucket stored in the OCM 408.

Having provided (in reference to FIG. 1) an overview of the search processor and its implementation of a lookup request, embodiments for incremental update of the Rule Compiled Data Structure (RCDS) 214 are now described. As described, the search processor should add, delete or modify rules without affecting the ability of the search processor to search for one or more rules that match keys, in terms of both performance (e.g., how many packets are searched per a unit of time) and functionality.

Figure 5A:
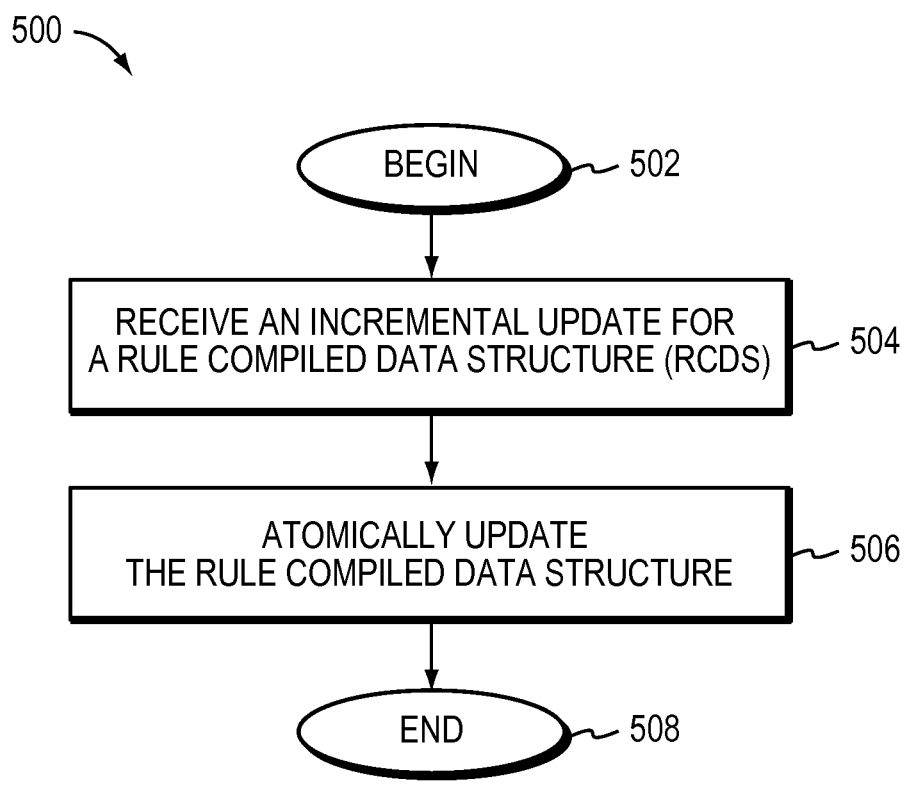
FIG. 5A is a flow diagram of one embodiment of a method for an incremental update for a Rule Compiled Data Structure (RCDS) according to one embodiment.

FIG. 5A is a flow diagram of a method 500 that begins (502) and may receive an incremental update for a Rule Compiled Data Structure (RCDS) (504) according to one embodiment. The Rule Compiled Data Structure (RCDS) may represent a set of rules for packet classification. The Rule Compiled Data Structure (RCDS) may be utilized for packet classification by an active search process and atomically updated based on the incremental update received, from the perspective of the active search process utilizing the Rule Compiled Data Structure (RCDS) (506) and end (508).

Figure 5B:
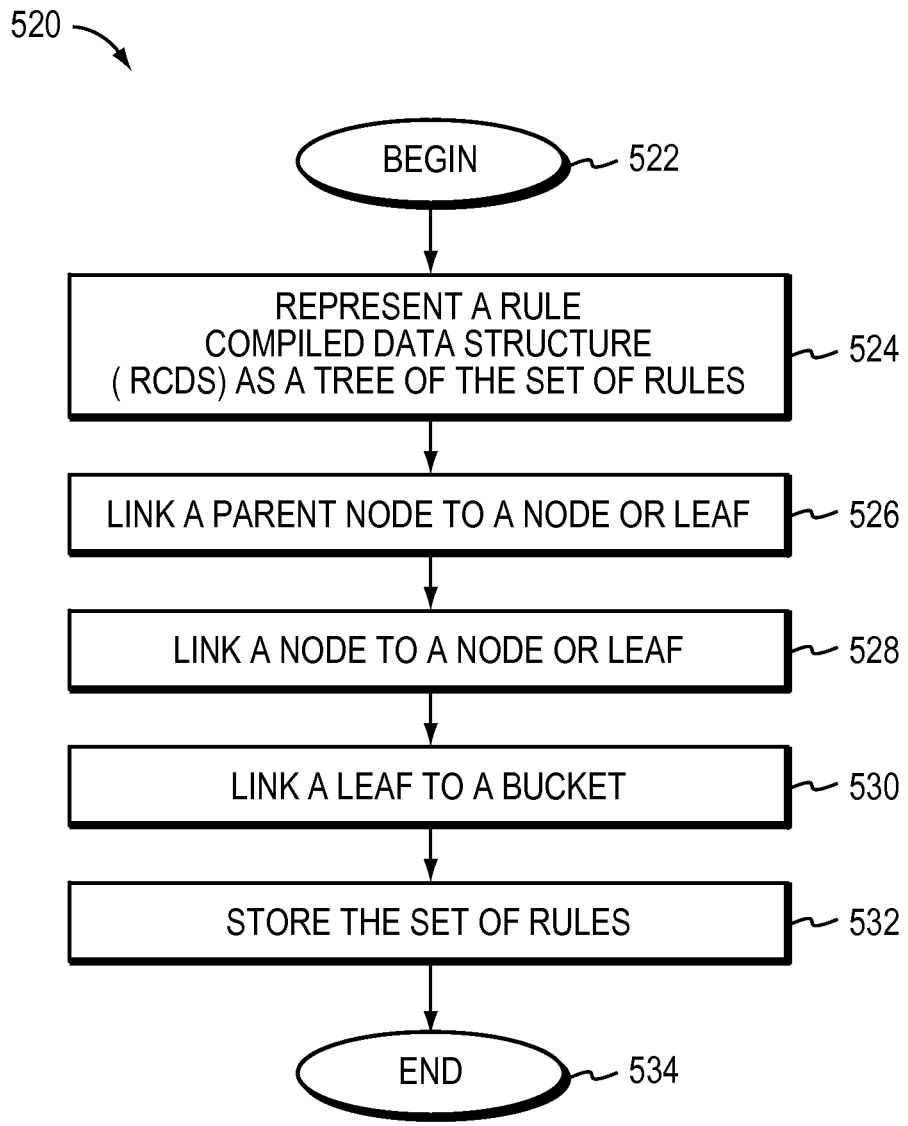
FIG. 5B is a flow diagram of one embodiment of a method for representing a Rule Compiled Data Structure (RCDS).

FIG. 5B is a flow diagram of a method 520 representing a Rule Compiled Data Structure (RCDS) according to one embodiment. The Rule Compiled Data Structure (RCDS) may be represented as a tree of the set of rules, the tree may be a binary data structure including one or more nodes and one or more leaves (524). At least one of the one or more nodes may be represented as a parent node and linked to one or more children, the one or more children may be a node or a leaf (526). The parent node may be linked to the one or more children by pointing the parent node to a sibling list that includes the one or more children. Nodes of the tree may be linked to one or more nodes and one or more leaves of the tree (528). Leaves of the tree may be linked to one or more buckets, each bucket may represent a subset of the set of rules, each bucket may include one or more bucket entries corresponding to the subset of the set of rules (530). The bucket entries may be ordered by increasing or decreasing rule priority. The set of rules may be stored in a rule table, the rules within the rule table being ordered or unordered (532) and the method thereafter ends (534) in the example embodiment.

Regarding functionality, while the search processor performs a search, the search processor should find the state of the rules (or rule table) to be either "before" or "after" a rule is added, deleted or modified. The search processor should not find the state of the rules to be some intermediate state in between "before" and "after" a rule is added, deleted or modified. For example, it should not be the case that while searching, the search processor finds a rule that matches a key some of the time because of rule updating. The addition, deletion or modification of rules without affecting functionality or performance, as described above, is referred to as an "atomic" update, or "atomically" updating.

The challenge to performing an atomic update (or atomically updating) is that any addition, deletion or modification of rules may take more than one update to complete. Some rules cannot be added, deleted or modified in a single update (e.g., a rule cannot be added, deleted or modified by simply changing a bit in that rule).

Figure 6A:
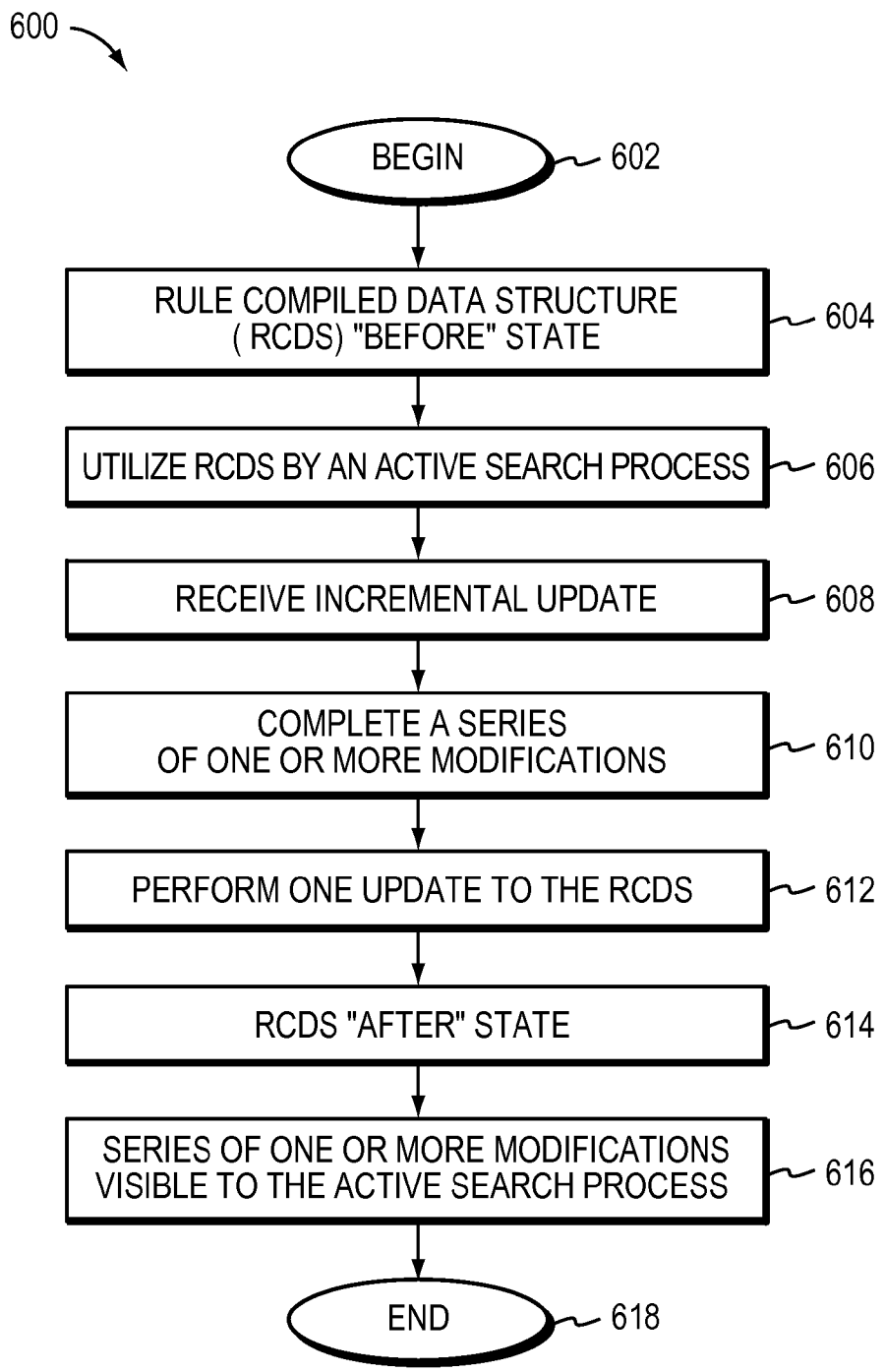
FIG. 6A illustrates a flow diagram of a method for an atomic update of a Rule Compiled Data Structure (RCDS) according to one embodiment.

FIG. 6A illustrates a flow diagram of a method for an atomic update (600) according to one embodiment. The method begins (602). The atomic update may include enabling a given search of the active search process to view the RCDS in either a before state or an after state. The before state may be a state of the RCDS before receiving the incremental update (604). The Rule Compiled Data Structure (RCDS) may be utilized by an active search process (606) and an incremental update may be received (608). The series of one or more modifications is completed based on the incremental update received (610). One update to the Rule Compiled Data Structure (RCDS) may be performed (612). The after state may be another state of the RCDS having the series of one or more updates to the RCDS incorporated, the after state may be made visible to the given search based on a single update to the RCDS being searched (614), and the method thereafter ends (618) according to the example embodiment.

According to techniques disclosed herein, adding, deleting, and modifying a rule appear to take one update from the perspective of a search processor performing an active search. The Rule Compiled Data Structure (RCDS), or tree of rules, or tree, represents a set of rules. The tree is a binary data structure having nodes and leaves. Each leaf of the tree points to a subset of the rules, called a bucket of rules, or bucket. Each of the buckets represents a subset of the rules. Each bucket is a data structure (e.g., an array) containing rules, pointers to rules, pointers to chunks of rules, or any combination thereof, which may be stored in a rule table. Rules (or pointers to rules) within a bucket are ordered by priority (e.g., in increasing or decreasing priority). A rule table is a data structure (e.g., an array) containing the rules. Rules within the rule table may be ordered or unordered.

A rule has, among other things, a priority and one or more fields. In this way, modifying a rule includes modifying a priority and/or one or more fields. To describe modifying a priority of a rule, according to one embodiment, the following example is provided.

A network router maintains, in what may be called a "white list," rules for allowing traffic from particular networks. The white list may also includes a rule for dropping traffic from all networks, called a "default route" or "default rule." The rules may be prioritized such that the router compares traffic against the highest priority rule first, and if no match is found, compares the traffic against the next highest priority rule second. The router may continues comparing, working down the list of rules, until a match is found or until the router reaches the lowest priority rule, the default route, in which case the traffic is dropped.

The white list may be compromised and the router may be allowing offending traffic. Instead of going through each rule to find the rule that is allowing the offending traffic (which may be time consuming) an operator or administrator of the router may "reprioritize" the rules by changing the priority of the default route from the lowest to the highest priority. Giving the default route the highest priority stops all traffic including the offending traffic.

Modifying a priority of a rule, according to one embodiment, includes determining if changing the priority of the rule conflicts or overlaps a priority of another rule. Using the white list example above, assume the highest priority rule has a priority of 0 and there is no priority higher than 0. There is a conflict if the priority of the default route is changed to 0. In the case of conflicting priority, the priority of the rule and the priority of another rule may be updated. In the case of no conflicting priority (e.g., the highest priority rule has a priority of 1 and the priority of the default route is changed to 0), the priority of the rule is modified without deleting and adding rules. To describe modifying a field of a rule, according to one embodiment, the following example is provided.

Figure 6B:
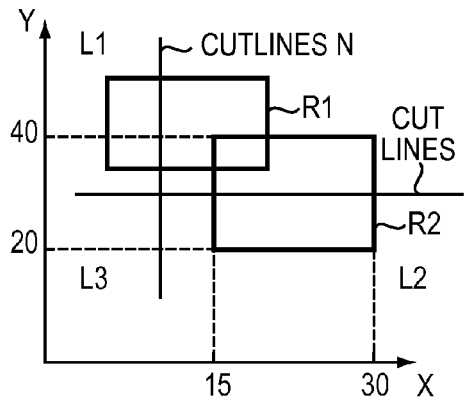
FIG. 6B illustrates a rule represented by a graph.

FIG. 6B illustrates a rule with 'n' fields can be represented by an 'n'-dimensional graph, in which each field is represented by a dimension. For example, FIG. 6B shows two rules, R1 and R2, as boxes. In the example illustration of FIG. 6B each rule has two fields, X and Y that are represented in FIG. 6B as dimension-X and dimension-Y. A side along the dimension-X represents a range of values (or a prefix) for field X. For example, as shown in FIG. 6B, the side of the box representing R2 along the dimension-X represents field X with a range of 15-30. Similarly, a side along the dimension-Y represents a range of values (or a prefix) for field Y. For example, as shown in FIG. 6B, the side of the box representing R2 along the dimension-Y represents field Y with a range of 20-40. The graph of FIG. 6B may be represented as a tree, having nodes and leaves, by "cutting" rule space that contains R1 and R2 with "cut lines," as shown in FIG. 6B.

Figure 6C:
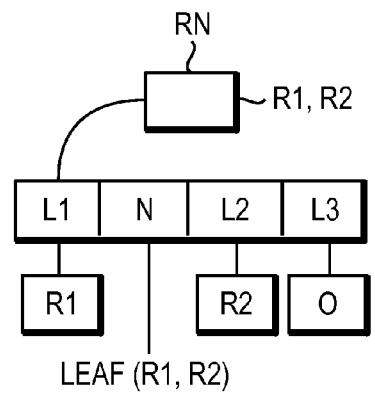
FIG. 6C shows an embodiment of a tree resulting from cutting rule space.

FIG. 6C shows a tree resulting from cutting rule space including R1 and R2 as shown in FIG. 6B. The tree has a root node (RN), node (N), and leaves (L1, L2, and L3). N points to leaves representing rules R1 and R2. Leaf L1 points to a bucket containing the rule R1; leaf L2 points to a bucket containing the rules R1 and R2; and leaf L3 points to a bucket containing no rules.

Figure 6D:
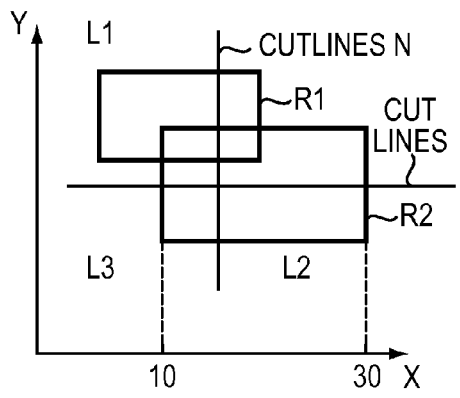
FIG. 6D shows an embodiment of a rule field change.

FIG. 6D shows for the rule R2, the range of field X changed from 15-30 to 10-30.

Figure 6E:
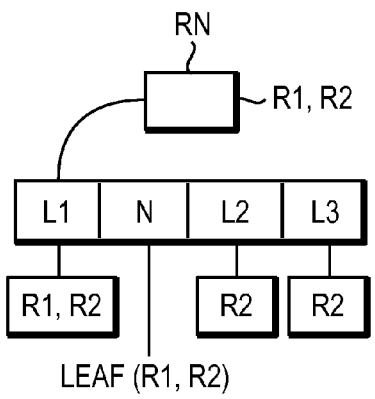
FIG. 6E shows an embodiment of a tree resulting from cutting rule space.

FIG. 6E shows a tree that result from cutting rule space including R1 and "modified" rule R2 with the same cut lines of FIG. 6B. As FIGS. 6C and 6E show, modifying field X of the rule R2 requires adding rule R2 to the bucket pointed to by leaf L1 and to the bucket pointed to by leaf L3. The rule may be added to the buckets as described by techniques disclosed herein.

Figure 6F:
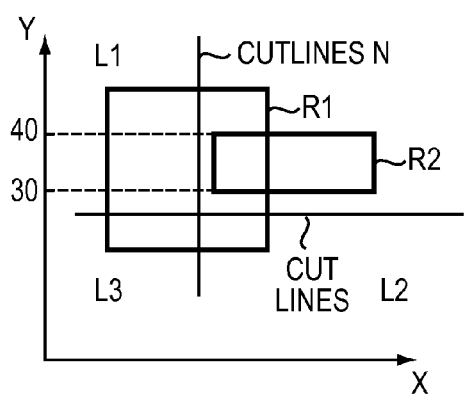
FIG. 6F shows an embodiment of a rule field change.

FIG. 6F shows for the rule R2, the range of field Y changed from 20-40 to 30-40.

Figure 6G:
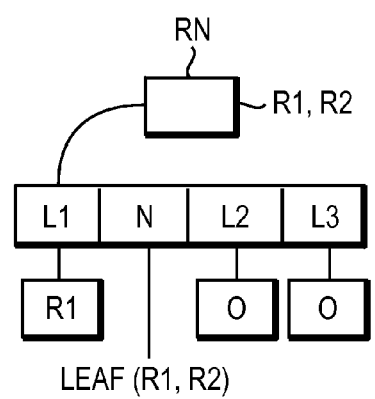
FIG. 6G shows an embodiment of a tree resulting from cutting rule space.

FIG. 6G shows a tree resulting from cutting rule space including R1 and "modified" rule R2 with the same cut lines of FIG. 6B. As FIGS. 6C and 6G show, modifying field Y of rule R2 requires deleting rule R2 from the bucket pointed to by leaf L2. The rule may be deleted from the bucket as described by techniques disclosed herein.

Figure 6H:
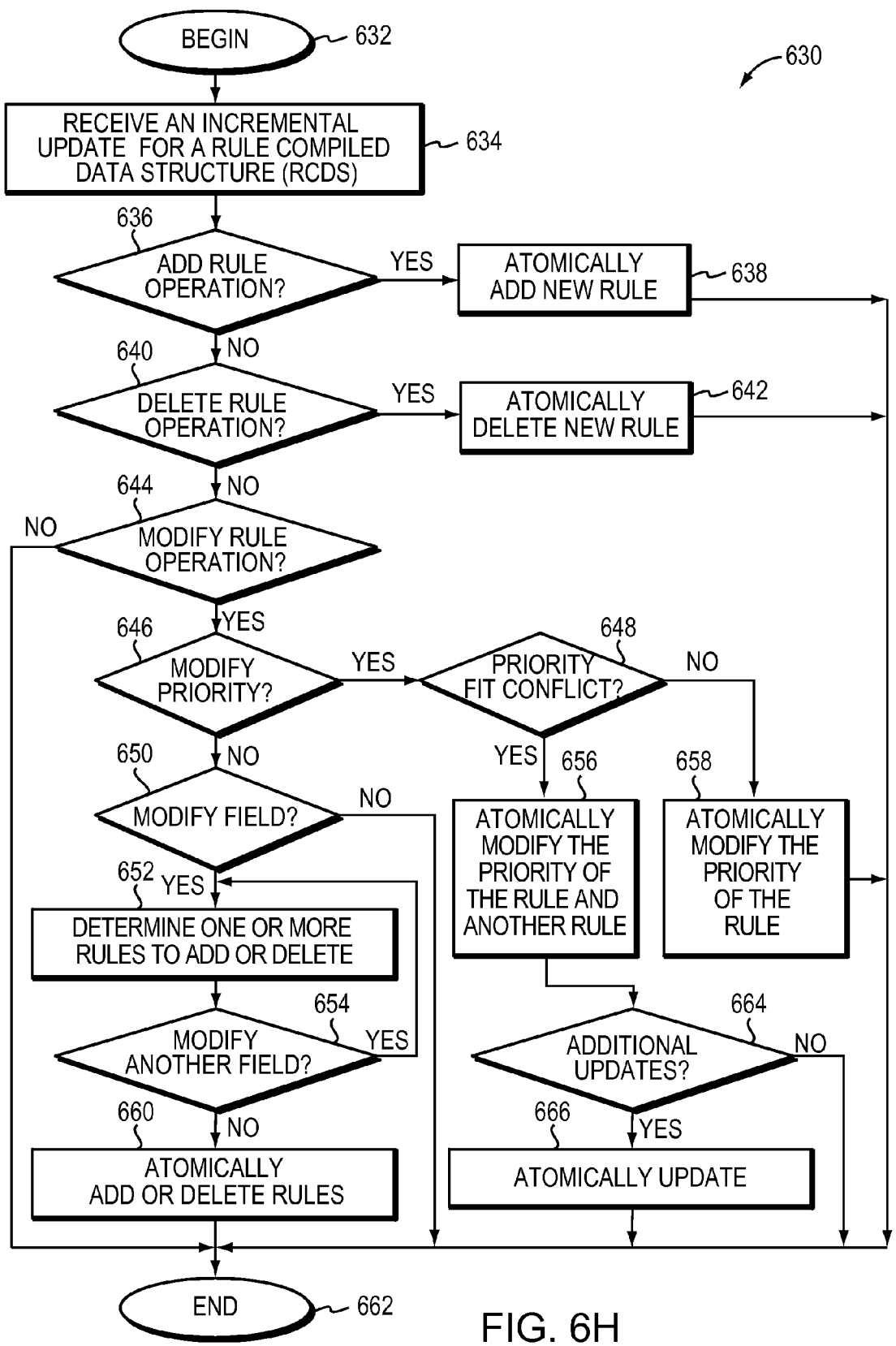
FIG. 6H illustrates a flow diagram of a method for modifying a rule according to one embodiment.

FIG. 6H illustrates a flow diagram of a method 630 for modifying a rule according to one embodiment. The method begins (632) by receiving an incremental update for a Rule Compiled Data Structure (RCDS). If the incremental update is an add rule operation (636) the new rule may be atomically added to the Rule Compiled Data Structure (RCDS) (638) according to embodiments described herein and the method thereafter ends (662) in the example embodiment. If the incremental update is a delete rule operation (640) the rule may be atomically deleted from the Rule Compiled Data Structure (RCDS) (642) according to embodiments described herein and the method thereafter ends (662) in the example embodiment. A check may be made to determine if the incremental update is a modify rule operation (644). Modifying the rule may include at least one of: modifying a priority of the rule or modifying at least one field of the rule.

If the rule is to be modified, a check may be made to determine if the rule priority is to be modified (646). If the priority is to be modified a check may be made to identify a priority fit conflict based on a change in priority of the rule being inconsistent with a current priority ordering of the rule and one or more other rules (648). If the priority fit conflict is not identified the priority of the rule may be atomically modified (658) and the method thereafter ends (662) in the example embodiment. If the priority fit conflict is identified, the priority of the rule and priority of another rule may be atomically modified (656). After priorities of rules are shifted around, new cover lists may be needed or updates to existing cover lists may be needed based on whether or not rules of the node cover other rules of the node due to the priority changes. As such, additional updates may be needed to remove covered rules from the node or to add rules to the node that have been uncovered due to the priority updates. A check may be made to determine if such additional updates are needed (664). If not, the method thereafter ends (662) in the example embodiment. If yes, the additional updates may be atomically incorporated (666) and the method thereafter ends (662) in the example embodiment. If the priority is not being modified, a check may be made to determine if at least one field of the rule is to be modified (650). If not, the method thereafter ends (662) in the example embodiment. If at least one field is to be modified, a determination may be made for identifying one or more rules that need to be added or deleted (652). In some cases, modifying a field of a rule may involve modifying the field without adding or deleting rules. A check may be made to determine if another field is being modified (654) and iterate to identify the one or more rules that need to be added or deleted (652). If there are no more fields to be modified, the one or more rules determined may be added or deleted and adding or deleting the one or more rules determined is atomic (660) and the method thereafter ends (662) in the example embodiment.

Rules may be added to a bucket until an upper limit is reached. Capping the number of rules that can be added to a bucket avoids making a search of the tree into a linear search of buckets. When the upper limit is reached, it can be said that there is no "space" in a bucket to add a rule. When adding a rule to a bucket that "fits," in terms of both space and priority, the rule is simply added to the end of the bucket. The rule and its priority are appended to the rule table. A rule may include its priority.

By including a rule priority, it may not be necessary to shuffle (move) rules in memory in order to realize a specific priority order. According to one embodiment, the priority of a rule or rules may be updated instead. Rule priority may be assigned in blocks. Holes (e.g., priority differential) may be present between rules in a bucket. A priority fit may be determined base on determining that holes that are present. If a rule's modified priority fits in a priority hole, other rules may not need to have their priority adjusted. In addition, rules included in a bucket (either directly or indirectly via pointers as disclosed herein) may have a same priority if the rules do not compete for a match. A priority fit may be determined even if the priority of a rule is being modified to a priority that is the same as another rule in the bucket.

Figure 7:
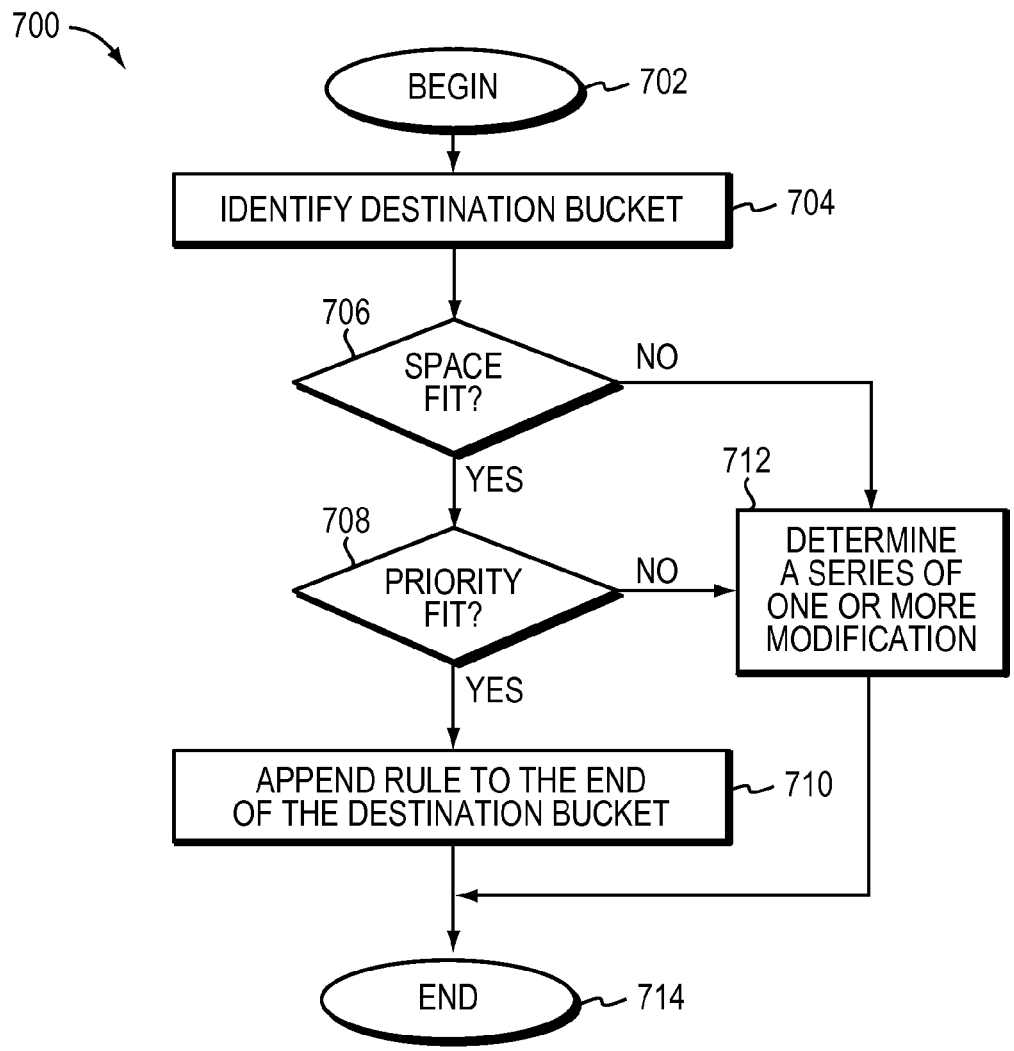
FIG. 7 is a flow diagram of adding a rule that may fit in a bucket according to one embodiment.

FIG. 7 is a flow diagram 700 of adding a rule that may fit in a bucket. The method begins (702) and identifies a destination bucket from among the one or more buckets to include the new rule (704). A check is made to determine if there is space fit (706). Space may be based on an adjustable threshold for the number of bucket entries that may be included in a bucket. If there is space fit, a check is made to determine if there is a priority fit (708). If there is a space fit and a priority fit the new rule may be appended to the end of the destination bucket. Appending the new rule to the end of the destination bucket takes one update (710). If there is no space fit or a priority fit a series of one or modifications may be determined (712) and the method thereafter ends (714) in the example embodiment.

For example, according to one embodiment, when adding a rule to a bucket that does not fit priority-wise (e.g., adding the rule to the end of the bucket results in an incorrect priority order), a "new" bucket is created. The new bucket may include the rules from the "old" bucket and the new rule being added in the correct priority order. The link from the tree (leaf) to the old bucket may be replaced with a new link from the tree to the new bucket. Establishing this new link to the new bucket is done in one update (which is one part of adding a new bucket) so as not to affect performance or any active searches being performed on the tree.

Figure 8A:
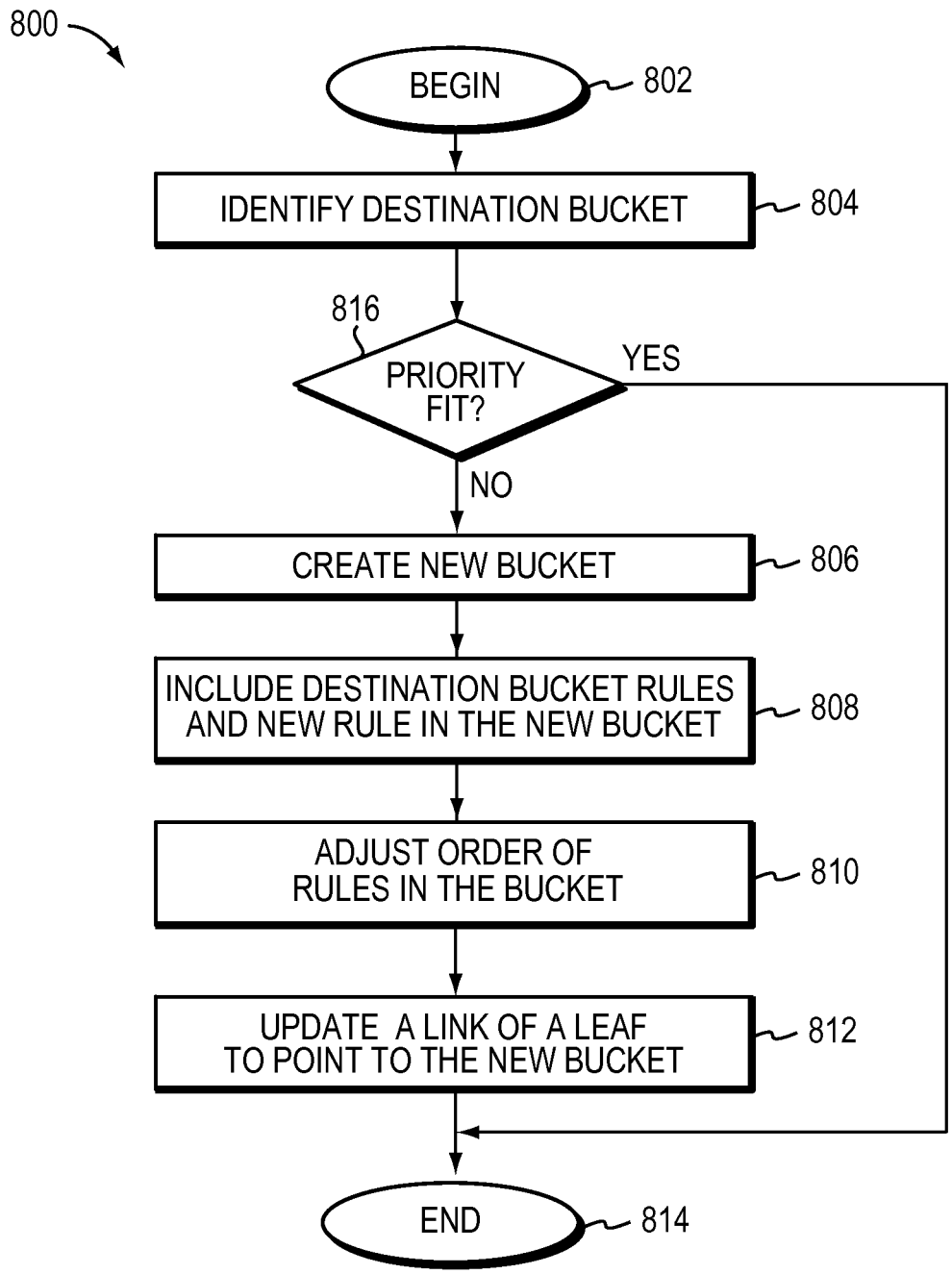
FIG. 8A is a flow diagram of the series of one or more modifications according to one embodiment.

FIG. 8A is a flow diagram of the series of one or more modifications that may be determined, according to one embodiment, if adding a rule to a bucket does not fit priority-wise. The method (800) begins (802) and identifies a destination bucket from among the one or more buckets to include the new rule (804). A check may be made as to whether or not the new rule fits priority-wise (816). If the new rule does not fit, a new bucket may be created based on determining the priority associated with the new rule being inconsistent with a priority ordering of rules in the destination bucket (806). The active search process is unaffected by the new bucket created. The set of rules of the destination bucket may be included in the new bucket (808). The order of the set of rules and the new rule may be adjusted based on increasing or decreasing priority order (810). A link of a leaf in the tree may be updated to point the leaf to the new bucket, the link update takes one update (812) and the method thereafter ends (814) in the example embodiment.

Figure 8B:
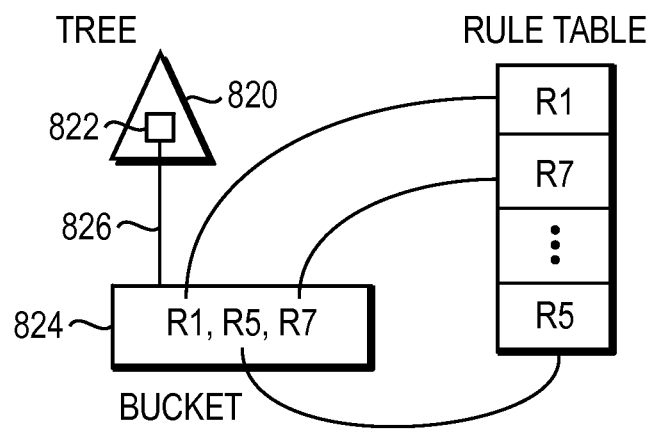
FIG. 8B illustrates a tree with a leaf pointing to a bucket according to one embodiment.

FIG. 8B illustrates a tree 820 with a leaf 822 pointing 826 to a bucket 824. The (old) bucket includes, in decreasing priority, rules R1, R5, and R7.

Figure 8C:
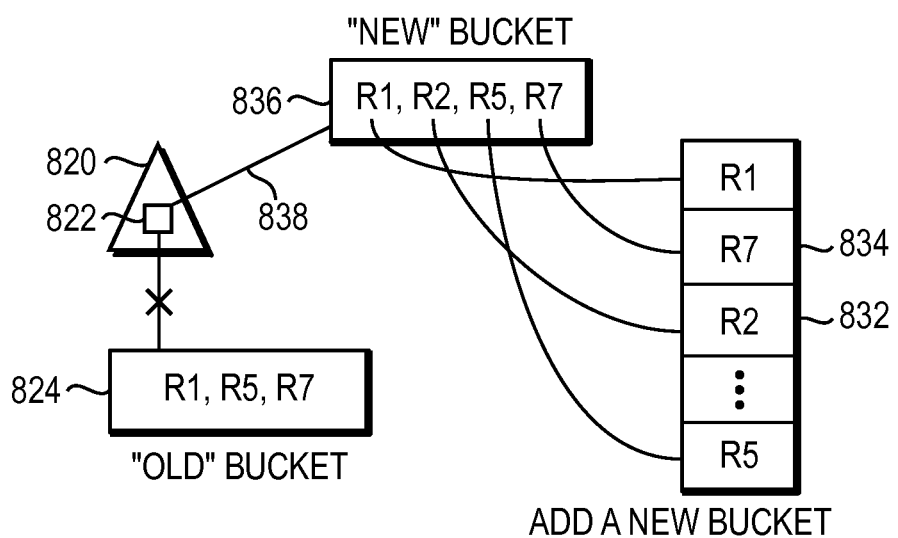
FIG. 8C shows, according to one embodiment, to add a rule, which has a higher priority than another rule, a new bucket may be created.

FIG. 8C shows, according to one embodiment, to add rule R2 832, which has a higher priority than rule R7 834, a new bucket 836 is created. The new bucket 836 includes, in decreasing priority, rules R1, R2, R5, and R7. In one update, the leaf is made to point 838 to the new bucket 836 instead of the old bucket 824.

When there is no space in a bucket to add a rule, according to one embodiment, a subtree is created, the rule is added to a bucket of the subtree, and a leaf of a tree is updated to point to the subtree.

Figure 9A:
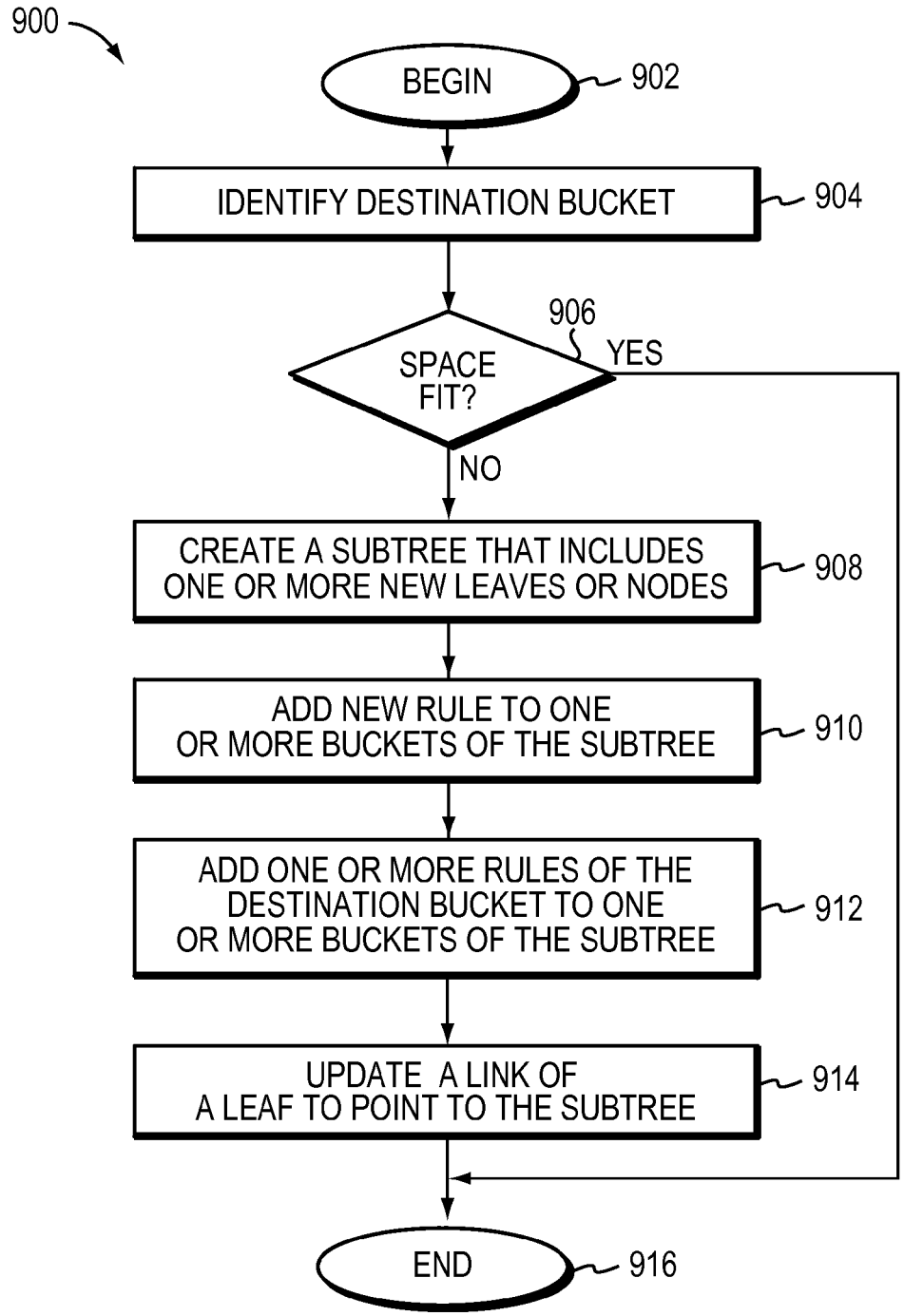
FIG. 9A is a flow diagram of an embodiment of a method that creates a subtree.

FIG. 9A is a flow diagram of an embodiment of a method that creates a subtree and atomically adds a new rule to the tree (900). The method begins (902) and identifies a destination bucket from among the one or more buckets to include the new rule (904). A check is made for a space fit in the bucket for the new rule (906). Lack of space in the destination bucket may be determined based on an adjustable maximum number of rules set for the destination bucket. If there is space the method thereafter ends (916) in the example embodiment, and may add the rule according to other embodiments disclosed herein. If there is no space fit, a subtree may be created based on determining lack of space in the destination bucket for the new rule, the subtree may include one or more nodes and leaves (908). The active search process is unaffected by the subtree created. The new rule may be added to one or more buckets of the subtree (910). One or more rules of the destination bucket may be added to one or more buckets of the subtree (912). The subtree may be linked to the tree by updating a link of a leaf in the tree to point to the subtree (914). For example, the leaf having a link to the destination bucket from among the one or more buckets may be updated by pointing the leaf to the subtree, thus converting the leaf to a node. The link update takes one update and the new rule is added atomically to the tree.

Figure 9B:
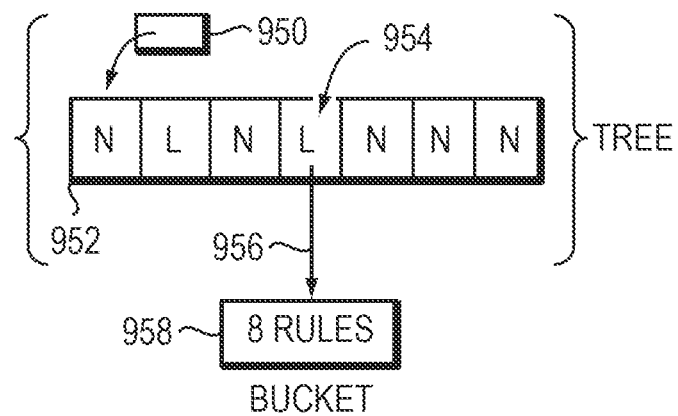
FIG. 9B illustrates an embodiment of nodes and leaves of a tree.

FIG. 9B illustrates nodes and leaves of a tree. A parent node 950 points to a sibling list 952 (e.g., a list of children) that includes nodes and leaves. Leaf 954 points 956 to a bucket 958 with eight rules (not shown). In one embodiment, the number of rules per bucket is limited to eight. There is no space to add another rule (e.g., 9th rule) to the bucket. According to one embodiment, a subtree is created.

Figure 9C:
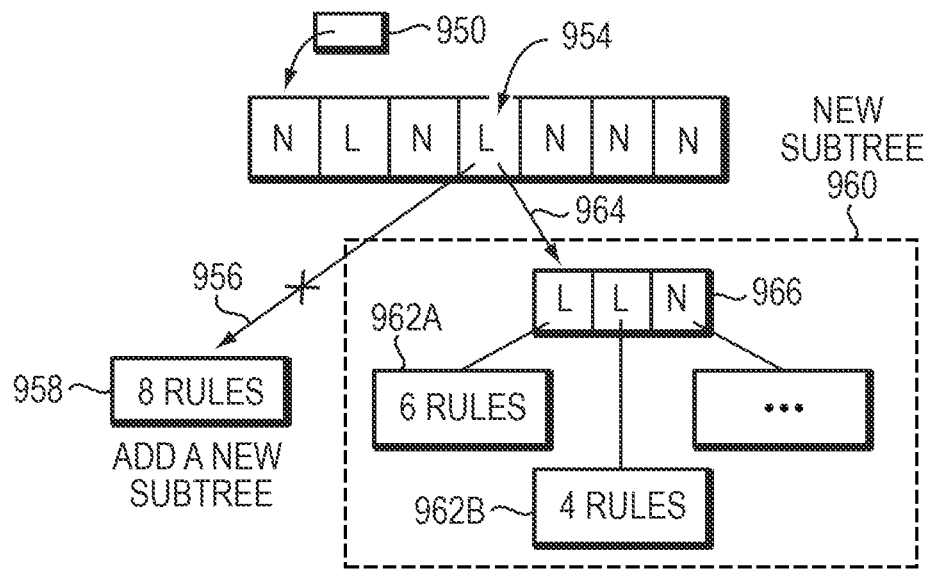
FIG. 9C illustrates creation of new subtree according to one embodiment.

FIG. 9C illustrates a new subtree 960 is created according to one embodiment. The leaf 954 may be converted to a node by pointing 964 the leaf to a new sibling list 966 that may include leaves and nodes. The rule may be added to one or more buckets 962a-b of the subtree 960 (e.g., using one of the add rule mechanisms as disclosed herein).

Creating the subtree may take more time than one update but it does not impact the performance and/or functionality of a search. While the subtree is being created, the subtree and tree are separate and distinct from one another. Therefore, the tree may still be searched without searching the subtree. Once the subtree is created, the leaf is updated to point to the subtree instead of the bucket, making the leaf into a node of the tree. Updating the leaf (which is one part of adding a new subtree) takes one update and is atomic. Because the tree includes the subtree after updating, a search of the tree includes the added rule.

As described earlier, a tree represents a set of rules. When adding a new "area" of a rule to the set (e.g., cutting rules) a leaf, or in some cases a node, is added to the tree. To add a leaf/node to a tree, according to one embodiment, includes creating a sibling list of nodes and leaves including the leaf/node being added and then updating a parent node to point to the sibling list.

Figure 10A:
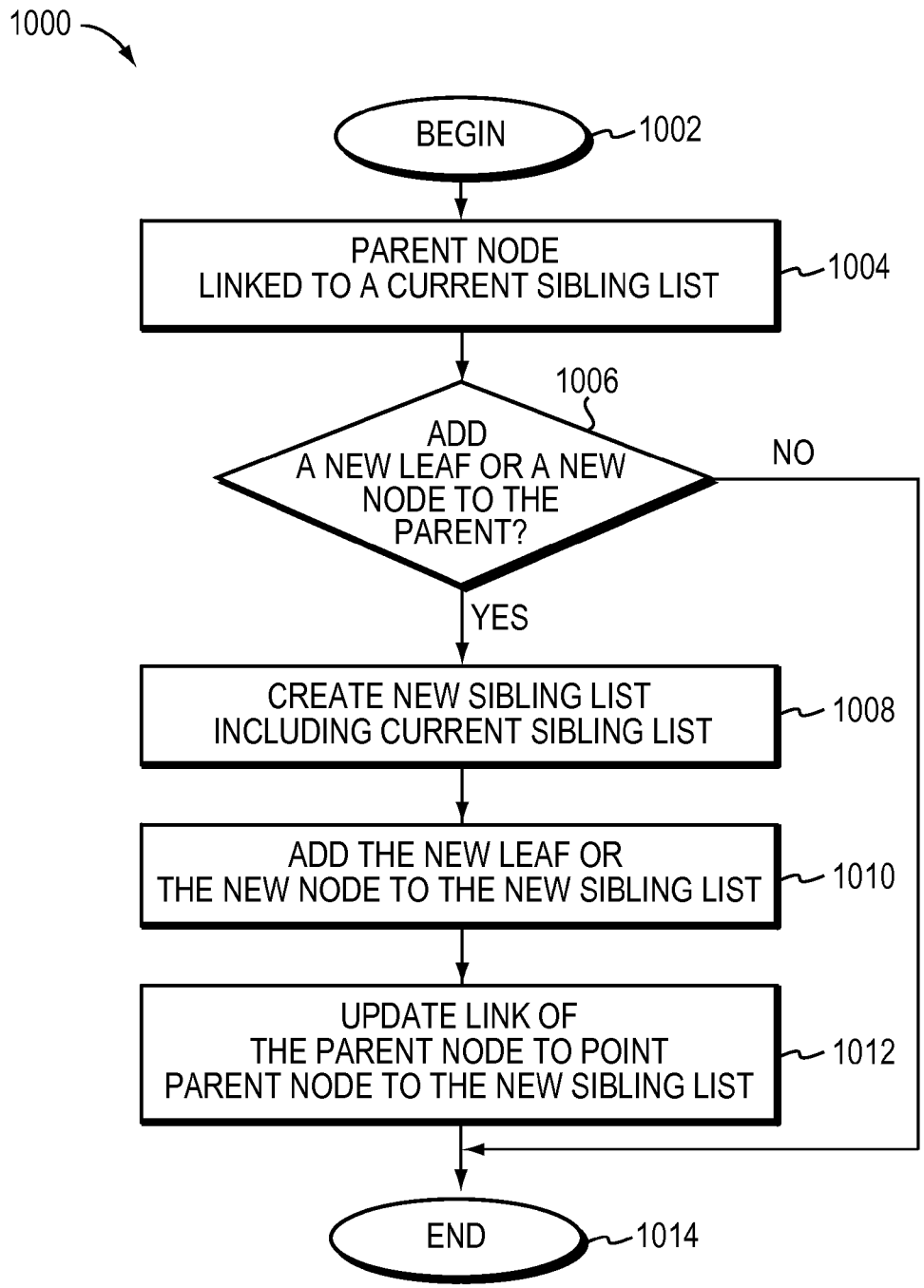
FIG. 10A is a flow diagram of one embodiment of a method for atomically adding a new leaf or a new node to a parent node in the tree.

FIG. 10A is a flow diagram of one embodiment of a method for atomically adding a new leaf or a new node to a parent node in the tree (1000). The parent node in the tree is linked to a current sibling list (1004). The current sibling list may include one or more leaves or one or more nodes. If no determination at (1006) is made to add a new leaf or a new node to the parent, the method thereafter ends (1014) in the example embodiment. A new sibling list may be created if the determination at (1006) is made to add a new leaf or a new node and the active search process is unaffected by the new sibling list created (1008). The new leaf or the new node may be added to the new sibling list, the new sibling list may include the current sibling list (1010). The new sibling list may be included in the tree by updating a link of the parent to point the parent node to the new sibling list (1012). The link update takes one update and the method thereafter ends (1014) in the example embodiment.

Figure 10B:
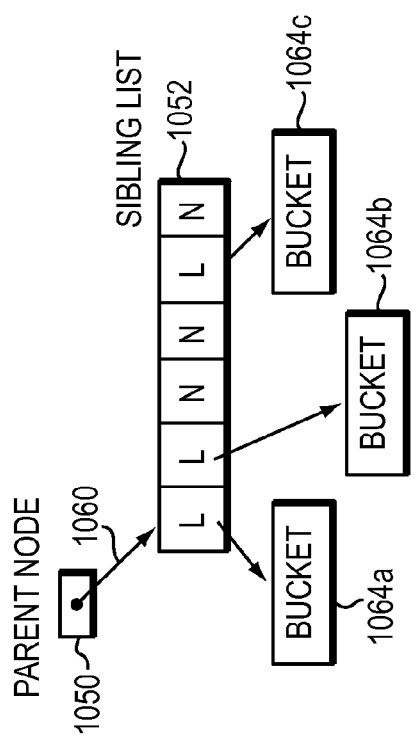
FIG. 10B illustrates a parent node and its children according to one embodiment.

FIG. 10B illustrates a parent node 1050 and its children, which are nodes and leaves arranged in a sibling list 1052 pointed to 1060 by the node 1050. Leaves point to buckets 1064a-c of rules (not shown). According to one embodiment, to add a leaf/node to the tree, a new sibling list with the leaf/node added may be created.

Figure 10C:
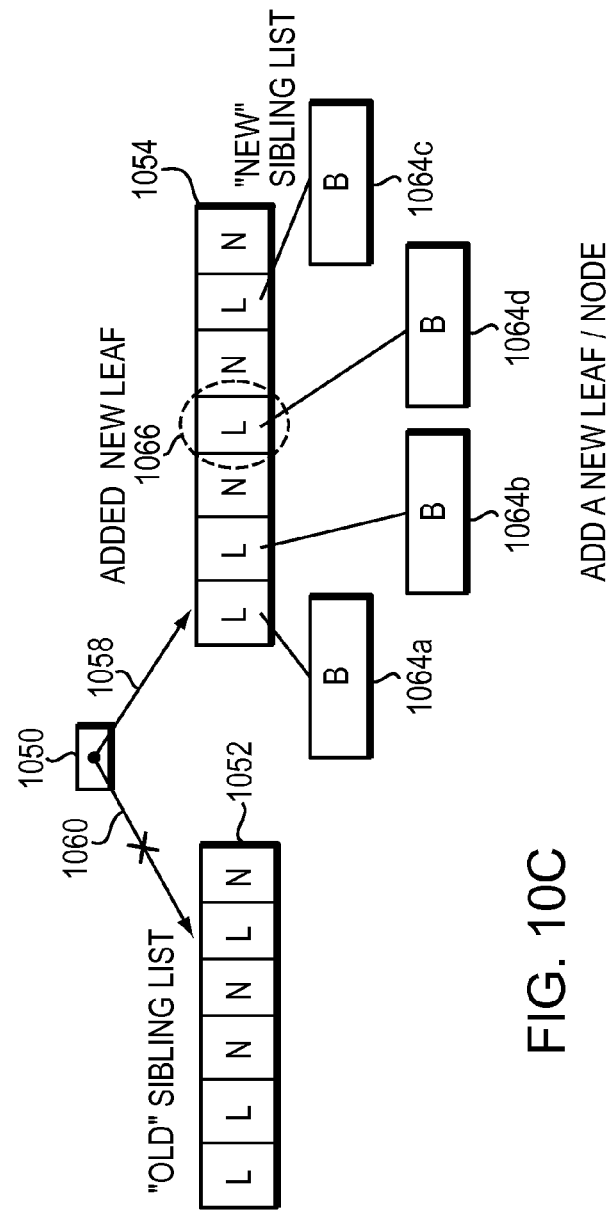
FIG. 10C illustrates that to add a leaf/node to the tree, a new sibling list with the leaf/node added is created according to one embodiment.

FIG. 10C illustrates that to add a leaf/node to the tree, a new sibling list with the leaf/node added is created according to one embodiment. For example, once the new sibling list 1054 is created, the parent node 1050 is updated to point 1058 to the new sibling list instead of pointing 1060 to the old sibling list 1052. A new leaf 1066 is included in the new sibling list 1054. The new leaf 1066 points to a new bucket 1064d of rules (not shown). Updating the parent node 1050 to point 1058 to the new sibling list 1054 takes one update and is atomic.

When a tree of rules (nodes and leaves) and buckets of rules are first created, they are contiguous in memory, e.g., they occupy a memory layout starting at one memory address and ending at another memory address. Over time, adding and deleting rules, as described above, results in "old" leaves and "old" buckets that are no longer referenced. This creates "holes" or "patches" in the memory layout of unused memory. The memory layout is said to be fragmented. To recover these holes or patches in the memory layout, a defragment or defrag mechanism is used. Like the incremental update mechanisms described above, the defrag mechanism is atomic and appears to take one update from the perspective of a search processor performing an active search.

Figure 11A:
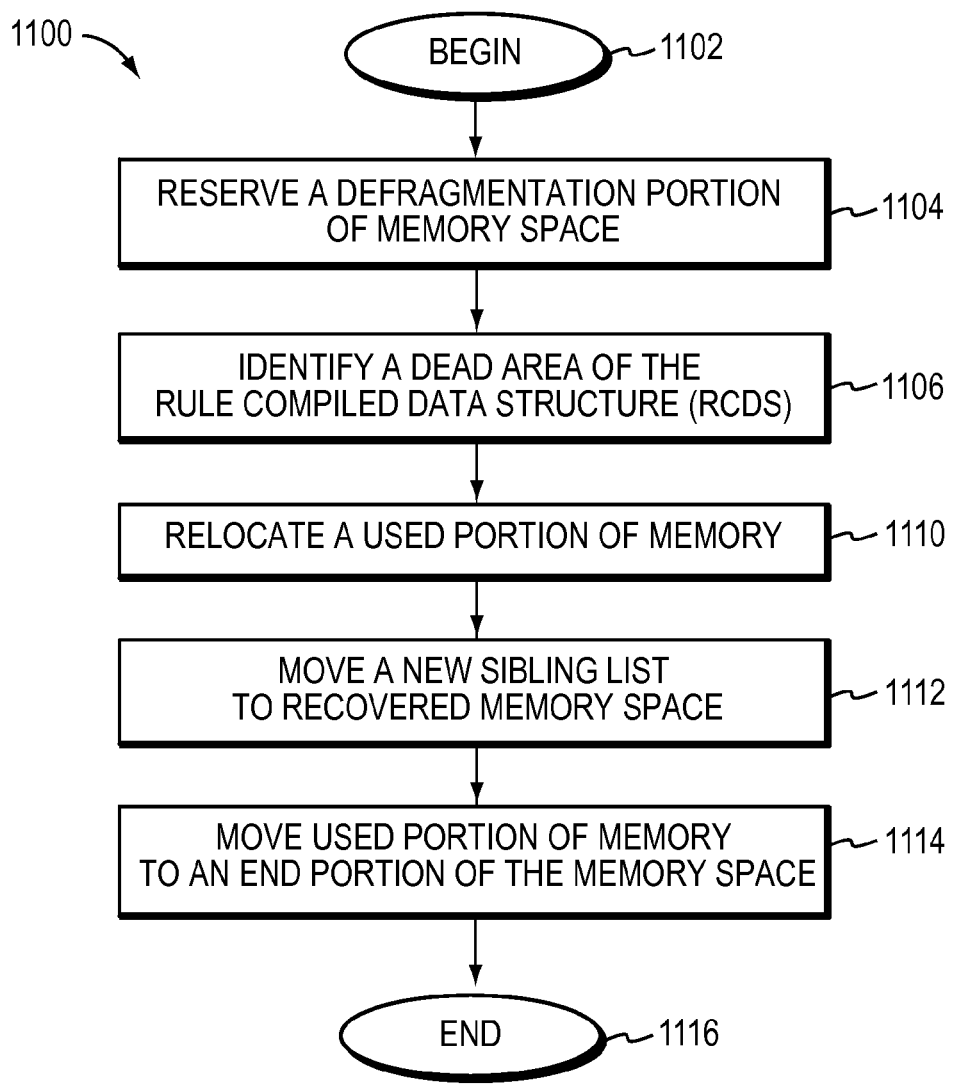
FIG. 11A is a flow diagram of a defragmentation process according to one embodiment.

FIG. 11A is a flow diagram of a defragmentation process according to one embodiment (1100). According to one embodiment, defragmentation may include reserving some portion of memory (e.g., a defrag area or designated area) for the defragmentation process. The method begins (1102) by reserving a defragmentation portion of the memory space, the defragmentation portion of the memory space may be a designated defragmentation area that is a contiguous portion of the memory space reserved at a designated area of the memory space (1104). A dead area of the Rule Compiled Data Structure (RCDS) may be identified (1106). The dead area may be a portion of the memory space being occupied by at least one unreferenced leaf, node, bucket, or sibling list. Recovering the dead area may include relocating a used portion of memory, the used portion including one or more nodes or leaves located adjacent to the dead area identified to the designated defragmentation area (1110).

A new sibling list may be moved to a recovered memory space (1112). The recovered memory space may include the dead area identified and the used portion of memory relocated. The used portion of memory may be relocated out of the defragmentation area to an end portion of the memory space reserved for the Rule Compiled Data Structure (RCDS) (1114) and the method thereafter ends (1116) in the example embodiment. The Rule Compiled Data Structure (RCDS) may be defragmented by recovering the dead area, the active search process is unaffected by the dead area recovered because the Rule Compiled Data Structure (RCDS) is defragmented atomically.

Figure 11B:
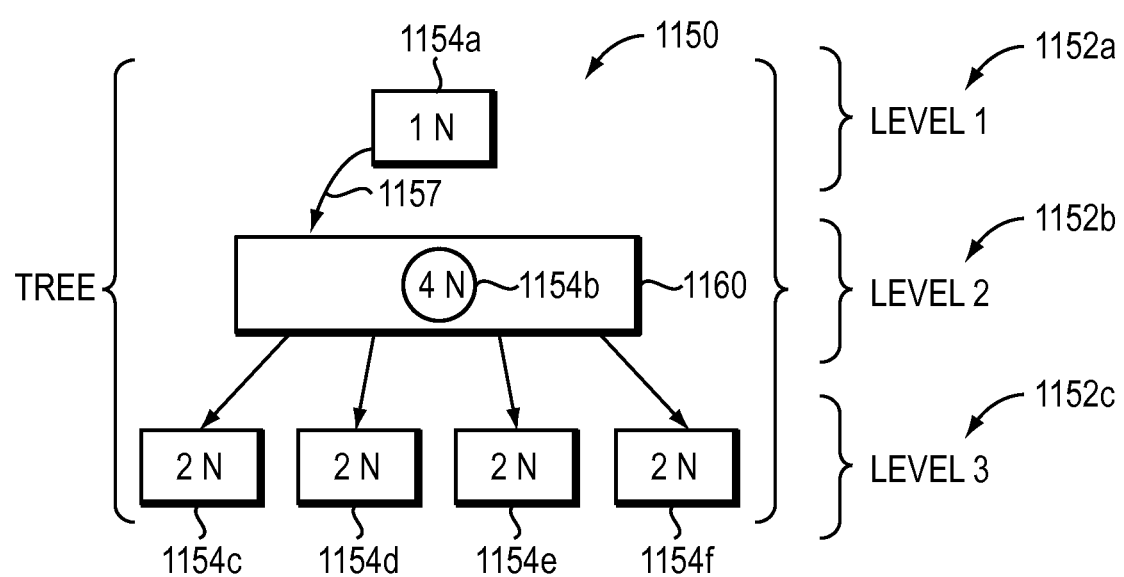
FIG. 11B illustrates one embodiment of a tree with three levels.

FIG. 11B illustrates a tree 1150 with three levels 1152a-c, each level containing one or more nodes 1154a-f. Each node occupies a unit of memory. At level one of the tree 1152a, there is one node 1154a, a root node, which occupies one unit of memory. The parent node points 1157 to a sibling list 1160 that includes four nodes (1154b). At the level two of the tree, there are four nodes (1154b), child nodes of the root node, which occupy four units of memory. At the level three of the tree, there are eight nodes (1154c-f), grandchild nodes of the root node, which occupy eight units of memory.

Figure 11C:
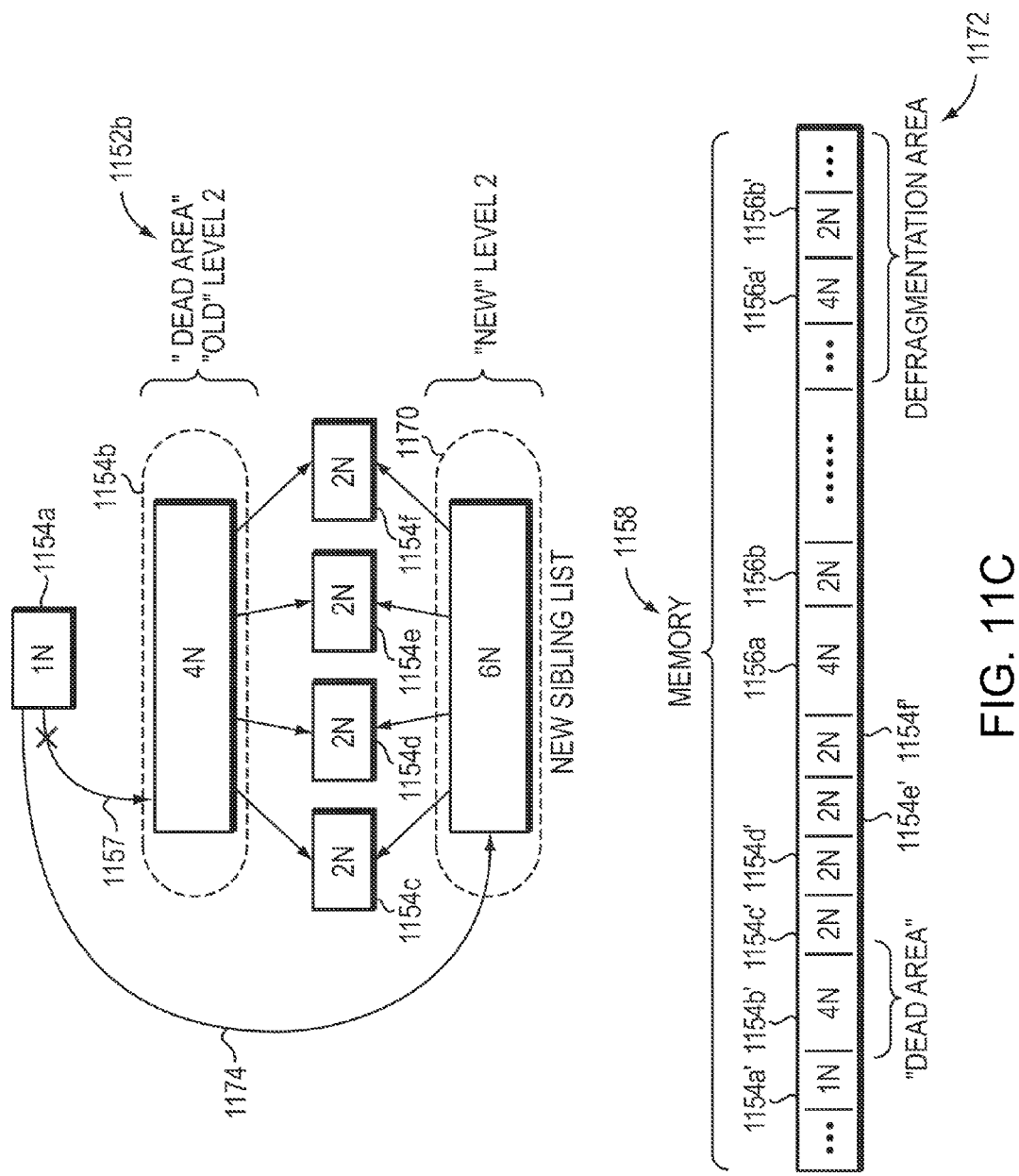
FIG. 11C illustrates adding a rule according to one embodiment.

FIG. 11C illustrates adding a rule, at the level two of the tree (1152b), that includes, according to one embodiment, creating a new sibling list of six nodes (1170), which occupies six units of memory. The new sibling list 1170 cannot be created in the memory space occupied by the "old" level two of the tree (1152b) because there is not enough space, six units of memory are required but only four units of memory (contiguous memory) are available.

Memory space 1158 shows contiguous memory units 1154a'-f' corresponding to nodes 1154a-f. Memory space 1156a and 1156b is allocated for the new sibling list 1170 and the node 1154a link is updated such that it no longer points 1157 to the old sibling list 1154b but instead points 1174 to the new sibling list 1170 located in memory units 1156a-b. The link update takes one update and is atomic. The memory space 1154b', occupied by the "old" level two of the tree is now unused, and illustrates an example of "dead area."

To recover the dead area (e.g., four memory units in this example), space for the new sibling list (six memory units)

may be made by moving, in memory, one or more nodes after the dead area (viz., two nodes at level three of the tree 1152c, which occupy two memory units 1154c'-d') to the dead area 1154b'. The node is moved by copying the memory unit to a different location and updating the node link. Updating the node link for each node moved takes one update and is atomic. The nodes 1154e and 1154f may then be moved by copying the memory units 1154e'-f' to 1154c'-d' and then updating the corresponding links atomically in one update. The new sibling list 1170 may be moved by copying 1156a and 1156b to a location of a designated defragmentation area 1172, for example, by copying 1156a and 1156b to 1156a' and 1156b'. The link from 1154a to the new sibling list 1170 may then be updated in one update and is atomic. The new sibling list 1170 now located in the defragmentation may be moved once again by copying 1156a' and 1156b' to memory units 1154e'-f' and a needed two node portion of 1156a. The new sibling list may be moved by updating the node 1154a link to point to the new sibling list 1170 relocated. Thus the dead area is now recovered and the memory is utilized in a contiguous manner. Optionally, the one or more nodes moved to the defrag area may be moved out of the defrag area to the end of the memory layout occupied by the tree.

According to one embodiment, deleting a rule may include invalidating a rule in a rule table.

Figure 12A:
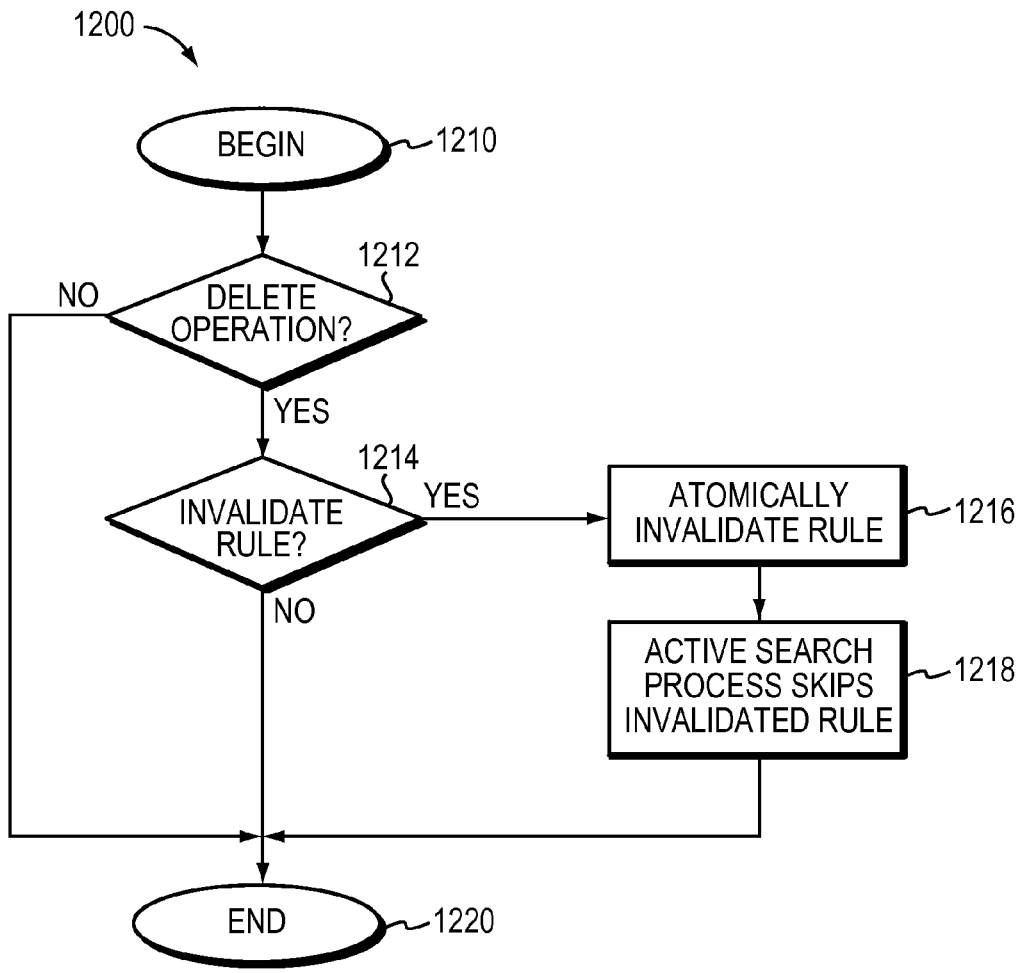
FIG. 12A is a flow chart that illustrates deleting a rule according to one embodiment.

FIG. 12A is a flow chart that illustrates deleting a rule according to one embodiment (1200). The method begins (1210) and determines that a rule is to be deleted (1212). If a rule is not being deleted the method thereafter ends (1220) in the example embodiment. If the rule is being deleted a determination is made to invalidate the rule (1214). If the rule is not being invalidated the method thereafter ends (1220) in the example embodiment. The specified rule in the Rule Compiled Data Structure (RCDS) is deleted atomically based on the incremental update being a delete operation specifying the rule. The rule is invalidated in one update by setting a valid bit corresponding to the rule to invalid. The active search process skips the specified rule invalidated (1218) and the method thereafter ends (1220) in the example embodiment.

FIG. 12B shows a rule table 1202 with rules R1, R2, R3, and R4. A valid bit 1204 may be associated with each of the rules. Setting the valid bit of a given rule (e.g., R1) to (I)NVALID 1206 identifies the rule as an invalid rule. When a rule match engine (RME) compares rules against a key (or other data), the RME skips over the invalid rule, and the rule is effectively deleted.

A leaf of a tree may include a pointer to a bucket of rules (bPtr) and a counter of the number of rules in the bucket (nRule). The counter of the number of rules in the bucket may be included and maintained in the housekeeping tree 220.

FIG. 13 shows a leaf 1302 having a pointer bPtr 1304 to a bucket and a rule counter nRule 1306. When a rule from the bucket is deleted (invalidated), the nRule counter 1306 may be decremented. When the nRule counter 1306 reaches zero, the leaf is said to have zero rules. The bPtr 1304 may be set to null.

When a tree walk engine (TWE) walks a tree, the TWE skips over a leaf with a bucket pointer set to null (e.g., the leaf points to a bucket with zero rules). By skipping over the leaf, a bucket pointed to by that leaf (the bucket associated with the leaf) is not passed to a bucket walk engine (BWE) for processing and the bucket may be deleted by setting the bucket pointer to null.

FIG. 14A illustrates an embodiment for deleting a rule. FIG. 14A illustrates that, when deleting rules, two or more buckets of rules may be merged into a new bucket. FIG. 14A shows a parent node and its children, leaves L1 and L2, and nodes N1 and N2. The children are organized in a sibling list 1404 pointed to 1406 by the parent 1402. Each of the leaves L1 and L2 points to a bucket 1408a-b (B1 and B2) of 5 rules (not shown). A rule is deleted from each bucket, leaving four rules in each bucket.

FIG. 14B shows that to merge the two buckets, according to one embodiment, includes creating a bucket B' 1408c with the eight remaining rules and creating a new leaf L1 1410 pointing to the new bucket B' 1408c. A new sibling list 1412 including L1 is created. The parent node 1402 is updated to point 1414 to the new sibling list (L1, N1, N2) 1412 instead of the old sibling list (L1, L2, N1, N2) 1404. Updating the parent node takes one update (which is one part of merging buckets) and is atomic. Merging buckets may cause one or more subtrees to be recompiled, as described later in detail.

Figure 15:
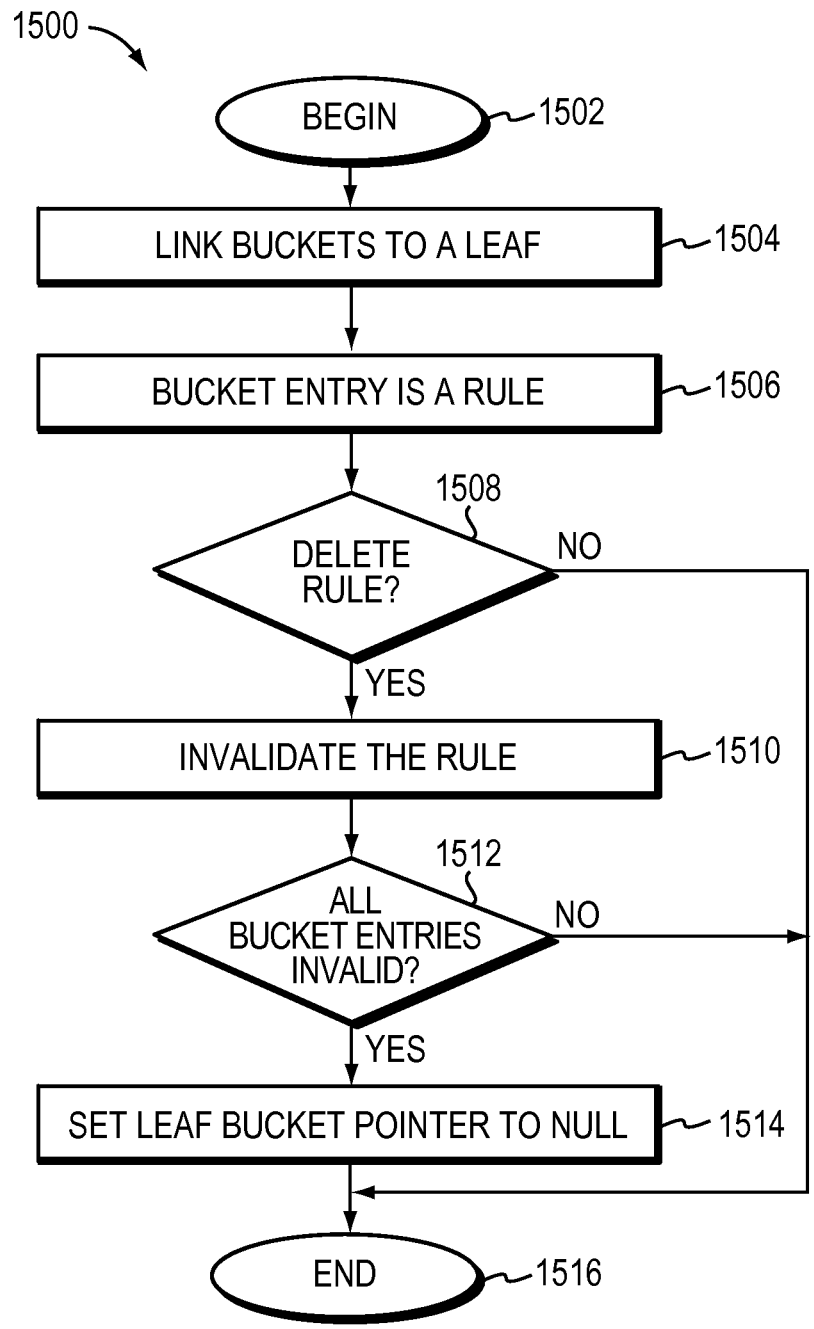
FIG. 15 is a flow diagram illustrating a method for atomically deleting a specified rule from the tree according to one embodiment.

FIG. 15 is a flow diagram illustrating a method for atomically deleting a specified rule from the tree, wherein a bucket entry of a bucket includes the specified rule (1500). The method begins (1502) and the bucket is linked to a leaf by a leaf bucket pointer (1504). The bucket includes a bucket entry that is the specified rule (1506). A check is made for deleting the specified rule (1508), if the rule is not being deleted the method thereafter ends (1516) in the example embodiment. If the specified rule is to be deleted, the specified rule in the bucket entry may be invalidated (1510). A check may then be made to determine if all bucket entries in the bucket are invalid (1512). If the bucket contains at least one valid entry the method thereafter ends (1516) in the example embodiment. If all bucket entries in the bucket are invalid, the link to the bucket may be updated by setting the leaf bucket pointer to null (1514). Invalidating the specified rule and updating the leaf bucket pointer to null take one update. In addition, the active search process may skip a bucket if the leaf bucket pointer is null.

Figure 16:
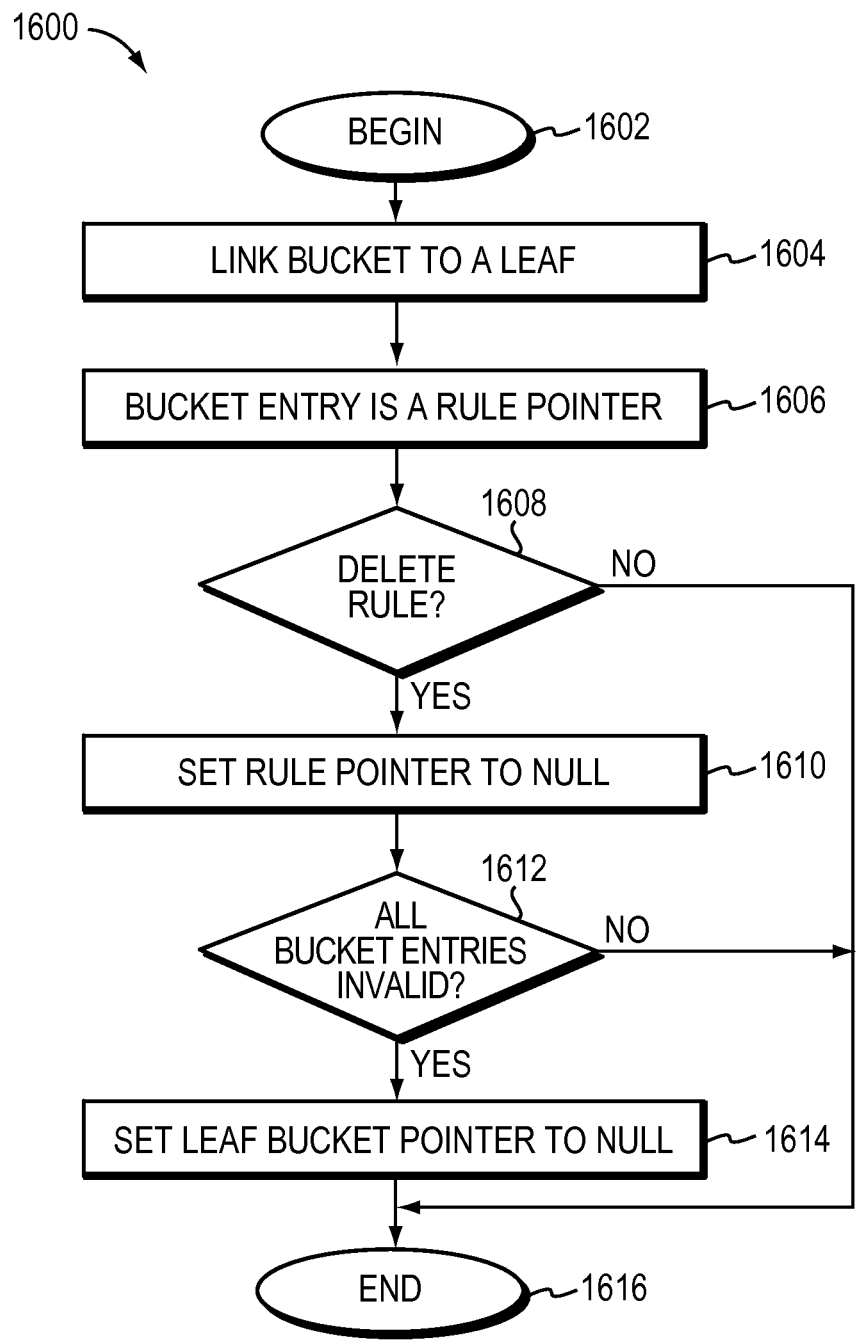
FIG. 16 is a flow diagram according to another embodiment of a method for atomically deleting a specified rule from the tree.

FIG. 16 is a flow diagram according to another embodiment of a method for atomically deleting a specified rule from the tree, wherein a bucket entry of a bucket includes a rule pointer pointing to the specified rule (1600). The method begins (1602) and the bucket is linked to a leaf by a leaf bucket pointer (1604). The bucket includes a bucket entry that is a rule pointer pointing to the specified rule (1606). A check is made for deleting the specified rule (1608), if the rule is not being deleted the method thereafter ends (1616) in the example embodiment. If the specified rule is to be deleted, the rule pointer is set to null (1610). A check may be made to determine if all bucket entries in the bucket are invalid (1612). If the bucket contains at least one valid entry the method thereafter ends (1616) in the example embodiment. If all bucket entries in the bucket are invalid, the link to the bucket may be updated by setting the leaf bucket pointer to null (1614). Setting the rule pointer to null and setting the leaf bucket pointer to null take one update, wherein the active search process skips null leaf bucket pointers and skips null rule pointers.

Figure 17:
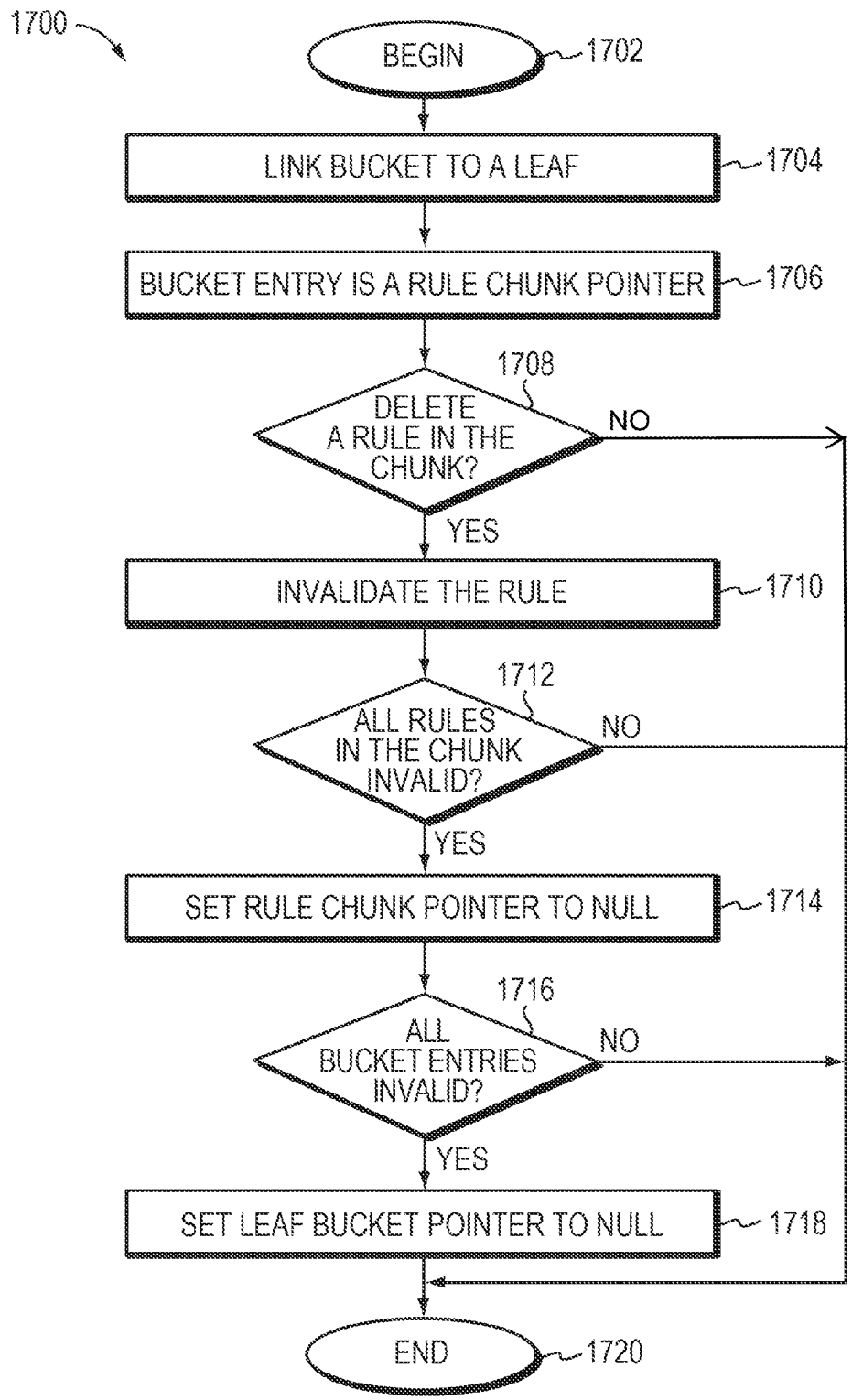
FIG. 17 is a flow diagram according to yet another embodiment of a method for atomically deleting a specified rule from the tree.

FIG. 17 is a flow diagram according to yet another embodiment of a method for atomically deleting a specified rule from the tree, wherein a bucket entry of a bucket includes a rule chunk pointer pointing to a set of one or more rules that includes the specified rule (1700). The method begins (1702) and the bucket is linked to a leaf by a leaf bucket pointer (1704). The bucket includes a bucket entry that is a rule chunk pointer that points to a set of rules that includes the specified rule (1706). A check is made for deleting the specified rule (1708). If the rule is not being deleted the method thereafter ends (1720) in the example embodiment. If the specified rule is to be deleted, the specified rule may be invalidated (1710). A check may be made to determine if all rules in the set are invalid (1712). If not, the method thereafter ends (1720) in the example embodiment. If all rules in the set are invalid, the rule chunk pointer may be set to null (1714). A check may be made to determine if all bucket entries in the bucket are invalid (1716). If the bucket contains at least one valid entry the method thereafter ends (1720) in the example embodiment. If all bucket entries in the bucket are invalid, the link to the bucket may be updated by setting the leaf bucket pointer to null (1718) and the method thereafter ends (1720) in the example embodiment. Invalidating the specified rule, setting the rule chunk pointer to null, and setting the leaf bucket pointer to null take one update. The active search process skips null leaf bucket pointers, null rule chunk pointers, invalid (e.g., invalidated) rules.

In adding, deleting, and modifying rules, nodes, as described above, node, leaves and/or buckets of a tree may be added, deleted, split, or merged. The tree may become less than optimal, in terms of depth and storage, compared to the tree when it was first compiled. For example, a tree may represent 100 rules. The tree of 100 rules may be divided into 4 leaves/nodes and result on average, in 25 rules per leaf/ node. Rules may be deleted and two or more buckets may be merged as described in embodiments herein. A merge may reduce the number leaves/nodes from 4 to 3 and result on average, in 33 rules per leaf/node. One or more sub-trees may be formed. To "improve" the tree, in terms of depth and storage, after incremental updating, a portion of the tree or subtree may be recompiled.

Recompiling a subtree, according to one embodiment, called "adaptive adjustment of tree" includes tracking the number of updates that occur with a counter at each node of the tree. For example, the housekeeping tree 220 may include and maintain the update counter. For a given node, a ratio may be determined from the number of updates tracked for the given node and the number of rules represented by the given node. When this ratio for a given node is greater than a value (which may be preconfigured or dynamically configured, for example, by feedback mechanism), a subtree of the given node may be recompiled.

Figure 18:
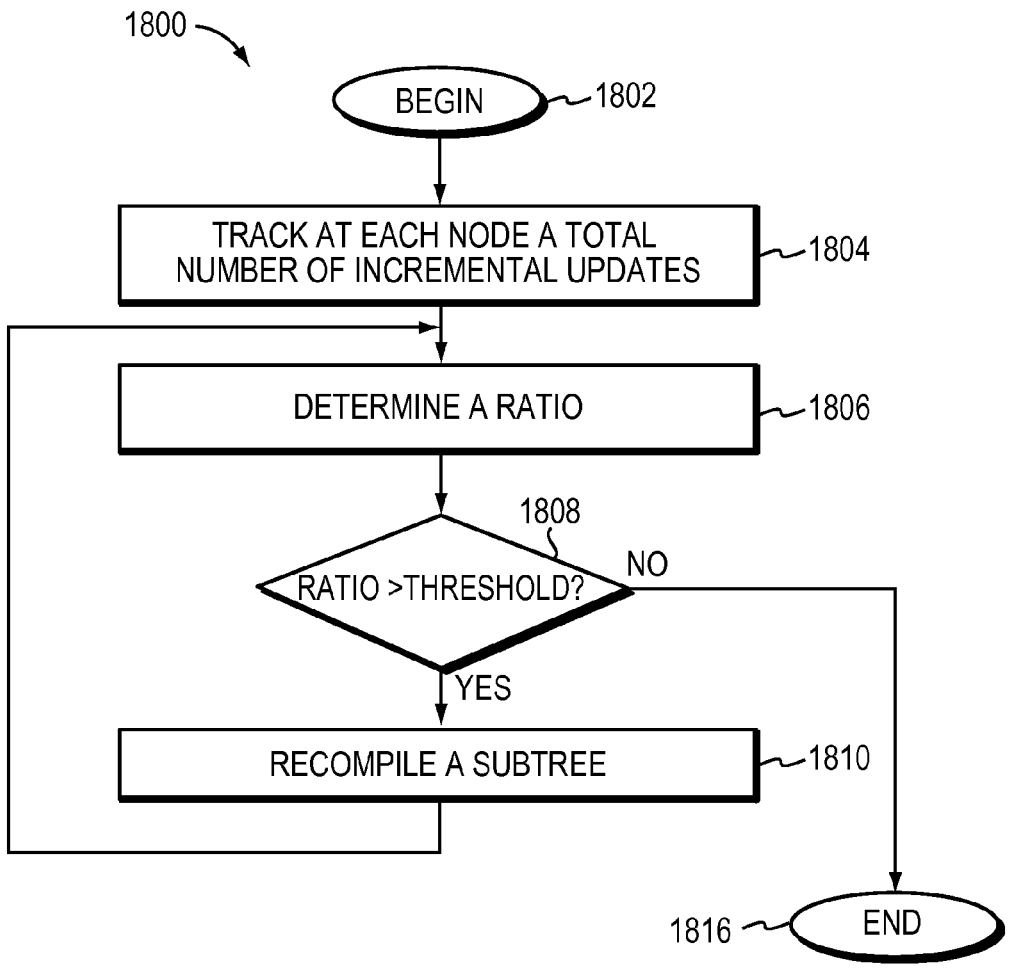
FIG. 18 is a flow diagram of a method for adaptive adjustment of the tree according to one embodiment.

FIG. 18 is a flow diagram of a method (1800) for adaptive adjustment of the tree according to one embodiment. The method begins (1802). At each node a total number of incremental updates may be tracked (1804). A ratio of the total number of incremental updates tracked for the given node to a number of rules represented by the given node since a last recompilation may be determined (1806). A check may be made to determine if the ratio is greater than the threshold. If the ratio is less than or equal to the threshold the method thereafter ends (1816) in the example embodiment. If the ratio is greater than the threshold the tree may be adjusted by recompiling a subtree (1810) and a ratio of the total number of incremental updates tracked for the given node to a number of rules represented by the given node since a last recompilation may again be determined (1806) and the method may continue as described above.

FIG. 19A illustrates an incremental update according to another embodiment for adding a rule (1900). In the example embodiment, a rule may be added by appending the rule and its priority to the rule table, replacing an invalidated rule with a new rule, and adding the rule to a bucket. As shown, the incremental update may include read modify write operations (RMW).

FIG. 19B illustrates an incremental update according to another embodiment for splitting a leaf into a node and leaves (1902). In the example embodiment splitting a leaf into a node and leaves may include creating a node, finding or creating new buckets, creating an array of leaves under the node created, creating an array of leaf indices under the node created, and finding or creating unique leaves.

FIG. 19C illustrates an incremental update according to another embodiment for adding a bucket to a node (1904). In the example embodiment, adding a bucket to a node may include replacing a hole in the node/leaf array with a new leaf, replacing a hole in the array of leaf indices with a new leaf index, creating a new array containing the new leaf, finding or creating a new unique leaf, creating a new array containing a new leaf index, updating the node with a new hash mask, and finding or creating a bucket with a specified rule list.

FIG. 19D illustrates an incremental update according to another embodiment for recompiling a subtree (1906). In the example embodiment, recompiling a subtree may include updating a root node of the subtree, updating a pointer to the root of the tree, and creating a node and an array.

FIG. 19E illustrates an incremental update according to another embodiment for deleting a rule (1908). In the example embodiment, deleting a rule may include invalidating a rule, removing the rule from all buckets that may reference it, marking the leaf as empty, and shrinking the node/leaf array.

FIG. 19F illustrates an incremental update according to another embodiment for modifying a rule (1910). In the example embodiment, modifying the rule may include setting a rule definition to an intersection of old and new versions and setting the rule definition to the new version.

FIG. 19G illustrates an incremental update according to another embodiment for defragmentation (1912). In the example embodiment, defragmentation may include copying an array of nodes and leaves, copying arrays of nodes and leaf indices, updating a node child pointer to point to the new array, copying a bucket, and updating leaves to point to the new bucket (e.g., the bucket copy).

Figure 19H:
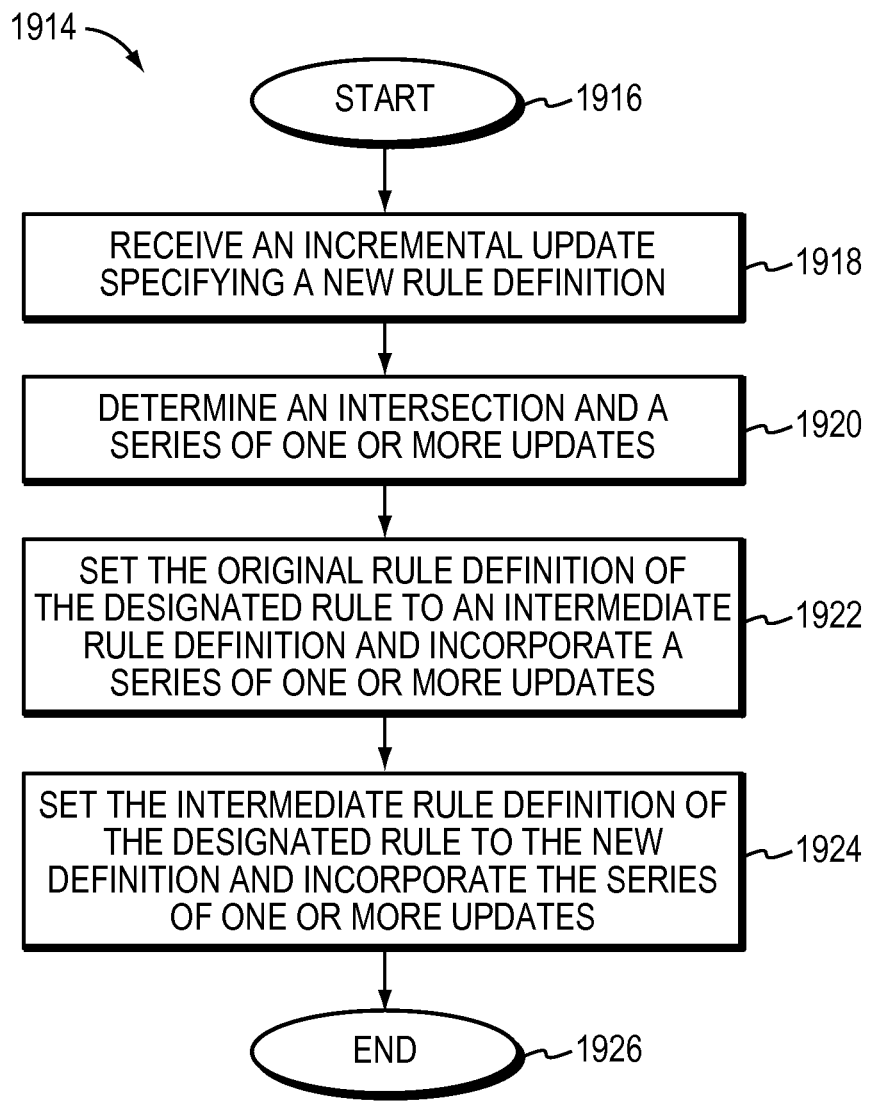
FIG. 19H is a flow diagram of an example embodiment for in-place rule modification.

FIG. 19H is a flow diagram of an example embodiment for in-place rule modification (1914). The method may start (1916) and receive an incremental update specifying a new rule definition including a modification of at least one field of a designated rule of a plurality of rules (1918). The plurality of rules may be represented by a Rule Compiled Data Structure (RCDS) as a decision tree for packet classification utilized by an active search process. The plurality of rules may represent a search space for the packet classification. Each rule of the plurality of rules may have an original rule definition defining a subset of the search space.

The method may determine an intersection of the new rule definition specified and the original rule definition of the designated rule (1920). The method may set the original rule definition of the designated rule to an intermediate rule definition defined by the intersection determined, atomically from the perspective of the active search process and incorporate a series of one or more updates determined in the RCDS, atomically from the perspective of the active search process (1922). The method may set the intermediate rule definition of the designated rule to the new rule definition and incorporate the series of one or more updates determined in the RCDS, atomically from the perspective of the active search process (1924), and the method thereafter ends (1926) in the example embodiment. By shrinking and growing the rule being modified instead of growing and cutting the rule as described below, periods of incorrect rule matching may be avoided.

Figure 19I:
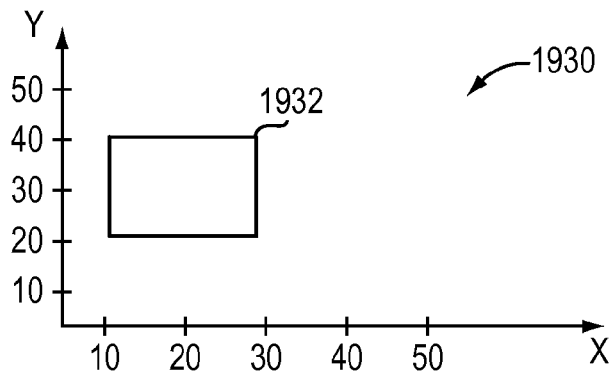
FIG. 19I shows graphs of a rule being modified based on growing and cutting a rule.
Figure 19I:
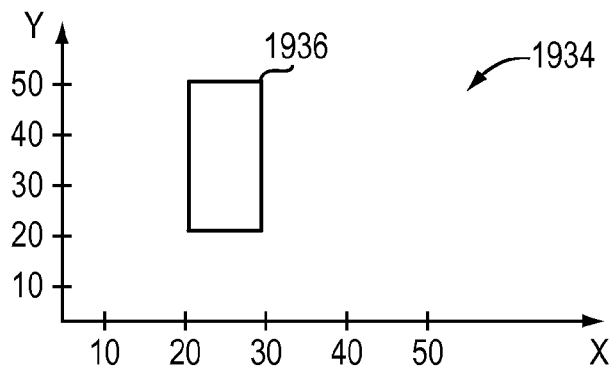
Figure 19I:
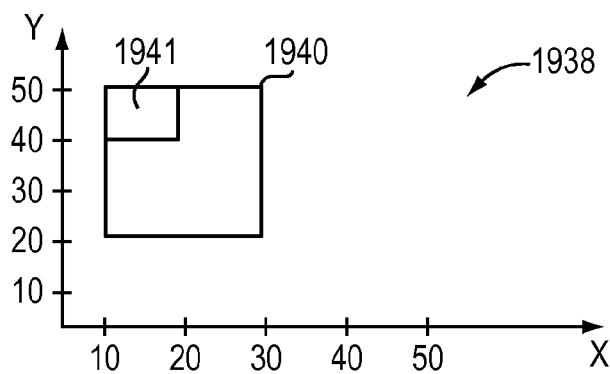
Figure 19I:
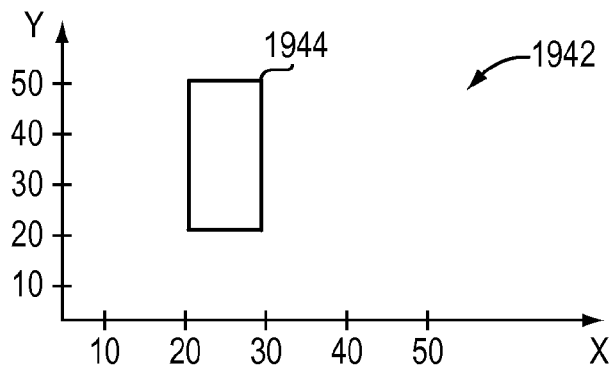

FIG. 19I shows graphs of a rule being modified based on growing and cutting a rule. For example, a graph 1930 shows a rule's original definition 1932. Another graph 1934 shows the rule's new definition 1936. Yet another graph 1938 shows an intermediate rule definition 1940 that is the original rule definition 1932 grown based on the rule's new definition 1936. For a period of time, keys may incorrectly match an area 1941. Matches in the area 1941 are incorrect as area 1941 is not defined by either the original rule definition 1932 or the new rule definition 1936. Matching in the area 1941 may occur until the intermediate rule definition 1940 is cut to remove the area 1941 resulting in the updated rule definition 1944 shown in the resulting graph 1942.

Figure 19J:
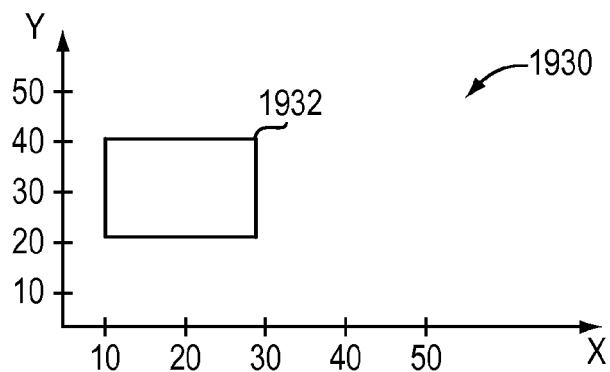
FIG. 19J shows graphs of a rule being modified based on shrinking and growing a rule.
Figure 19J:
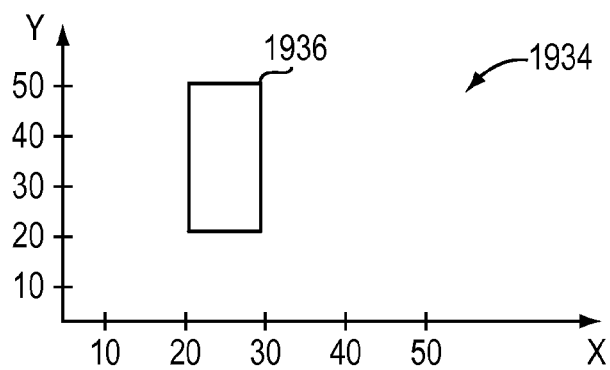
Figure 19J:
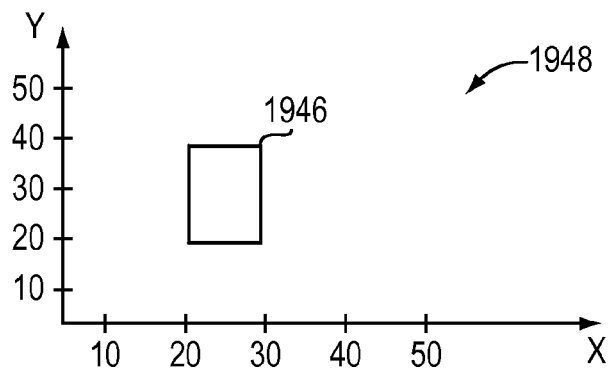
Figure 19J:
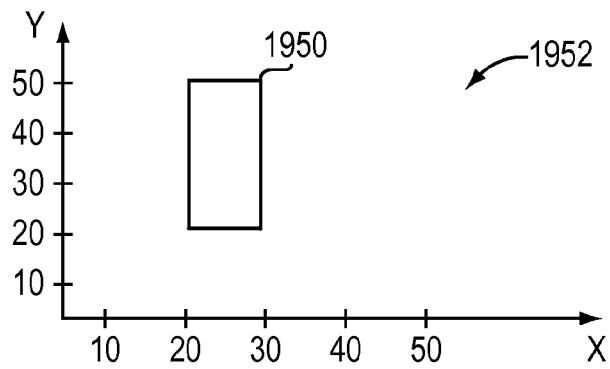

FIG. 19J shows graphs of a rule being modified based on shrinking and growing a rule according to example embodiments of methods disclosed herein. The graphs 1930 and 1934 of FIG. 19I are shown again with the rule's original definition 1932 and the rule's new definition 1936. However, another graph 1948 shows an intermediate rule definition 1946 that is defined by an intersection of the rule's original rule definition 1932 and the rule's new definition 1936.

By setting the rule to the intermediate rule definition 1946 defined by the intersection of the rule's original rule definition 1932 and the rule's new definition 1936, no areas resulting in an incorrect match are exposed. Setting the rule's definition to the intermediate rule definition 1946 defined by the intersection of the original rule definition 1932 and the new rule definition 1936 may include modifying each field of at least one field of the rule, in turn, atomically. Setting the rule's intermediate rule definition 1946 to the new rule definition 1936 may be performed resulting in an updated rule definition 1950 as shown in a resulting graph 1952. Setting the rule's intermediate rule definition 1946 to the new rule definition 1936 may include modifying each field of the at least one field of the designated rule, in turn, atomically.

Figure 19K:
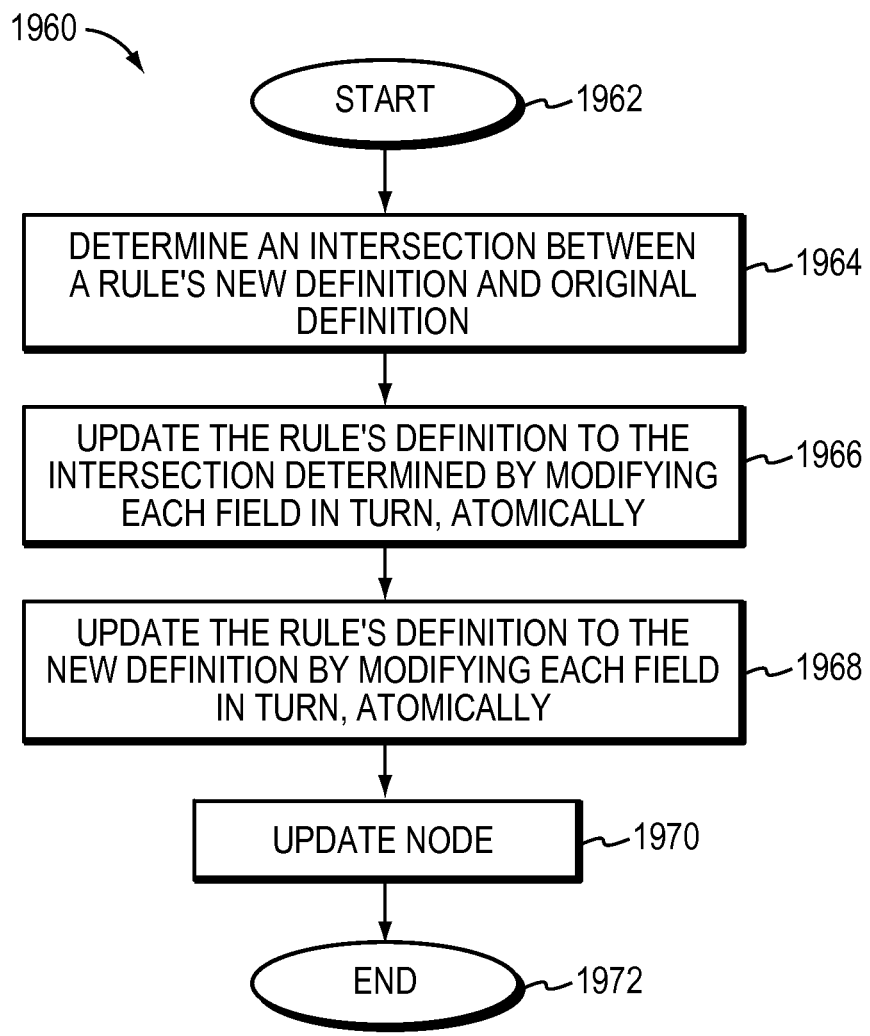
FIG. 19K is a flow diagram of another example embodiment for in-place rule modification.

FIG. 19K is a flow diagram of another example embodiment for in-place rule modification (1960). The method may determine an intersection of a rule's new rule definition and a rule's original rule definition (1964). The method may set the rule's definition to an intersection determined by intersecting the rule's original rule definition with the rule's new rule definition, by modifying each field of at least one field of the rule, in turn, atomically (1966). The method may set the rule's definition to the rule's new rule definition, by modifying each field of at least one field of the rule, in turn, atomically (1968). The method may update a root node of the decision tree by utilizing another method for updating a node (1970), as described below, and the method thereafter ends (1972) in the example embodiment.

Figure 19L:
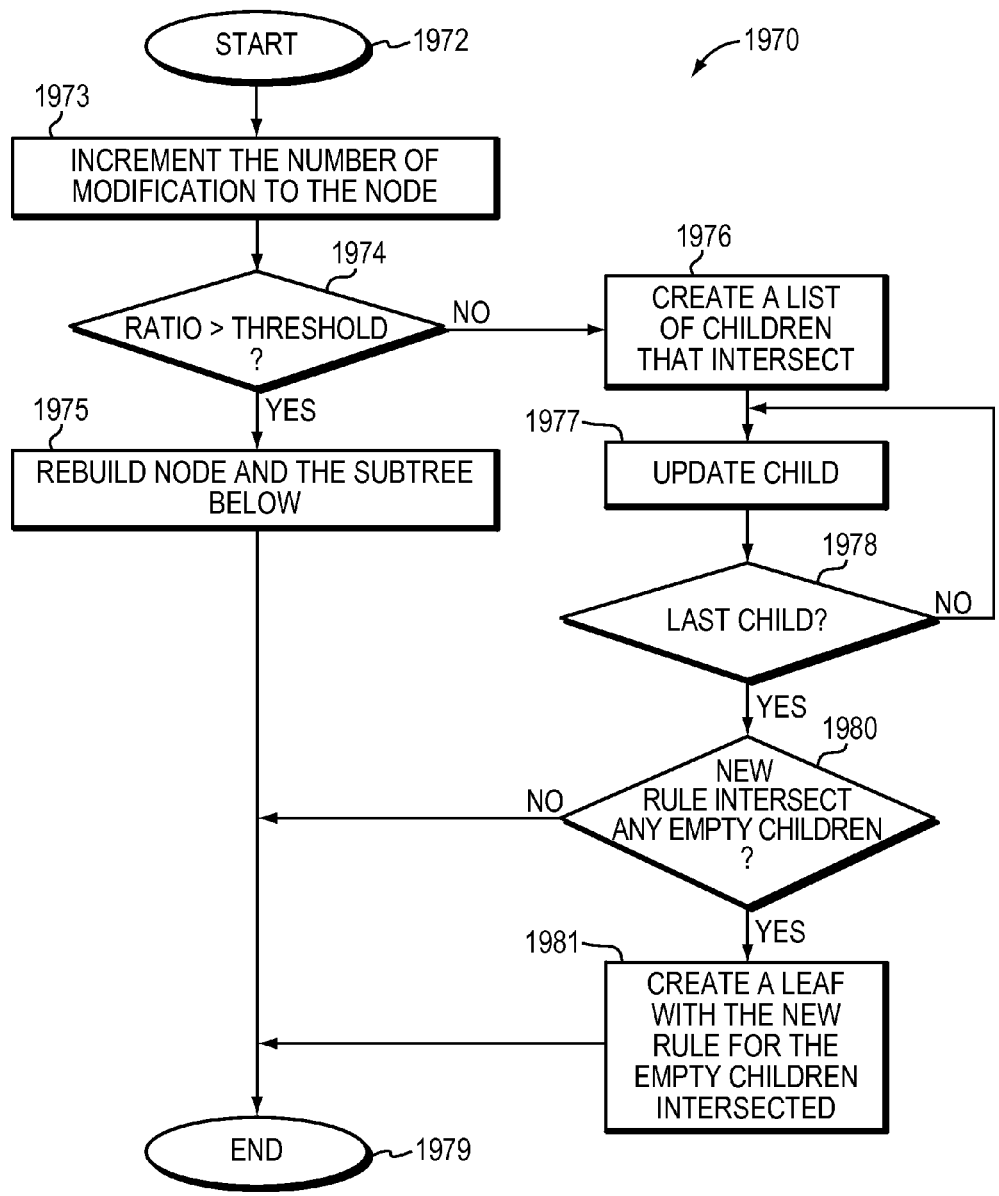
FIG. 19L is a flow diagram of an example embodiment for updating a node.

FIG. 19L is a flow diagram of an example embodiment for updating a node (1970). The method may start (1972) and increment a tracking number for the node (1973). The node may be a root, parent, or child node. The tracking number for the node may indicate a total number of updates for the node since a last recompilation. The method may determine a ratio of the tracking number incremented to a number of rules represented by the node and check whether or not the ratio determined exceeds a given threshold (1974). If yes, the method may rebuild the node and a subtree of the node (1975) and the method thereafter ends (1979) in the example embodiment. If no, the method may create an intersection list identifying children included in a sibling list having one or more rules intersecting either the new rule definition or the original rule definition (1976).

Figure 19M:
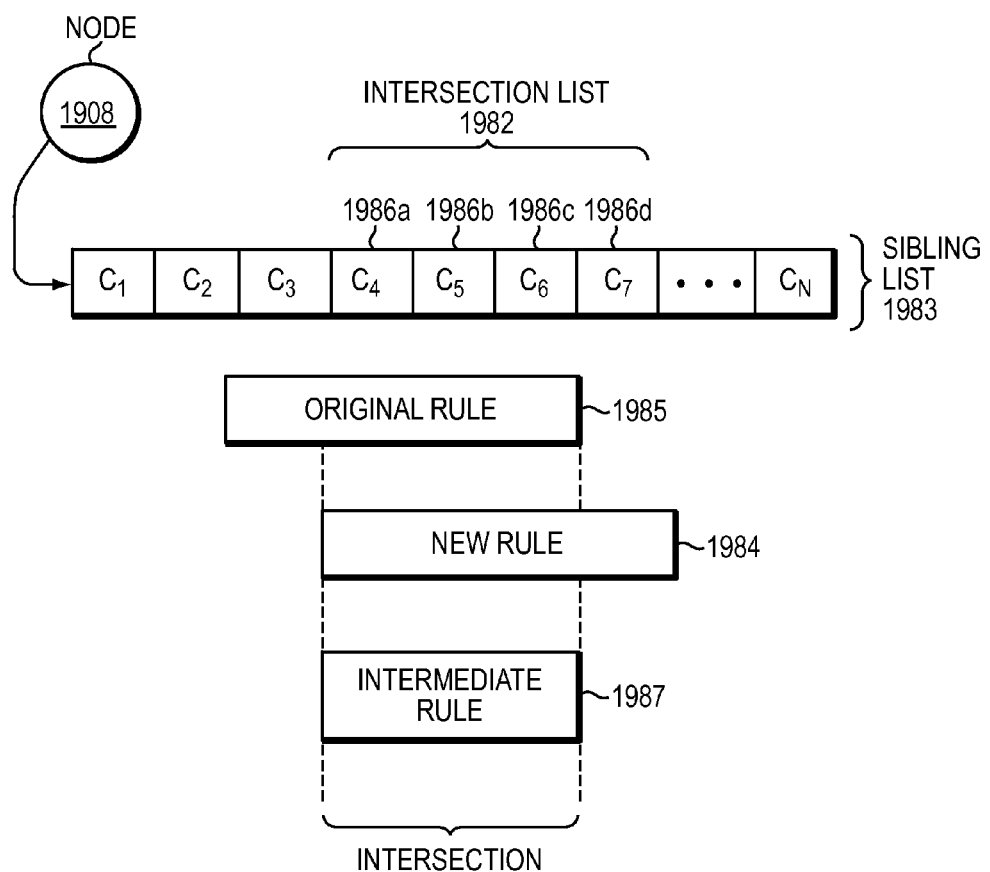
FIG. 19M shows an example embodiment of an intersection list identifying children included in a sibling list having one or more rules intersecting either the new rule definition or the original rule definition.

FIG. 19M shows an example embodiment of an intersection list 1982 identifying children included in a sibling list 1983 having one or more rules intersecting either the new rule definition 1984 or the original rule definition 1985. A node 1988 may be a root node or another node of the decision tree linked to one or more children, each of the one or more child may be a node or a leaf. The node 1988 may be linked to the one or more children by pointing the node 1988 to the sibling list 1983. Children 1986*a-d* included in the sibling list 1983 may be included in the intersection list 1982 as the children 1986*a-d* intersect the original rule 1985 and the child 1986*d* intersects the new rule definition 1984. Also shown is an intermediate rule definition 1987 defined by the intersection of the original rule definition 1985 and the new rule definition 1984.

Turning back to FIG. 19L, each child of the intersection list created, for example 1986*a-d* of the intersection list 1982 of FIG. 19M may be updated by utilizing another method for updating a child based on the new rule definition and the type of the child (1977) as described below with reference to FIG. 19N. After updating the child, a check may be made as to whether or not the child is the last child in the intersection list created. If not, the next child from the list may be updated (1977). If yes, the method may determine if the new rule definition intersects any empty children in the sibling list of the node being updated (1980). If no, the method thereafter ends (1979) in the example embodiment. If yes, a leaf may be created including the new rule (1981) and the method thereafter ends (1979) in the example embodiment.

Figure 19N:
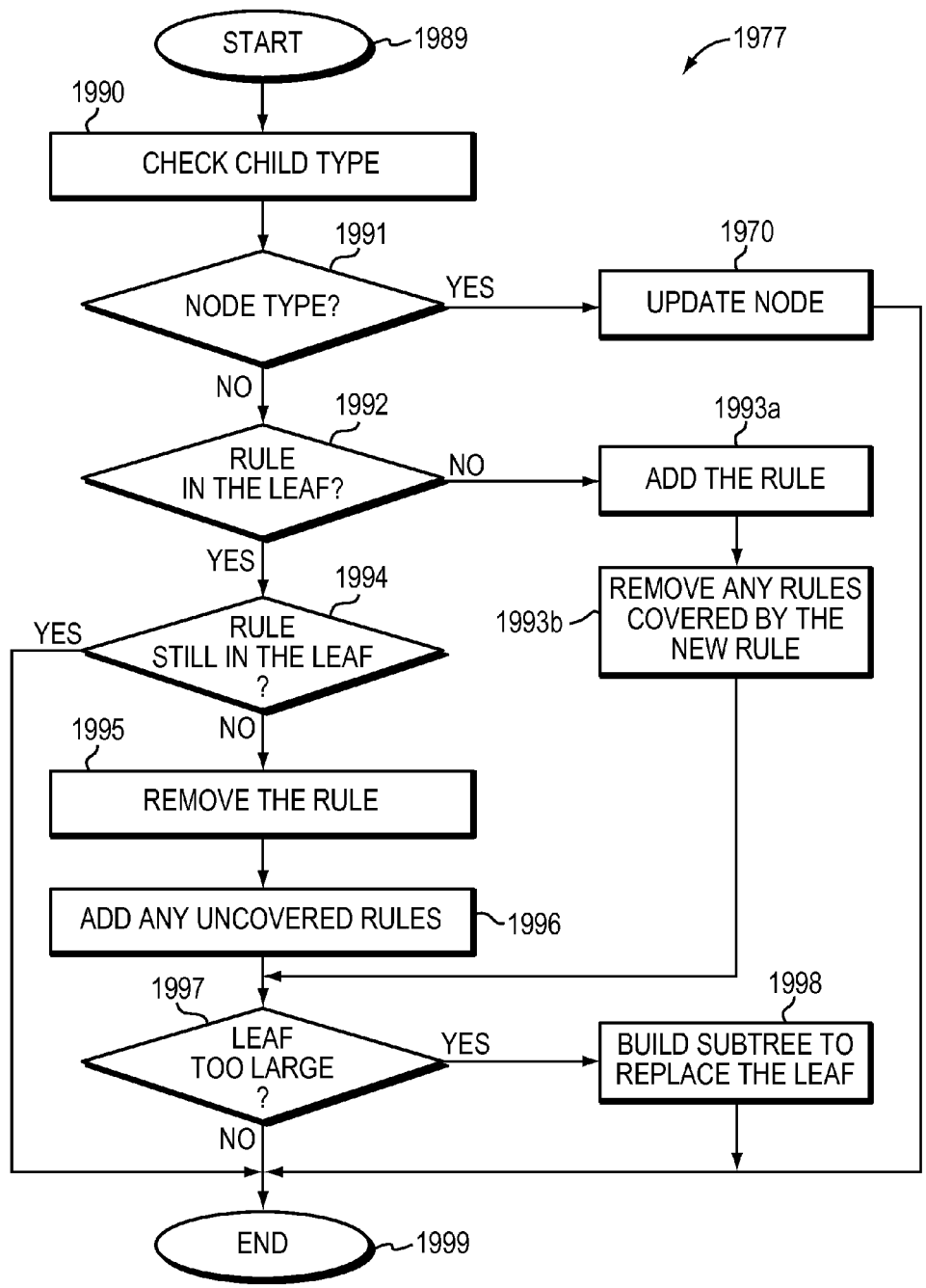
FIG. 19N is a flow diagram for updating a child based on the new rule definition and the type of the child.

FIG. 19N is a flow diagram for updating a child based on the new rule definition and the type of the child (1977). The method may start (1989) and check a given type of the child (1990). A check may be made if the given type is a node type (1991). If not, the given type is the leaf type, and the method may check whether or not the rule is currently in the child (1992).

If yes, the method may check whether or not to continue to include the rule in the child (1994). If yes, the method thereafter ends (1999) in the example embodiment. If no, the rule is removed from the child (1995) and any uncovered rules may be added (1996). For example, one or more lower priority rules may be added to the child because the removed rule covered the one or more lower priority rules and the removed rule had a higher priority relative to a priority of the one or more lower priority rules. A check may be made as to whether or not a number of rules represented by the child is greater than a leaf rule number threshold (1997). If no, the method thereafter ends (1999) in the example embodiment. If yes, a subtree may be rebuilt to replace the child (1998) and the method thereafter ends (1999) in the example embodiment.

If the check for whether or not the rule is currently in the child (1992) is no, the rule may be added to the child (1993*a*). The method may remove any rules covered by the added rule (1993*b*). For example, the method may remove one or more lower priority rules from the child, the one or more lower priority rules removed may be rules that are covered by the added rule and have a lower priority relative to a priority of the added rule. A check may be made as to whether or not a number of rules represented by the child is greater than a leaf rule number threshold (1997). If no, the method thereafter ends (1999) in the example embodiment. If yes, a subtree may be rebuilt to replace the child (1998) and the method thereafter ends (1999) in the example embodiment.

If however, the check for whether the given type is the node type (1991) is yes, the child may be updated by utilizing another method for updating the node (1970), as described above in reference to FIG. 19L, and the method thereafter ends (1999) in the example embodiment.

Figure 20:
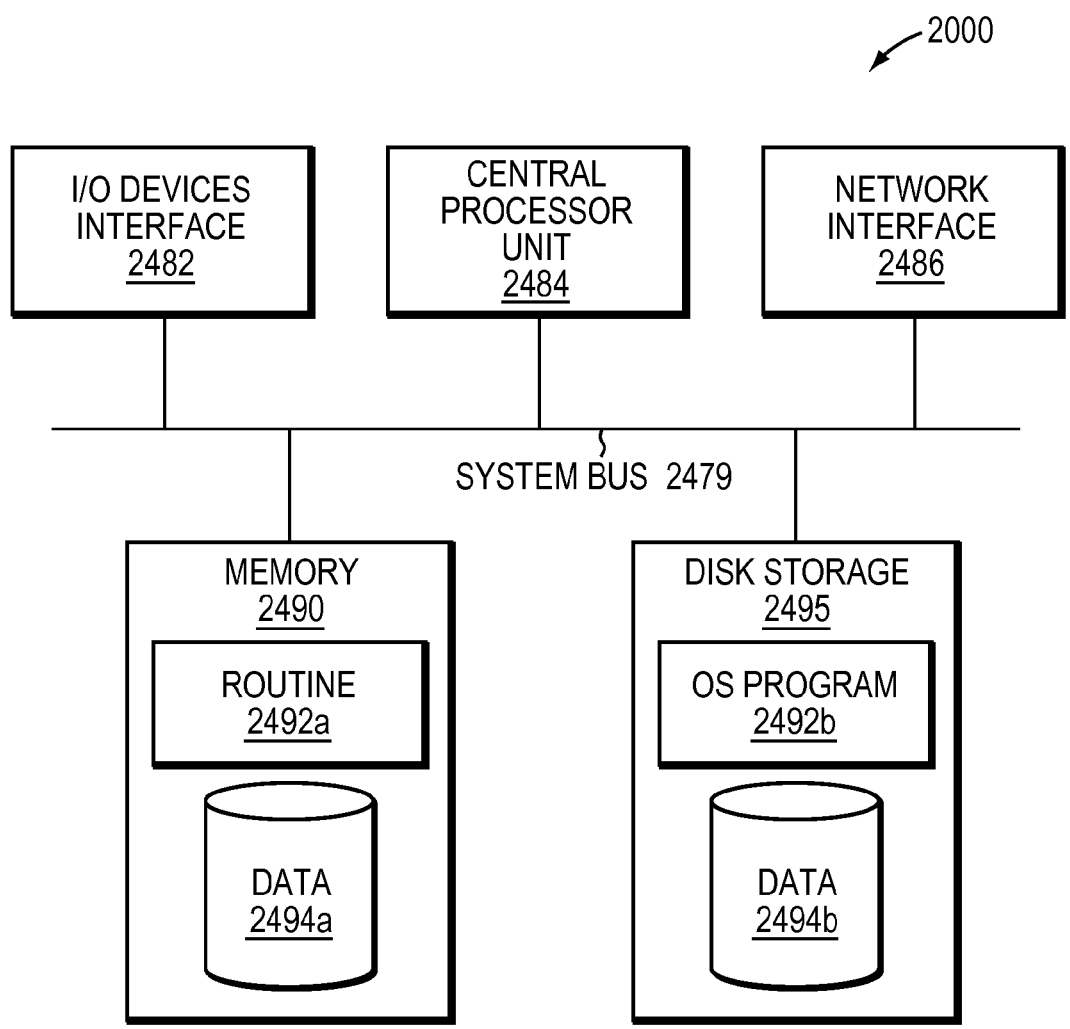
FIG. 20 is a block diagram of a computer in which various embodiments disclosed herein may be implemented.

FIG. 20 is a block diagram of the internal structure of a computer 2000 in which various embodiments of the present invention may be implemented. The computer 2000 contains system bus 2479, where a bus is a set of hardware lines used for data transfer among the components of a computer or processing system. Bus 2479 is essentially a shared conduit that connects different elements of a computer system (e.g., processor, disk storage, memory, input/output ports, network ports, etc.) that enables the transfer of information between the elements. Attached to system bus 2479 is I/O device interface 2482 for connecting various input and output devices (e.g., keyboard, mouse, displays, printers, speakers, etc.) to the computer 2000. Network interface 2486 allows the computer 2000 to connect to various other devices attached to a network. Memory 2490 provides volatile storage for computer software instructions 2492a and data 2494a. Disk storage 2495 provides non-volatile storage for computer software instructions 2492b and data 2494b. Central processor unit 2484 is also attached to system bus 2479 and provides for the execution of computer instructions.

The processor routines 2492a-b and data 2494a-b are a computer program product, including a computer readable medium (e.g., a removable storage medium, such as one or more DVD-ROM's, CD-ROM's, diskettes, tapes, etc.) that provides at least a portion of the software instructions for embodiments of the invention system. Computer program product 2492a-b may be installed by any suitable software installation procedure, as is well known in the art. In another embodiment, at least a portion of the software instructions may also be downloaded over a cable, communication and/or wireless connection.

Further, embodiments of the present invention may be implemented in a variety of computer architectures. The general computer of FIG. 20 is for purposes of illustration and not limitation of any techniques disclosed herein.

While this invention has been particularly shown and described with references to example embodiments thereof, it will be understood by those skilled in the art that various changes in form and details may be made therein without departing from the scope of the invention encompassed by the appended claims.

Embodiments may be implemented in hardware, firmware, software, or any combination thereof. Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transitory machine-readable medium may include read only memory (ROM); random access memory (RAM); magnetic disk storage media; optical storage media; flash memory devices; and others. Further, firmware, software, routines, or instructions may be described herein as performing certain actions. However, it should be appreciated that such descriptions are merely for convenience and that such actions in fact result from computing devices, processors, controllers, or other devices executing the firmware, software, routines, instructions, etc.

As will be appreciated by one skilled in the art, techniques disclosed herein may be embodied as a system, method or computer program product. Accordingly, techniques disclosed herein may take the form of an entirely hardware embodiment, an entirely software embodiment (including firmware, resident software, micro-code, etc.) or an embodiment combining software and hardware aspects that may all generally be referred to herein as a "unit," "module," or "system."

It should be understood that the block diagrams may include more or fewer elements, be arranged differently, or be represented differently. It should be understood that implementation may dictate the block and flow diagrams and the number of block and flow diagrams illustrating the execution of techniques disclosed herein.

What is claimed is:

1. A method comprising:
    receiving an incremental update specifying a new rule definition including a modification of at least one field of a designated rule of a plurality of rules, the plurality of rules being represented by a Rule Compiled Data Structure (RCDS) as a decision tree for packet classification utilized by an active search process, the plurality of rules representing a search space for the packet classification, each rule of the plurality of rules having an original rule definition defining a subset of the search space;
    determining an intersection of the new rule definition specified and the original rule definition of the designated rule;
    setting the original rule definition of the designated rule to an intermediate rule definition defined by the intersection determined and incorporating a series of one or more updates determined in the RCDS, atomically from the perspective of the active search process; and
    setting the intermediate rule definition of the designated rule to the new rule definition and incorporating the series of one or more updates determined in the RCDS, atomically from the perspective of the active search process.

2. The method of claim 1 wherein setting the original rule definition of the designated rule to the intermediate rule definition defined by the intersection determined includes modifying each field of the at least one field of the designated rule, in turn, atomically.

3. The method of claim 1 wherein setting the intermediate rule definition of the designated rule to the new rule definition includes modifying each field of the at least one field of the designated rule, in turn, atomically.

4. The method of claim 1, further comprising:
    including a plurality of nodes and one or more leaves in the RCDS, the plurality of nodes and the one or more leaves representing a subset of the plurality of rules; and
    representing at least one of the one or more nodes as a parent node and linking the parent node to one or more children, the one or more children having a child type, the child type being either a node type or a leaf type, wherein linking the parent node to the one or more children includes pointing the parent node to a sibling list, the sibling list including the one or more children, and determining the series of one or more updates to the RCDS based on the incremental update received wherein determining includes:
    for each parent node, (a) creating an intersection list identifying children included in the sibling list having one or more rules intersecting either the new rule definition or the original rule definition and (b) updating each of the children identified based on the new rule definition and the type of the child.

5. The method of claim 4 wherein, given the type of the child is the leaf type, updating each of the children identified based on the new rule definition and the type of the child includes:
    determining whether to (i) continue to include the designated rule in the child, (ii) remove the designated rule from the child, or (iii) add the designated rule to the child.

6. The method of claim 5 wherein, given the determination is to remove the designated rule from the child, the method further includes:
    removing the designated rule from the child;
    adding one or more lower priority rules to the child, the one or more lower priority rules added being rules that are covered by the designated rule and have a lower priority relative to a priority of the designated rule; and
replacing the child by rebuilding a subtree of the RCDS based on the one or more lower priority rules added resulting in a number of rules represented by the child being greater than a leaf rule number threshold.

7. The method of claim 5 wherein, given the determination is to add the designated rule to the child, the method further includes:
adding the designated rule to the child;
removing one or more lower priority rules from the child, the one or more lower priority rules removed being rules that are covered by the designated rule and have a lower priority relative to a priority of the designated rule; and
replacing the child by rebuilding a subtree of the RCDS based on the one or more lower priority rules added resulting in a number of rules represented by the child being greater than a leaf rule number threshold.

8. The method of claim 4 wherein, given the type of the child is the node type, updating each of the children identified based on the new rule definition and the type of the child includes:
incrementing a tracking number for the child, the tracking number indicating a total number of updates for the child since a last recompilation;
determining a ratio of the tracking number incremented to a number of rules represented by the child; and
rebuilding the child and a subtree of the child based on the ratio being greater than a given threshold value.

9. The method of claim 4 further including:
linking the one or more leaves to one or more buckets, each bucket representing a smaller set of rules represented by a corresponding leaf, each bucket including one or more bucket entries, each bucket entry corresponding to a unique one of the plurality of rules;
storing the plurality of rules in a rule table, wherein setting the original rule definition of the designated rule to the intermediate rule definition defined by the intersection determined includes updating an entry for the designated rule in the rule table stored and setting the intermediate rule definition of the designated rule to the new rule definition includes further updating the entry with the new rule definition.

10. The method of claim 1 wherein incorporating the series of one or more updates determined in the RCDS, atomically includes:
enabling a given search of the active search process to view the RCDS in either a before state or an after state, the before state being a state of the RCDS before receiving the incremental update, the after state being another state of the RCDS having the series of one or more updates to the RCDS incorporated, the after state being made visible to the given search based on a single update to the RCDS being searched.

11. The method of claim 1, wherein the RCDS includes a plurality of nodes representing a subset of the plurality of rules, the method further comprising:
maintaining a housekeeping tree, the housekeeping tree being an augmented representation of the RCDS, the housekeeping tree including field ranges of the rules and lists of the rules at each node in the RCDS and utilizing the housekeeping tree to enable visibility of the after state.

12. An apparatus comprising:
a memory;
a processor coupled to the memory, the processor configured to:
receive an incremental update specifying a new rule definition including a modification of at least one field of a designated rule of a plurality of rules, the plurality of rules being represented by a Rule Compiled Data Structure (RCDS) as a decision tree for packet classification utilized by an active search process, the plurality of rules representing a search space for the packet classification, each rule of the plurality of rules having an original rule definition defining a subset of the search space;
determine an intersection of the new rule definition specified and the original rule definition of the designated;
set the original rule definition of the designated rule to an intermediate rule definition defined by the intersection determined and incorporate a series of one or more updates determined in the RCDS, atomically from the perspective of the active search process; and
set the intermediate rule definition of the designated rule to the new rule definition and incorporating the series of one or more updates determined in the RCDS, atomically from the perspective of the active search process.

13. The apparatus of claim 12 wherein to set the original rule definition of the designated rule to the intermediate rule definition defined by the intersection determined, the processor is further configured to modify each field of the at least one field of the designated rule, in turn, atomically.

14. The apparatus of claim 12 wherein to set the intermediate rule definition of the designated rule to the new rule definition, the processor is further configured to modify each field of the at least one field of the designated rule, in turn, atomically.

15. The apparatus of claim 12 wherein the processor is further configured to:
include a plurality of nodes and one or more leaves in the RCDS, the plurality of nodes and the one or more leaves representing a subset of the plurality of rules; and
represent at least one of the one or more nodes as a parent node and link the parent node to one or more children, the one or more children having a child type, the child type being either a node type or a leaf type, wherein to link the parent node to the one or more children the processor is still further configured to point the parent node to a sibling list, the sibling list including the one or more children, and to determine the series of one or more updates to the RCDS based on the incremental update received the processor is still further configured to:
for each parent node, (a) create an intersection list identifying children included in the sibling list having one or more rules intersecting either the new rule definition or the original rule definition and (b) update each of the children identified based on the new rule definition and the type of the child.

16. The apparatus of claim 15 wherein, given the type of the child is the leaf type, to update each of the children identified based on the new rule definition and the type of the child, the processor is further configured to:
determine whether to (i) continue to include the designated rule in the child, (ii) remove the designated rule from the child, or (iii) add the designated rule to the child.

17. The apparatus of claim 16 wherein, given the determination is to remove the designated rule from the child, the processor is further configured to:
remove the designated rule from the child;
add one or more lower priority rules to the child, the one or more lower priority rules added being rules that are covered by the designated rule and have a lower priority relative to a priority of the designated rule; and replace the child by rebuilding a subtree of the RCDS based on the one or more lower priority rules added resulting in a number of rules represented by the child being greater than a leaf rule number threshold.

18. The apparatus of claim 16 wherein, given the determination is to add the designated rule to the child, the processor is further configured to:
add the designated rule to the child;
remove one or more lower priority rules from the child, the one or more lower priority rules removed being rules that are covered by the designated rule and have a lower priority relative to a priority of the designated rule; and
replace the child by rebuilding a subtree of the RCDS based on the one or more lower priority rules added resulting in a number of rules represented by the child being greater than a leaf rule number threshold.

19. The apparatus of claim 15 wherein, given the type of the child is the node type, to update each of the children identified based on the new rule definition and the type of the child, the processor is further configured to:
increment a tracking number for the child, the tracking number indicating a total number of updates for the child since a last recompilation;
determine a ratio of the tracking number incremented to a number of rules represented by the child; and
rebuild the child and a subtree of the child based on the ratio being greater than a given threshold value.

20. The apparatus of claim 15 wherein the processor is further configured to:
link the one or more leaves to one or more buckets, each bucket representing a smaller set of rules represented by a corresponding leaf, each bucket including one or more bucket entries, each bucket entry corresponding to a unique one of the plurality of rules; and
store the plurality of rules in a rule table, wherein to set the original rule definition of the designated rule to the intermediate rule definition defined by the intersection determined the processor is further configured to update an entry for the designated rule in the rule table stored and to set the intermediate rule definition of the designated rule to the new rule definition the processor is still further configured to update the entry with the new rule definition.

21. The apparatus of claim 12 wherein to incorporate the series of one or more updates determined in the RCDS, atomically, and the processor is further configured to:
enable a given search of the active search process to view the RCDS in either a before state or an after state, the before state being a state of the RCDS before receiving the incremental update, the after state being another state of the RCDS having the series of one or more updates to the RCDS incorporated, the after state being made visible to the given search based on a single update to the RCDS being searched.

22. The apparatus of claim 12, wherein the RCDS includes a plurality of nodes representing a subset of the plurality of rules and the processor further configured to:
maintain a housekeeping tree, the housekeeping tree being an augmented representation of the RCDS, the housekeeping tree including field ranges of the rules and lists of the rules at each node in the RCDS and utilize the housekeeping tree to enable visibility of the after state.

23. A non-transitory computer-readable medium having encoded thereon a sequence of instructions which, when loaded and executed by a processor, causes the processor to:
receive an incremental update specifying a new rule definition including a modification of at least one field of a designated rule of a plurality of rules, the plurality of rules being represented by a Rule Compiled Data Structure (RCDS) as a decision tree for packet classification utilized by an active search process, the plurality of rules representing a search space for the packet classification, each rule of the plurality of rules having an original rule definition defining a subset of the search space;
determine an intersection of the new rule definition specified and the original rule definition of the designated rule;
set the original rule definition of the designated rule to an intermediate rule definition defined by the intersection determined and incorporate a series of one or more updates determined in the RCDS, atomically from the perspective of the active search process; and
set the intermediate rule definition of the designated rule to the new rule definition and incorporating the series of one or more updates determined in the RCDS, atomically from the perspective of the active search process.

24. The non-transitory computer-readable medium of claim 23 wherein to set the original rule definition of the designated rule to the intermediate rule definition defined by the intersection determined, the sequence of instructions further causes the processor to modify each field of the at least one field of the designated rule, in turn, atomically.

25. The non-transitory computer-readable medium of claim 23 wherein to set the intermediate rule definition of the designated rule to the new rule definition, the sequence of instructions further causes the processor to modify each field of the at least one field of the designated rule, in turn, atomically.

26. The non-transitory computer-readable medium of claim 23 wherein the sequence of instructions further causes the processor to:
include a plurality of nodes and one or more leaves in the RCDS, the plurality of nodes and the one or more leaves representing a subset of the plurality of rules; and
represent at least one of the one or more nodes as a parent node and link the parent node to one or more children, the one or more children having a child type, the child type being either a node type or a leaf type, wherein to link the parent node to the one or more children the sequence of instructions still further causes the processor to point the parent node to a sibling list, the sibling list including the one or more children, and to determine the series of one or more updates to the RCDS based on the incremental update received the sequence of instructions still further causes the processor to:
for each parent node, (a) create an intersection list identifying children included in the sibling list having one or more rules intersecting either the new rule definition or the original rule definition and (b) update each of the children identified based on the new rule definition and the type of the child.

27. The non-transitory computer-readable medium of claim 26 wherein, given the type of the child is the leaf type, to update each of the children identified based on the new rule definition and the type of the child, the sequence of instructions further causes the processor to:
determine whether to (i) continue to include the designated rule in the child, (ii) remove the designated rule from the child, or (iii) add the designated rule to the child.

28. The non-transitory computer-readable medium of claim 27 wherein, given the determination is to remove the designated rule from the child, the sequence of instructions further causes the processor to:
remove the designated rule from the child;

add one or more lower priority rules to the child, the one or more lower priority rules added being rules that are covered by the designated rule and have a lower priority relative to a priority of the designated rule; and replace the child by rebuilding a subtree of the RCDS based on the one or more lower priority rules added resulting in a number of rules represented by the child being greater than a leaf rule number threshold.

29. The non-transitory computer-readable medium of claim 27 wherein, given the determination is to add the designated rule to the child, the sequence of instructions further causes the processor to:

add the designated rule to the child;

remove one or more lower priority rules from the child, the one or more lower priority rules removed being rules that are covered by the designated rule and have a lower priority relative to a priority of the designated rule; and replace the child by rebuilding a subtree of the RCDS based on the one or more lower priority rules added resulting in a number of rules represented by the child being greater than a leaf rule number threshold.

30. The non-transitory computer-readable medium of claim 26 wherein, given the type of the child is the node type, to update each of the children identified based on the new rule definition and the type of the child, the sequence of instructions further causes the processor to:

increment a tracking number for the child, the tracking number indicating a total number of updates for the child since a last recompilation;

determine a ratio of the tracking number incremented to a number of rules represented by the child; and rebuild the child and a subtree of the child based on the ratio being greater than a given threshold value.

31. The non-transitory computer-readable medium of claim 26 wherein the sequence of instructions further causes the processor to:

link the one or more leaves to one or more buckets, each bucket representing a smaller set of rules represented by a corresponding leaf, each bucket including one or more bucket entries, each bucket entry corresponding to a unique one of the plurality of rules; and store the plurality of rules in a rule table, wherein to set the original rule definition of the designated rule to the intermediate rule definition defined by the intersection determined the sequence of instructions further causes the processor to update an entry for the designated rule in the rule table stored and to set the intermediate rule definition of the designated rule to the new rule definition the sequence of instructions still further causes the processor to update the entry with the new rule definition.

32. The non-transitory computer-readable medium of claim 23 wherein to incorporate the series of one or more updates determined in the RCDS, atomically, and the sequence of instructions further causes the processor to:

enabling a given search of the active search process to view the RCDS in either a before state or an after state, the before state being a state of the RCDS before receiving the incremental update, the after state being another state of the RCDS having the series of one or more updates to the RCDS incorporated, the after state being made visible to the given search based on a single update to the RCDS being searched.

33. The non-transitory computer-readable medium of claim 23, wherein the RCDS includes a plurality of nodes representing a subset of the plurality of rules and the sequence of instructions further causes the processor to:

maintain a housekeeping tree, the housekeeping tree being an augmented representation of the RCDS, the housekeeping tree including field ranges of the rules and lists of the rules at each node in the RCDS and utilize the housekeeping tree to enable visibility of the after state.

* * * * *